(12) United States Patent
Yamamoto et al.

(10) Patent No.: US 6,810,320 B2
(45) Date of Patent: Oct. 26, 2004

(54) APPARATUS AND METHOD OF COMBUSTION DIAGNOSIS/CONTROL IN INTERNAL COMBUSTION ENGINE

(75) Inventors: Takayuki Yamamoto, Yokohama (JP); Shinji Yasueda, Yokohama (JP); Akito Murakami, Yokohama (JP); Yoshihiro Nakayama, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/297,085

(22) PCT Filed: Mar. 29, 2002

(86) PCT No.: PCT/JP02/03197

§ 371 (c)(1),
(2), (4) Date: Jun. 3, 2003

(87) PCT Pub. No.: WO02/079629

PCT Pub. Date: Oct. 10, 2002

(65) Prior Publication Data

US 2003/0188714 A1 Oct. 9, 2003

(30) Foreign Application Priority Data

Apr. 30, 2001 (JP) .......................................... 2001-98635

(51) Int. Cl.[7] .............................................. G06F 19/00
(52) U.S. Cl. .................. 701/111; 701/115; 123/406.14; 123/435
(58) Field of Search ................................. 701/101, 102, 701/103, 104, 105, 111, 115; 123/406.14, 406.16, 406.17, 406.18, 406.21, 406.22, 435, 406.41

(56) References Cited

U.S. PATENT DOCUMENTS

| | | | |
|---|---|---|---|
| 4,718,382 A | * | 1/1988 | Tanaka .................. 123/406.22 |
| 4,744,244 A | * | 5/1988 | Tanaka .......................... 73/115 |
| 4,944,271 A | * | 7/1990 | Iwata et al. ............ 123/406.41 |
| 5,758,307 A | | 5/1998 | Haefner et al. |
| 6,354,268 B1 | * | 3/2002 | Beck et al. .................. 123/435 |

FOREIGN PATENT DOCUMENTS

| | | |
|---|---|---|
| JP | 63-182536 | 7/1988 |
| JP | 05-071403 | 3/1993 |
| JP | 05-149179 | 6/1993 |
| JP | 07-180599 | 7/1995 |
| JP | 11-183330 | 7/1999 |
| JP | 11-257149 | 9/1999 |
| JP | 200-110652 | 4/2000 |
| JP | 2000-240497 | 5/2000 |
| JP | 2000-234558 | 8/2000 |
| JP | 2002-097979 | 4/2002 |

\* cited by examiner

Primary Examiner—John Kwon
(74) Attorney, Agent, or Firm—Wenderoth, Lind & Ponack, L.L.P.

(57) ABSTRACT

An apparatus diagnoses and controls combustion of an internal combustion engine which makes smooth operation of an engine possible by adjusting the combustion condition at the occurrence of knock, misfire, and flame quenching and also makes it possible to detect the occurrence of abnormality in cylinder pressure detectors without delay and deal with the abnormality without stopping the operation of the engine. A maximum pressure ratio $P_p/P_0$ is calculated, $P_p$ being the maximum cylinder pressure and $P_0$ being the compression pressure at one or a plurality of crank angles in the compression stroke $P_p/P_0$ is compared with pressure ratios for each diagnosis category, the combustion conditions are diagnosed by judging the result of the comparison every cycle or plural cycles.

36 Claims, 33 Drawing Sheets

FIG.10(A) WHEN Pp ABNORMAL / WHEN COMPRESSION PRESSURE ABNORMAL
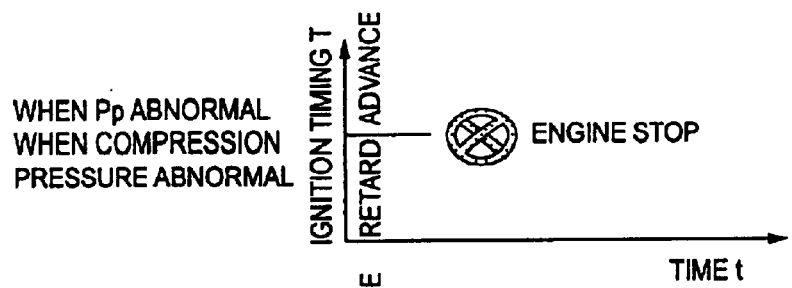
FIG.10(B) WHEN KNOCKING
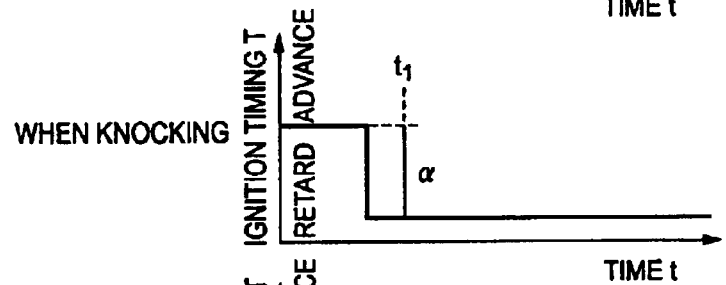
FIG.10(C) WHEN Pp IS HIGH
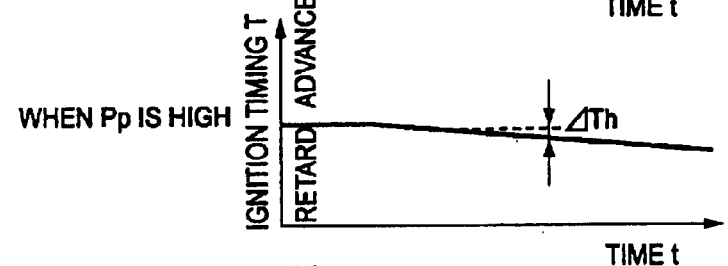
FIG.10(D) WHEN Pp IS PROPER
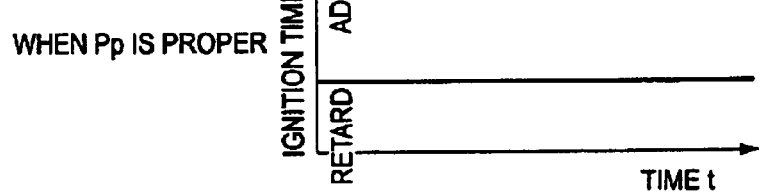
FIG.10(E) WHEN Pp IS LOW
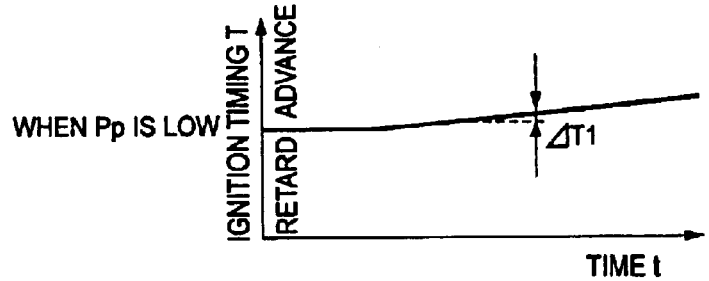
FIG.10(F) WHEN MISFIRING / WHEN SENSOR ABNORMAL
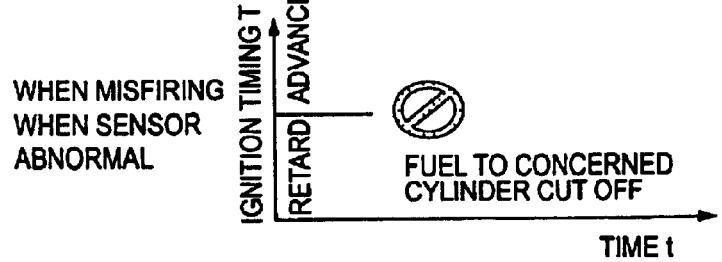

WHEN Pp ABNORMAL
WHEN COMPRESSION PRESSURE ABNORMAL

WHEN KNOCKING

WHEN Pp IS HIGH

WHEN Pp IS PROPER

WHEN Pp IS LOW

WHEN FLAME QUENCHING

WHEN MISFIRING
WHEN SENSOR ABNORMAL (a)   (b)

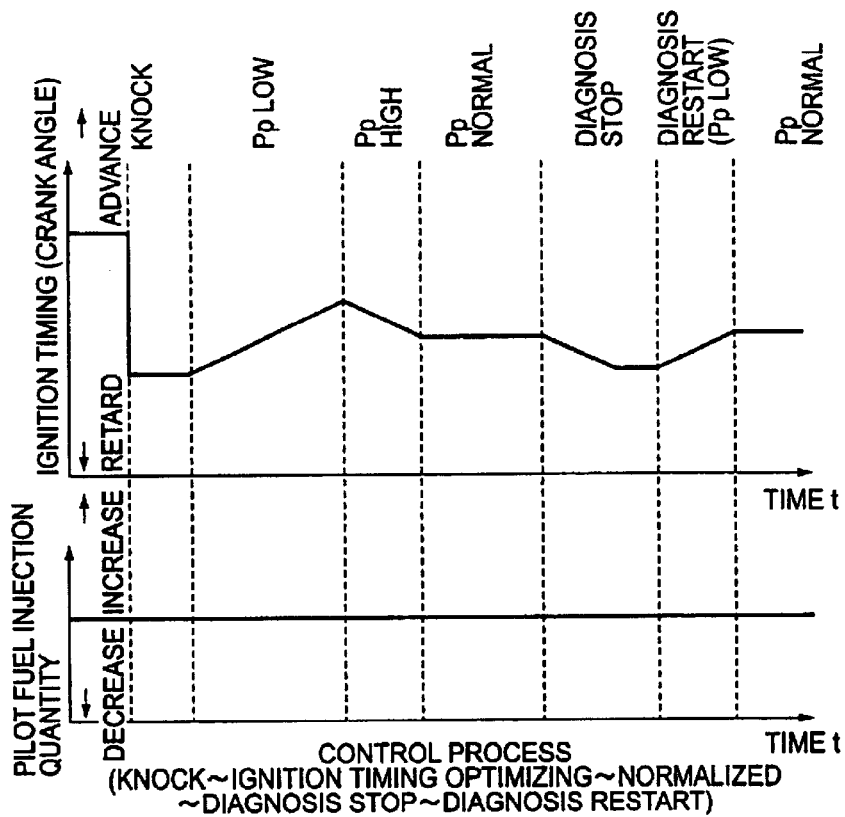
FIG.14(A)
FIG.14(B)
CONTROL PROCESS
(KNOCK~IGNITION TIMING OPTIMIZING~NORMALIZED
~DIAGNOSIS STOP~DIAGNOSIS RESTART)
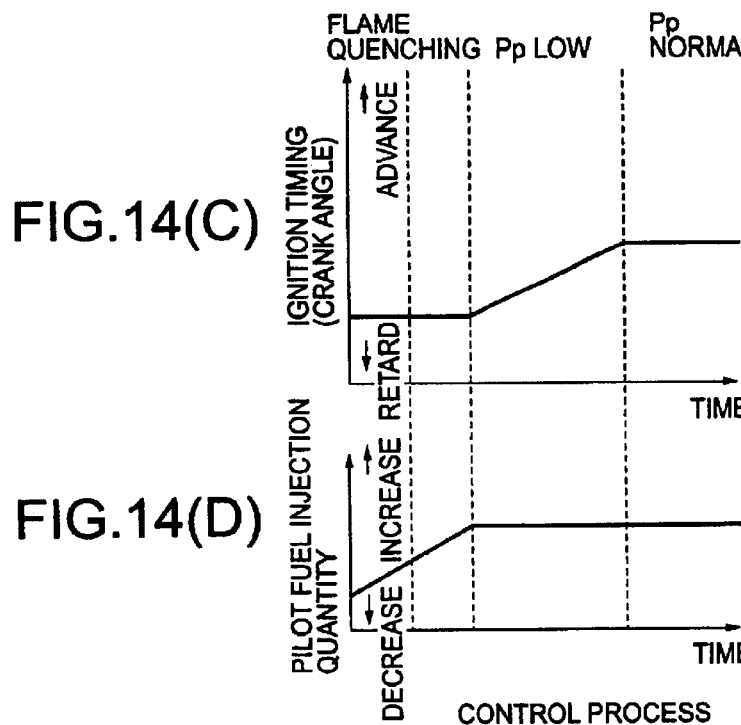
FIG.14(C)
FIG.14(D)
CONTROL PROCESS
(FLAME QUENCHING~INJECTION QUANTITY OPTIMIZING
~IGNITION TIMING OPTIMIZING~NORMALIZED)

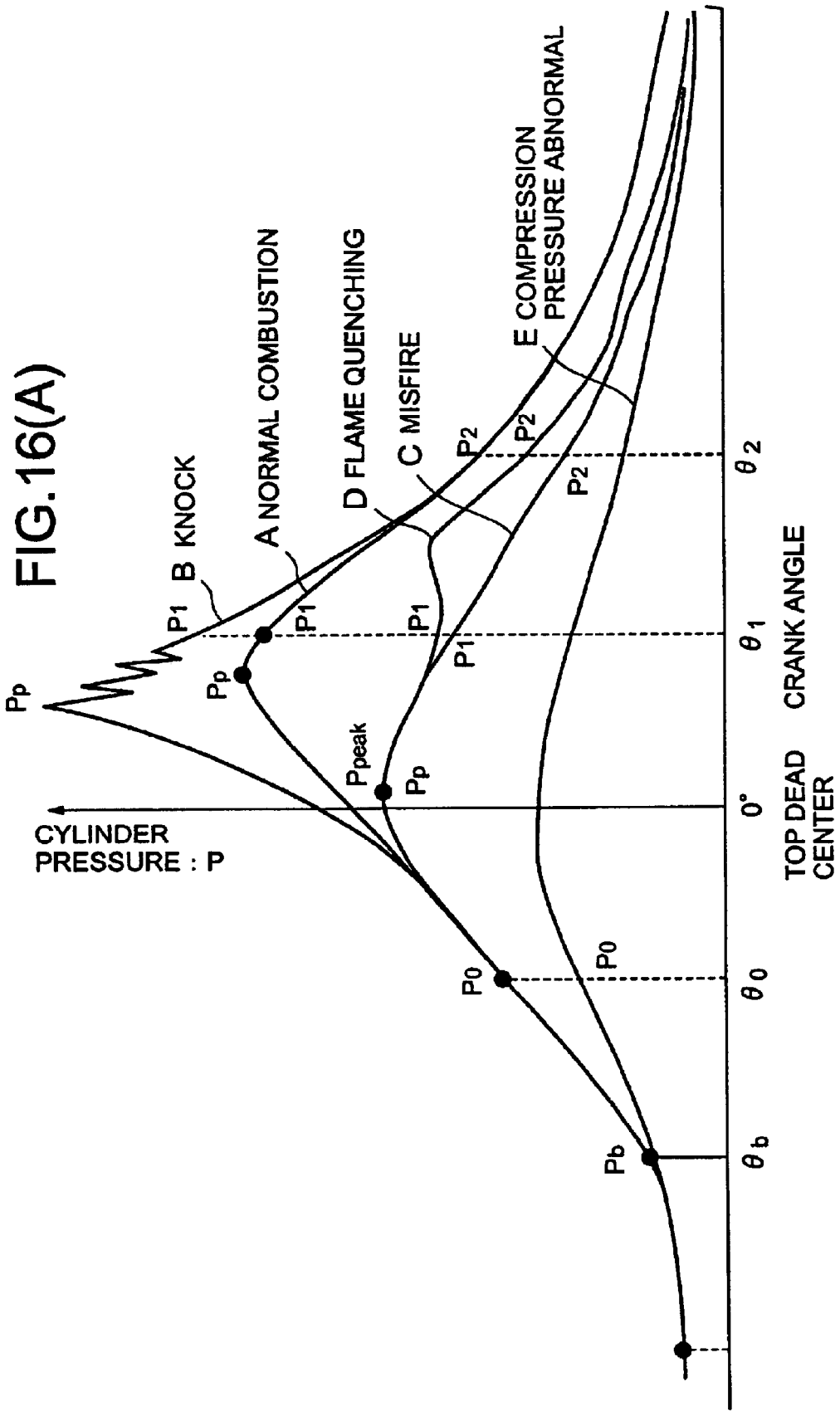

APPARATUS AND METHOD OF COMBUSTION DIAGNOSIS/CONTROL IN INTERNAL COMBUSTION ENGINE

TECHNICAL FIELD

The present invention relates to an apparatus and method for diagnosing and controlling combustion in an internal combustion engine including a gas engine which is constituted so that fuel gas is mixed with air and burned in the combustion chamber thereof.

BACKGROUND ART

It is demanded in an internal combustion engine, particularly in a gas engine which uses clean gas such as town gas as main fuel, to sense with reliability the occurrence of knock due to misfire, flame quenching or uneven mixture in the combustion chamber and to take a measure to deal with the phenomenon without delay. Further, it is required in a gas engine, petrol engine, and diesel engine, etc. to detect positively the excessive increase of the maximum combustion pressure in the combustion chamber, i.e. the maximum cylinder pressure or the reduction of compression pressure in addition to misfire, flame quenching, or knock for maintaining the durability, stability of performance of the engine.

It is inevitable in a gas engine, petrol engine, and diesel engine, etc. that the condition of combustion in the combustion chamber is detected, diagnosed, and the ignition timing of the fuel and the fuel injection quantity are properly controlled according to the result of the diagnosis. Further, it is required that, even when something wrong occurs with the maximum cylinder pressure detector, which is the detector of the condition of combustion, there is speedy recovery from the abnormal condition and resumption of normal diagnosis and control of combustion.

Combustion diagnosis systems for detecting and diagnosing the condition of combustion in the combustion chamber of internal combustion engines are disclosed in Japanese Patent Application Publication No.2000-110652, No.11-183330, and Japanese Patent No.2712332, etc.

According to Japanese Patent Application Publication No.2000-110652, a frequency band is determined according to the now-operating parameter of the internal combustion engine, the signal component of frequencies belonging to the extraction frequency band is extracted from the detected signal of cylinder pressure by means of a filter, and knock is judged to be occurring when the extracted component exceeds a threshold value.

In Japanese Patent Application Publication No.11-183330, misfire is judged to be present when the crank angle when the value of the pressure in the detected signal from the cylinder pressure detector is maximum, i.e. the crank angle at the maximum cylinder pressure is in the range of a predetermined crank angle and at the same time the mean effective pressure calculated from the detected cylinder pressure signal is below the predetermined value.

According to Japanese Patent No.2712332, engine rotation speed is detected to monitor the change thereof, and misfire is judged to be present when engine rotation speed has gone below the predetermined value.

However, in the invention of Japanese Patent Application Publication No.2000-110652, the signal component of frequencies belonging to the extraction frequency band is extracted by a filter means, so complicated computation processing such as changing of a pass band accompanying the treatment by the filter means is necessary. Therefore, the judgement of the occurrence of knock and control thereof are complicated. Further, as the absolute value of the cylinder pressure is necessary, the accuracy of the detected cylinder pressure decreases and correct diagnosis of combustion is impossible when the output level of the cylinder pressure sensor reduces totally due to deterioration, temperature drift, failed calibration, etc. of the cylinder pressure sensor.

Also in the invention of Japanese Patent Application Publication No.11-183330, the absolute value of the cylinder pressure is necessary for the judgement of misfire, so, in an analogous fashion as mentioned above, the accuracy of the detected cylinder pressure decreases and correct diagnosis of combustion is impossible when the output level of the cylinder pressure sensor reduces totally due to the deterioration, temperature drift, failed calibration, etc. of the cylinder pressure sensor.

In the invention of Japanese Patent No.2712332, the condition of combustion in the combustion chamber is detected and diagnosed by the indirect means of monitoring the change of rotation speed of the engine, so the accuracy of combustion diagnosis is low.

Further, in any of the prior inventions, an apparatus carries out combustion diagnosis only on one item, that is knock or misfire, and therefore the cost of the apparatuses becomes expensive to provide for a plurality of diagnosis functions.

In a multi-cylinder gas engine provided with an ignition device among these internal combustion engines, combustion efficiency increases and engine performance improves by advancing the fuel ignition timing. However, knock occurs more easily due to the earlier spontaneous ignition of unburned fuel. Therefore, it is required to operate with a fuel ignition timing with which knock is evaded and the maximum engine performance is maintained.

It is required, in a multiple-cylinder gas engine like this, to carry out the combustion diagnosis and combustion control so that, through the detection of the occurrence of misfire or flame quenching with good accuracy without delay from the detected data of the cylinder pressure, the fuel ignition timing and fuel injection quantity for the cylinder in which the misfire or flame quenching is occurring are adjusted to deal with the misfire or flame quenching so as to make the smooth operation of the other cylinders possible without being affected by the cylinders in which the misfire or flame quenching is occurring.

Further, in the multi-cylinder gas engine, it is required that, when abnormality occurs to any of the cylinder pressure detecting means for detecting the combustion condition in a combustion chamber due to any failure of the detecting means, the recovery of the function of the cylinder pressure detecting means is carried out while adjusting the fuel ignition timing and fuel injection quantity of the cylinder in which the abnormality in the pressure detecting means has occurred to conditions safe against abnormal combustion. After the recovery of the function of the pressure detecting means the normal combustion control is recovered automatically, and thus the occurrence of abnormality in any of the cylinder pressure detecting means can be dealt with without stopping the operation of the engine.

Further, in the multi-cylinder gas engine, it is required that the standard values (thresholds) of diagnosis items such as maximum cylinder pressure, maximum limit pressure of knock, and permissible pressure concerning occurrence of flame quenching are adjustable to match the operation condition of the engine and a high accuracy of diagnosis of the conditions of combustion is maintained.

Further, in the multi-cylinder gas engine, it is required that the occurrence of abnormality in any of the cylinder pressure detecting means can be detected at an early stage and automatically, swift recovery of the function of the cylinder pressure detecting means from the abnormal state is possible, and the combustion diagnosis is carried out smoothly.

However, none of prior arts, including the prior invention, provides a combustion diagnosis and combustion control means which can satisfy the requirements mentioned above.

Particularly, when the information of combustion diagnosis such as misfire and flame quenching is sent to a combustion control device, the method of sending the information of a plurality of cylinders digitally through a serial wire is not desirable, for the influence of a break in the wire and noise affects the control of all of the cylinders.

For this reason, a method of parallel transmittal of each individual combustion diagnosis information between the combustion diagnosis apparatus and combustion control apparatus as shown in FIG. 32 is thought of as a fail-safe. Several kinds of category's information ($2^n$ kinds) for each of m cylinders are necessary for sending digital signals, so $2^n \times m$ or more wires are required, which demands much expense in time and effort.

Further, in none of conventional combustion diagnosis systems of a multi-cylinder engine has there been used a display which can display always changing combustion conditions of all of the cylinders in a manner easily understandable to the worker. Because of the necessity of observing the waveform of cylinder pressure for investigating the details of abnormality of combustion, an oscilloscope must be provided for each cylinder. This not only results in a complicated display, but the connection of the combustion apparatus to each oscilloscope is difficult.

Further, the historical changes of combustion conditions of the engine can be understood by observing the result of each category of diagnosis, but as the result of diagnosis changes rapidly, it is not possible to observe the output result in time sequence.

DISCLOSURE OF THE INVENTION

The present invention was made in light of the problems of prior art mentioned above. An object of the invention is to provide a combustion diagnosis system of an internal combustion engine, with which combustion diagnosis such as knock, misfire, flame quenching, and excessively high cylinder pressure is possible by a single apparatus; computation processing is simple; and a highly accurate result of diagnosis is obtainable without being influenced by the changes in performance of the cylinder pressure detecting means due to the deterioration of cylinder pressure sensor, temperature drift, calibration deficiency, etc.

Another object of the invention is to provide a method and apparatus for diagnosing and controlling the combustion in an internal combustion engine with which the accuracy of diagnosis using detected cylinder pressure is improved; stable operation of the engine is possible with fuel ignition timing with which the occurrence of knock is evaded and maximum engine performance can be maintained; smooth operation of the engine is possible without being exposed to the influence by the combustion in the cylinder in which misfire or flame quenching is occurring by adjusting the combustion condition in the concerned cylinder to eliminate such abnormality; and the occurrence of abnormality in any of the cylinder pressure detecting means is detected without delay and adjustment of combustion conditions in the cylinder of which the cylinder pressure detecting means has become abnormal is made so that the function of the cylinder pressure detecting means can be recovered without stopping the engine.

A further object of the invention is to provide a combustion diagnosis system with which the control of all cylinders can be performed smoothly without being influenced by data transmitting wire break, noise, etc., when the diagnosis information such as misfire, flame quenching is sent from the combustion diagnosis apparatus to the combustion control apparatus and display.

A further object of the invention is to provide a combustion diagnosis system with which the number of wires corresponding to the number of cylinders suffices for the transmission of several kinds of information of combustion diagnosis of each of a plurality of cylinders between the combustion diagnosis apparatus and combustion control apparatus and the expense in time and effort for the connection of wires is largely saved.

A still further object of the invention is to provide a combustion diagnosis system for a multi-cylinder engine, with which always changing combustion conditions of all of the cylinders can be displayed in a manner easily understandable to an operator.

A yet further object of the invention is to provide a combustion diagnosis system for a multi-cylinder engine, with which the waveform of cylinder pressure of each cylinder for the detailed investigation of abnormality in combustion in each cylinder can be effectively displayed without using oscilloscopes for all of the cylinders.

A further object of the invention is to provide a combustion diagnosis system, with which the result of each category of diagnosis can be displayed in a manner easily understandable to the operator even when the result of diagnosis judged by a combustion diagnosis apparatus for a multi-cylinder engine is changing rapidly.

To achieve these objectives, an apparatus for diagnosing and controlling combustion of an internal combustion engine according to the present invention comprises a cylinder pressure detector for detecting the pressure in the combustion chamber, a means(step) for calculating the ratio of the maximum cylinder pressure $P_p$ to the compression pressure or pressures $P_0$ at one or a plurality of predetermined crank angles in the compression stroke ($P_p/P_0$) which is the maximum pressure ratio, the pressures being determined based on the pressures detected by the cylinder pressure detector, a means(step) for comparing the maximum pressure ratio ($P_p/P_0$) with the pressure ratios predetermined stepwise for each category of diagnosis (hereafter referred to as threshold pressure ratio) and a means (step) for diagnosing the condition of combustion such as the cylinder pressure condition in the combustion chamber by judging from the result of the comparison. Each of the threshold pressure ratios are changed as a function of the engine operating conditions including engine load, engine rotation speed, and inlet air temperature as necessary.

By the way, the means is suitable to be constructed in hardware or in software. The term "step" is added in parentheses, for the means is constructed in software in the embodiment described later.

To be more specific, the apparatus comprises following means (steps):

a means(step) for calculating the ratio of the maximum cylinder pressure $P_p$ to the compression pressure $P_0, P_3$ (hereafter represented by $P_0$) at one or a plurality of predetermined crank angles in the compression stroke ($P_p/P_0$), the pressures being determined based on the pressures detected by the cylinder pressure detector, and a means(step) which judges that the combustion is abnormal when the maximum pressure ratio ($P_p/P_0$) is equal to or exceeds the predetermined maximum permissible pressure ratio $P_{p0}$ or when the number of operation cycles $N_h$ when the maximum pressure ratio ($P_p/P_0$) is equal to or exceeds the predetermined pressure ratio $P_{h1}$ (i.e., when $P_{p/P0} \geq P_{h1}$) is equal to or exceeds the permissible number $N_{h0}$ (i.e., when $N_h \geq N_{h0}$);

a means (step) which judges that knock has occurred in the combustion chamber when the number of cycles $S_n$ in which said maximum pressure ratio ($P_p/P_0$) is equal to or exceeds the predetermined permissible pressure ratio of knock $P_{h2}$ (i.e., when $P_p/P_0 \geq P_{h2}$) in a plurality of cycles in the past is equal to or exceeds the permissible number $S_{n0}$ (i.e., when $S_n \geq S_{n0}$);

a means(step) which judges that misfire has occurred when the maximum pressure ratio $P_p/P_0$ is equal to or smaller than the predetermined minimum permissible pressure ratio $P_n$ (i.e., when $P_p/P_0 \leq P_n$) and at the same time the combustion pressure ratio ($P_1/P_0$) is equal to or smaller than the predetermined permissible pressure ratio $P_m$ of misfire (i.e., when $P_1/P_0 \leq P_m$);

a means (step) for calculating the ratio of the lower side pressure $P_2$ in the combustion stroke lower than the pressure $P_1$ at a predetermined crank angle in the combustion stroke to the pressure $P_0$ at a predetermined crank angle in the compression stroke $P_2/P_0$; and a means(step) which judges that flame quenching has occurred when the maximum pressure ratio is equal to or smaller than the predetermined minimum permissible pressure ratio Pn (i.e., when $P_p/P_0 \leq P_n$), at the same time the combustion pressure ratio $P_1/P_0$ is equal to or smaller than the predetermined minimum permissible pressure ratio $P_m$ (i.e., when $P_p/P_0 \leq P_m$) and the combustion pressure ratio $P_2/P_0$ is equal to or larger than the permissible pressure ratio $P_{m1}$ (i.e., when $P_2/P_0 \geq P_{m1}$).

In the configuration described above, it is preferable that a means (step) is provided which judges that the compression pressure $P_0$ is abnormal when the compression pressure $P_0$ at a predetermined crank angle in the compression stroke is equal to or lower than the predetermined permissible compression pressure $P_{c0}$ (i.e., when $P_0 \leq P_{c0}$).

According to the invention, combustion diagnosis of detecting the occurrences of knock, misfire, excessively high maximum cylinder pressure, or flame quenching is performed by single combustion diagnosis apparatus 100 by carrying out diagnosis using pressure ratios based on the compression pressure at a predetermined crank angle in the compression stroke, so all necessary combustion diagnoses can be performed with an apparatus of simple construction and low-cost.

As the combustion diagnosis is done using pressure ratios based on a compression pressure as described above, absolute values of cylinder pressures is unnecessary and normal diagnosis is maintained without reduction in accuracy even when the output level from the cylinder pressure detector totally decreases due to the deterioration, temperature drift, failed calibration, etc. of the cylinder pressure detector. Accordingly, the operation life of combustion diagnosis apparatus can be extended.

Further, combustion diagnosis with high accuracy is possible by using, for combustion diagnosis, the cylinder pressure signals for which filtration of only noise is done through a simple Low-pass filter by removing triggers. Therefore, complicated processing, such as a change of pass-band of the filter as has been with one of said prior arts, is unnecessary and the efficiency of operation of combustion diagnosis is enhanced.

Further, combustion diagnosis with high accuracy is possible by simple means(steps), as the combustion diagnosis is carried out directly by using only cylinder pressures detected.

Therefore, according to the embodiment, all of necessary combustion diagnoses such as knock, misfire, excessively high maximum cylinder pressure, and flame quenching are possible with simple equipment and in a simple manner, and a decrease in combustion performance of an engine can be detected with high accuracy and without delay.

The present invention is characterized in that the pressure in the combustion chamber is detected, the pressure difference $\Delta P$ between the detected pressure P and reference pressure $P_b$ which is the pressure at or before the beginning of compression including inlet air pressure ($\Delta P = P - P_b$) is calculated for every crank angle, and a standardized pressure ratio which is the ratio of the pressure difference $\Delta P$ to the pressure difference $\Delta P_0$, i.e. $\Delta P/\Delta P_0$, $\Delta P_0$ being the pressure difference between the pressure $P_0$ at one or a plurality of predetermined crank angles in the compression stroke and the reference pressure $P_b$ ($\Delta P_0 = P - P_b$), is used for the diagnosis of the combustion conditions such as the condition of cylinder pressure in the combustion chamber.

As an apparatus suited for effecting the method of diagnosing and controlling combustion is proposed an apparatus for diagnosing and controlling combustion of an internal combustion engine which is constituted such that fuel gas is mixed with air and burned in the combustion chamber/There are provided; a cylinder pressure detector for detecting the pressure in the combustion chamber, a crank angle detector for detecting crank rotation angles of the engine, a means (step) for calculating the pressure difference $\Delta P$ between detected cylinder pressure P and the reference pressure $P_b$ at or before the beginning of compression including inlet pressure ($\Delta P = P - P_b$) from the cylinder pressure detected by the cylinder pressure detector for every crank angle, a means(step) for calculating standardized pressure ratio which is the ratio of said pressure difference $\Delta P$ to the pressure difference $\Delta P_0$, i.e. $\Delta P/\Delta P_o$, a $P_0$ being the pressure difference between the pressure $P_0$ at one or a plurality of predetermined crank angles in the compression stroke and the reference pressure $P_b$ ($\Delta P_0 = P - P_b$), a means (step) for diagnosing the condition of combustion such as the cylinder pressure condition in the combustion chamber using the standardized pressure ratio $\Delta P/\Delta P_0$, and a combustion control apparatus for controlling the combustion condition of the engine on the basis of the result of the combustion condition diagnosis outputted from the combustion condition diagnosis means (step).

According to the invention, absolute cylinder pressure is not required for the diagnosis because a standardized pressure ratio $\Delta P/\Delta P_0$, based on the pressure difference $\Delta P_0$ between pressure P and the pressure $P_b$ ($\Delta P_0 = P - P_b$), $P_b$ being the pressure at or before the beginning of compression including inlet air pressure of which the fluctuation due to outside conditions such as atmospheric condition, is small during the operation of the engine. Normal diagnosis can be carried out maintaining the specified accuracy of diagnosis without reducing the accuracy even when the output level of the cylinder pressure detector is totally reduced or increased due to the deterioration thereof, temperature drift, calibration deficiency, etc.

The present invention is characterized in that the engine is stopped when the standardized cylinder pressure ratio $\Delta P/\Delta P_0$ at the maximum cylinder pressure $P_p$, that is the standardized maximum pressure ratio $\Delta P_p/\Delta P_0$, is equal to or exceeds the predetermined maximum permissible pressure ratio $P_{p0}$ (i.e., when $\Delta P_p/\Delta P_0 \geq P_{p0}$), and for example, it is suitable to stop the engine when the pressure difference $\Delta P_0$ at one or a plurality of predetermined crank angle is equal to or lower than a predetermined permissible compression pressure difference $P_{c0}$ (i.e, when $\Delta P_0 \leq P_{c0}$)

It is also suitable that fuel(including the pilot fuel injected into the sub-chamber of a gas engine) ignition timing is retarded by a certain crank angle when the standardized maximum cylinder pressure ratio $\Delta P_p/\Delta P_0$ is equal to or exceeds the predetermined maximum reference pressure ratio $P_{sh}$ (i.e., when $\Delta P_p/\Delta P_0 \geq P_{sh}$), and fuel ignition timing is advanced by a certain crank angle when the standardized maximum cylinder pressure ratio $\Delta P_p/\Delta P_0$ is equal to or below the predetermined minimum reference pressure ratio $P_{s1}$ (i.e., when $\Delta P_p/\Delta P_0 \geq P_{s1}$).

In this case, as an apparatus suited for effecting the method of diagnosing and controlling combustion, the combustion diagnosis apparatus is provided with a means (step) for comparing the standardized maximum cylinder pressure ratio $\Delta P_p/\Delta P_0$ with predetermined maximum permissible pressure ratio $P_{p0}$. The combustion control apparatus is provided with a stopping means (step) to activate an engine stopper to halt the operation of the engine when the result of comparison in the combustion diagnosis apparatus is $\Delta P_p/\Delta P_0 \geq P_{p0}$.

It is preferable in the invention that the combustion diagnosis apparatus is provided with a means(step) for comparing the standardized maximum pressure ratio $\Delta P_p/\Delta P_0$ with the maximum value $P_{sh}$ of maximum reference pressure ratio and with the minimum value $P_{s1}$ of maximum reference pressure ratio. The combustion control apparatus is provided with a means(step) for retarding the fuel ignition timing by a certain crank angle when the result of the comparison is $\Delta P_p/\Delta P_0 > P_{sh}$ and for advancing the ignition timing by a certain crank angle when the result of said comparison is $\Delta P_p/\Delta P_0 \leq P_{s1}$.

According to the invention, by stopping the engine by allowing the combustion control apparatus to activate the engine operation stopper when a diagnosis result has been outputted from the combustion diagnosis apparatus that the standardized maximum pressure ratio $\Delta P_p/\Delta P_0$ is equal to or exceeds the predetermined permissible maximum pressure ratio $P_{p0}$, the detection of the excessive high maximum cylinder pressure and the action to deal with that can be taken exactly without delay. Therefore, engine breakage or reduction of engine durability due to the excessive high cylinder pressure can be prevented with reliability.

Further, when the standardized maximum pressure ratio $\Delta P_p/\Delta P_0$ is judged to be equal to or exceeds the maximum reference pressure ratio $P_{sh}$, the fuel ignition timing is retarded by a certain crank angle by the combustion control apparatus, and when the standardized maximum pressure ratio $\Delta P_p/\Delta P_0$ is judged to be smaller than the maximum reference pressure ratio $P_{sh}$, the fuel ignition timing is advanced by a certain crank angle by the combustion control apparatus. Therefore, the cylinder pressure is maintained below the maximum reference pressure and the expected engine performance is maintained, resulting in suppression of increased generation of NOx due to excessively high combustion temperature.

The method of diagnosing and controlling combustion according to the present invention is characterized in that the fuel ignition timing is retarded by a certain crank angle when the standardized maximum pressure ratio $\Delta P_p/\Delta P_0$ is equal to or exceeds the predetermined permissible pressure ratio $P_{h2}$ of knock (i.e., when $\Delta P_p/\Delta P_0 \geq P_{h2}$)

For effecting the method of diagnosing and controlling combustion, the apparatus is composed such that the combustion diagnosis apparatus is provided with a means (step) for comparing the standardized maximum pressure ratio $\Delta P_p/\Delta P_0$ with the predetermined permissible pressure ratio $P_{h2}$ of knock and judging that knock has occurred when said standardized maximum pressure ratio $\Delta P_p/\Delta P_0$ is equal to or exceeds the permissible pressure ratio $P_{h2}$ of knock. The combustion control apparatus is provided with a means(step) for retarding the fuel ignition timing by a certain crank angle upon receipt of a judgement signal of the occurrence of knock.

According to the invention, if the result of diagnosis by the combustion diagnosis that the standardized maximum pressure ratio $\Delta P_p/\Delta P_0$ reaches the predetermined permissible value for knock, i.e. the maximum limit of maximum cylinder pressure ratio at which the engine performance is maintained at maximum while evading the occurrence of knock, the fuel ignition timing is retarded through the combustion control apparatus. As a result, the engine performance is controlled optimally to operate with high performance in the condition just before the occurrence of knock.

According to the method of diagnosing and controlling combustion of the invention, misfire is judged to have occurred in the combustion chamber and the fuel injection for the cylinder in which misfire is judged to have occurred is shut off when the standardized maximum pressure ratio $\Delta P_p/\Delta P_0$ is equal to or below the predetermined minimum permissible pressure ratio $P_n$ of misfire (i.e., when $\Delta P_p/\Delta P_0 \leq P_n$)

As an apparatus for effecting the method of the invention said combustion diagnosis apparatus is provided with a means(step) for comparing the standardized maximum pressure ratio $\Delta P_p/\Delta P_0$ with the predetermined permissible pressure ratio of misfire and judging that misfire has occurred in the combustion chamber when the standardized maximum pressure ratio $\Delta P_p/\Delta P_0$ is equal to or smaller than the minimum permissible pressure ratio $P_n$ of misfire. The combustion control apparatus is provided with a means(step) for cutting off the fuel injection to the cylinder in which misfire has occurred upon receipt of a judgement signal of the occurrence of misfire.

According to the invention, when a diagnosis result has been outputted from the combustion diagnosis apparatus that the number of continual cycles in which the standardized maximum pressure ratio $\Delta P_p/\Delta P_0$ reaches the predetermined permissible pressure ratio of misfire reaches the predetermined permissible number of continual cycles, the fuel injection to the concerned cylinder in which misfire has occurred is cut off.

Therefore, the occurrence of misfire is detected with reliability and without delay and measures can be taken to deal with the situation, that is, to stop the fuel injection to the concerned cylinder, through which the operation of the other cylinders can be continued without being influenced by the concerned cylinder.

The method of diagnosing and controlling combustion according to the present invention is characterized in that flame quenching is judged to have occurred and the fuel injection quantity for the cylinder in which flame quenching is judged to have occurred is increased when the standardized maximum pressure ratio $\Delta P_p/\Delta P_0$ and a standardized combustion pressure ratio $\Delta P_1/\Delta P_0$ in the combustion stroke are equal to or smaller than the minimum permissible pressure ratio $P_n$ and permissible pressure ratio $P_m$ of misfire, respectively (i.e., when $\Delta P_p/\Delta P_0 \leq P_n$ and $\Delta P_p/\Delta P_0 \leq P_m$), and a combustion pressure ratio $\Delta P_2/\Delta P_0$ is larger than permissible pressure ratio $P_{m1}$.

As the apparatus for effectuating the method of the present invention, the apparatus is composed such that the combustion diagnosis apparatus is provided with a means(step) for outputting a judgement signal of the occurrence of flame quenching in the combustion chamber when the standardized maximum pressure ratio $\Delta P_p/\Delta P_0$ and a standardized combustion pressure ratio $\Delta P_1/\Delta P_0$ in the combustion stroke are smaller than the permissible minimum pressure ratio $P_n$ and permissible pressure ratio $P_m$ of flame quenching and at the same time combustion pressure ratio $\Delta P_2/\Delta P_0$ is equal to or exceeds the permissible pressure ratio $P_{m1}$. The combustion control apparatus is provided with a means(step) for increasing the fuel quantity injected to the cylinder in which flame quenching has occurred upon receipt of the occurrence of flame quenching.

According to the invention, when a diagnosis result has been outputted from the combustion diagnosis apparatus that the standardized maximum pressure ratio $\Delta P_p/\Delta P_0$ and combustion pressure ratio $\Delta P_1/\Delta P_0$ are equal to or smaller than permissible minimum pressure ratio $P_n$ and permissible pressure ratio of misfire $P_m$, respectively, and that the standardized combustion pressure ratio $\Delta P_2/\Delta P_0$ is equal to or larger than permissible pressure ratio of flame quenching $P_{m1}$, the fuel injection quantity to the concerned cylinder in which flame quenching has occurred or, for example, pilot fuel injection quantity in the case of a gas engine having a sub-combustion chamber to be injected with pilot fuel, is increased. Thus, the occurrence of flame quenching is detected with reliability without delay and measures can be taken to deal with the situation, that is, to increase the quantity of fuel injection to the concerned cylinder, through which the continuation of misfire can be prevented and the operation of the other cylinders can be continued without being influenced by the concerned cylinder.

In the method of the invention, by determining threshold values for diagnosing combustion as a function of engine operating conditions, threshold pressure ratios for diagnosis categories such as permissible maximum cylinder pressure ratio, permissible compression pressure ratio, permissible pressure ratio of knock, misfire, and flame quenching can be changed according to detected engine load, engine rotation speed, inlet air temperature, etc.

Accordingly, the threshold values can be adjusted to match the engine operating conditions, and accurate combustion diagnosis can be effectuated.

It is preferable in the method of diagnosing and controlling combustion according to the present invention that when abnormality is detected concerning a cylinder pressure detector which detects the pressure in a combustion chamber and inputs it to the combustion diagnosis apparatus, the fuel ignition timing of the concerned cylinder of which the cylinder pressure detector is abnormal is retarded by a certain crank angle to a safety position for combustion through a combustion control apparatus which performs combustion control including the controlling of ignition timing and fuel injection quantity. After the pressure detector is recovered by replacement or repair thereof, the combustion control apparatus is allowed to return to normal operation to restore the fuel ignition timing of the concerned cylinder to normal timing.

By the invention, when a diagnosis result has been outputted from the combustion diagnosis apparatus that the cylinder pressure detector is abnormal, the fuel injection timing of the concerned cylinder of which the pressure detector is abnormal is retarded by a certain crank angle to a safety range for combustion while leaving the abnormal state of the pressure detector as it is. After the pressure detector is recovered, the combustion diagnosis apparatus automatically recovers normal operation and allows the combustion control apparatus to operate normally to restore the normal injection timing of the concerned cylinder.

Therefore, when abnormality occurs in a cylinder pressure detector, the pressure detector is repaired or recovered while the injection timing of the concerned cylinder is adjusted to a safe timing for combustion, and after the recovery of the pressure detector, the normal combustion control is recovered, so the abnormal pressure detector can be dealt with without halting the operation of the engine.

The method of diagnosing and controlling combustion of the present invention is characterized in that a plurality of kinds of abnormality are judged in a predetermined crank angle range in the suction~combustion stroke. A condition not sufficient for any one of the kinds of abnormality continues for a predetermined plurality of number of cycles i, the concerned cylinder pressure detector is judged to be abnormal.

Concretely, the steps comprise:
(a) a step for judging whether the detected pressure by the cylinder pressure detector 1 is within the range PTa~PTb or not during the whole crank angle of one cycle, (b) a step for judging whether the detected pressure is within the range PSb (permissible maximum inlet pressure)~Psa (permissible minimum inlet pressure) or not in the suction stroke, (c) a step for judging whether crank angle Ppang at the maximum pressure $P_p$ is within the crank angle range corresponding to combustion range Aa~Ab or not, and (d) a step for judging whether the standard deviation Pb$\sigma$ of $P_b$'s of past n cycles, $P_b$ being reference pressure at or before the beginning of compression including inlet air pressure, is smaller than a predetermined value $\epsilon$ or not.
(b)

According to the invention, by judging in step (a) whether the detected pressure is within the range PTa~PTb or not during the whole crank angle of one cycle, the presence or absence of fundamental abnormality in the pressure detector can be judged. In step (b) is judged whether the cylinder pressure in the suction stroke is between the maximum permissible value PSb and minimum permissible value PSa, so the occurrence of drift due to the change-over-time of the detector can be detected in the condition of nearly constant suction pressure. Further, in step (c), as whether the crank angle Ppang at the maximum cylinder pressure is within the crank angle range Aa~Ab corresponding to the combustion range or not is judged, it can be ascertained if the cylinder pressure is detected without deviation in relation to crank angle or not. Further, in step (d), since whether the standard deviation of reference pressure at or before the beginning of compression for a plurality of cycles, the reference pressure being by its nature substantially constant, is within permissible value $\epsilon$ or not, misdiagnosis due to stationary noise can be avoided.

Furthermore, since the pressure detector is judged to be abnormal only after a state in which any one of the conditions (a)~(d) described above is not satisfied continues to occur for a plurality of times, the influence of instantaneous trigger noise can be neglected.

Therefore, according to the invention, abnormality in the pressure detector is judged through a plurality of detecting methods from various facets. Moreover, the detector is determined to be abnormal only after dubious phenomenon is detected for a plurality of times, so the abnormality can be judged with high accuracy without misjudgment owing to trigger pulse, etc., irrelevant to the abnormality of the pressure detector, resulting in a smooth combustion diagnosis by the elimination of misjudgment.

The present invention is characterized in that there are provided a means (step) for calculating the pressure difference $\Delta P$ between detected cylinder pressure P detected for every crank angle in the combustion crank angle range and the reference pressure $P_b$ at or before the beginning of compression including inlet pressure($\Delta P = P - P_b$). A means (step) calculates standardized cylinder pressure ratio, which is the ratio of the pressure difference $\Delta P$ to the pressure difference $\Delta P_0$, i.e. $\Delta P/\Delta P_0$, $\Delta P_0$ being the pressure difference between the pressure $P_0$ at one or a plurality of predetermined crank angle in the compression stroke and the reference pressure $P_b$ ($\Delta P_0 = (P_0 - P_b)$). A combustion diagnosis apparatus is provided with a pressure/analog voltage converting means (step) for outputting at least a part of the result of diagnosis as analog information when diagnosing the condition of combustion such as cylinder pressure condition in the combustion chamber using said standardized cylinder pressure ratio $\Delta P/\Delta P_0$. A combustion control apparatus controls the combustion condition of the engine by reconverting the analog information outputted from the combustion diagnosis apparatus to pressure information. Engine stopping or fuel ignition timing or the injection quantity of the pilot fuel and gas fuel is controlled based on the diagnosis result of the pressure information reconverted from the analog information.

It is suitable that the combustion is diagnosed on the basis of each threshold value determined for each diagnosis category information using the cylinder pressure ratio $\Delta P/\Delta P_0$ in the predetermined combustion crank angle range. To be more specific, it is suitable that the threshold values determined for every diagnosis category information are determined so that the level of each threshold decreases stepwise, and information of a different diagnosis category can be judged at a different threshold level. For example, a pressure detection range is determined near the crank angle of maximum combustion pressure, the threshold for each diagnosis category information is $P_{p0}$ and $P_{h1}$ for abnormal Pmax, $P_{h2}$ for knock, $P_n$ for misfire and flame quenching, and the level of each threshold value is decreased in orderly sequence of $P_n \leq P_{s1} \leq P_{sh} \leq P_{h2} \leq P_{h1} \leq P_{p0}$.

Signals of the result of diagnosis transmitted from the combustion diagnosis apparatus to the combustion control apparatus are composed of analog levels, and each analog level for each diagnosis category is determined to decrease stepwise so that the information of a different category is able to be discriminated by the analog level on the combustion control apparatus side. The analog levels for each of the diagnosis categories are determined so that the level for transmitting the information of diagnosis category of normal combustion state is positioned in the middle of the levels, the levels for transmitting the information of abnormal maximum cylinder pressure or compression pressure, etc., which are generally related to engine conditions as a whole, are set to values in higher level range, and the levels for transmitting the information of misfire, flame quenching, abnormal sensor, a break in wire and so on, which are generally experienced in an individual cylinder, are set to values in lower level range. By determining each level like this, simple and reliable transmission of information is effectuated, and even if an analog level at the transition instant of analog level or erroneous information is read, critical malfunction of the control apparatus is evaded.

To be more specific, it is suitable that each of the analog levels, that is, Cp: the analog level for transmitting abnormal Pmax judgement, Ce: analog level for compression pressure judgement, Ck: analog level for knock judgement, Cq: analog level for flame judgement quenching, Cm: analog level for misfire judgement, and Cx: analog level for abnormal sensor judgement, is determined to decrease stepwise in the orderly sequence of Cp>Ce>Ck>Cq>Cm>Cx.

It is suitable that, when the range of normal combustion pressure or pressure ratio of each cylinder, the pressure or pressure ratio being between the threshold for knock and that for flame quenching, is transmitted to the combustion control apparatus side at an analog level, the pressure (pressure ratio) is converted to a stepless analog level signal corresponding with the pressure (pressure ratio) and the steplessly controlled analog signal is transmitted to the combustion control apparatus side.

It is also suitable, when applying to a multi-cylinder engine, that a number of analog signal transmission wires corresponding to the number of cylinders are connected between the combustion diagnosis apparatus and combustion control apparatus, the diagnosis result of each category are transmitted in serial order on each analog level determined to decrease stepwise, and the diagnosis category is judged or the combustion pressure or pressure ratio is judged based on the corresponding analog level on the combustion control apparatus side.

A knocking state which has been difficult to detect hitherto can be grasped indirectly by the ratio of pressure differences as a measure, and engine operation near knock limit is always possible, resulting in increased engine efficiency. The combustion diagnosis is not influenced by the change in temperature of the pressure sensor and abnormal combustion and an abnormal pressure sensor such as a broken sensor or a break in a wire can be detected without influence by the drift due to the change over time of the pressure sensor.

The number of signal transmission wires between the combustion diagnosis apparatus and combustion control apparatus is reduced compared with the conventional method of connection. If a break in a wire occurs, the influence thereof is limited only to the concerned cylinder. Besides, the broken wire is able to be identified, which has been impossible with conventional digital signal transmission wires, because the analog value on the wire becomes zero level, which belongs to no category of diagnosis.

By adopting stepless control to effect feedback of the deviation in pressure from the target value of cylinder pressure, more carefully thought out control is possible, resulting in further increased engine efficiency.

For example, a stepless analog level is determined for a normal combustion range in FIG. 23(A) and FIG. 23(B). The data of the result of diagnosis $\{P_{h2} \sim P_n\}$ is converted to analog information $\{Ck \sim Cq\}$ to be transmitted as a substitute for the diagnosis result, and it is reconverted to $\{P_{h2} \sim P_n\}$. By determining a necessary increment or decrement $\Delta T$ of the injection timing for keeping the cylinder pressure ratio in the normal range, the injection timing of each cylinder is properly changed for each cycle.

The present invention is characterized in having a display apparatus for representing detected cylinder pressure-crank angle curve inputted to the combustion diagnosis apparatus. The display apparatus comprise a first ring memory provided on the diagnosis apparatus side for memorizing the cam top crank angle of a reference cam and the cylinder pressure-crank angle curve, and a second ring memory provided on the display apparatus side for memorizing the cylinder pressure-crank angle curve in a certain crank angle range of each cylinder and a display. The first ring memory on the diagnosis side has a means (step) to start the program by an interrupt of the signal from the crank angle detector after the detection of the cam top crank angle of the reference cam and write in the cylinder pressure wave form, which indicates combustion condition, at a certain interval of crank angle to the ring memory in the determined area corresponding to each cylinder. The pressure-crank angle curves of all cylinders are read out from the determined area of the second ring memory and these pressure curves are displayed on the display with the pressure curves shifted so that each curve does not overlap.

It is suitable that the cylinder pressure-crank angle curves of all cylinders are written into the first ring memory on the diagnosis apparatus side in synchronization with the crank angle at the moment-to-moment detection of the pressure with the cylinder pressure detector (sensor). On the other hand, the cylinder pressure-crank angle curves of all cylinders are written in the second ring memory after the cam top crank angle of the next cycle after the previous cycle(720°) is completed, is detected, and the memorized pressure curves are represented on the display.

According to the invention, visualization of combustion condition changing moment-to-moment is possible on an oscilloscope (display), and the cylinder pressure-crank angle data overlapped with regard to time is easily recognizable. It becomes possible to observe pressure curves of a plurality of cylinders by transmitting the data to the display apparatus in serial order while diagnosing combustion.

BRIEF DESCRIPTION OF THE DRAWINGS

FIG. 10(A)~FIG. 10(F) each is the control-chart(1) for every item of the combustion diagnosis/control in the embodiment.

FIG. 14(A)~FIG. 14(D) are diagrams showing fuel ignition timing and fuel injection quantity in the embodiment.

FIG. 16(A) is a diagram showing cylinder pressure curves of the gas engine(curves for explanation).

BEST MODE OF EMBODIMENT OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only, and not as limitative of the scope of the present invention.

Figure 1:
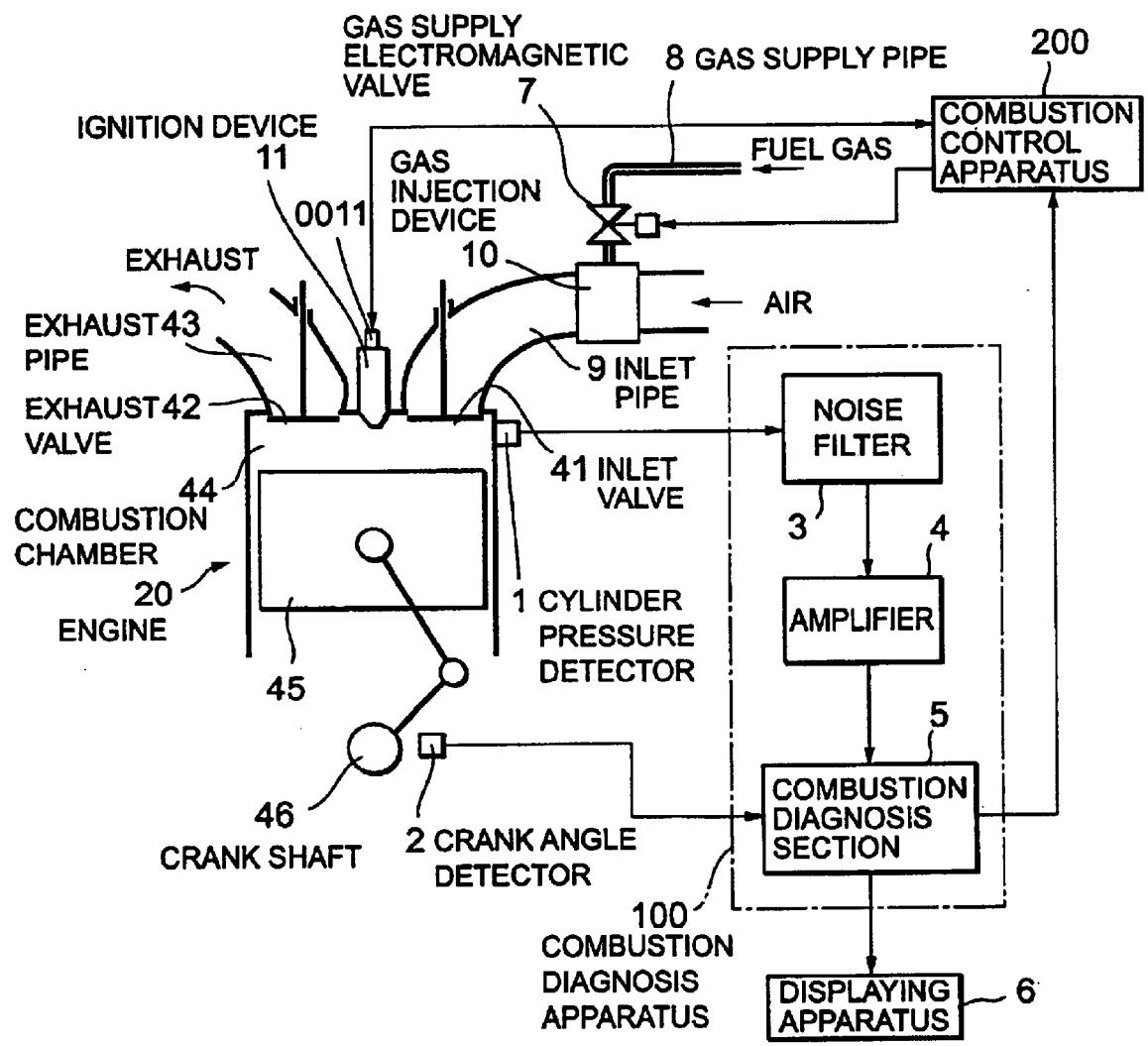
FIG. 1 is a diagrammatic representation showing the total configuration of the combustion diagnosis system of a gas engine of an embodiment according to the present invention.

In FIG. 1 showing an embodiment, reference number 20 is the main body of a gas engine, 45 is a piston, 46 is a crankshaft, 44 is a combustion chamber, 41 is an inlet valve, 42 is an exhaust valve, and 43 is an exhaust pipe.

A gas injection device 10 is provided midway along an inlet pipe 9 for injecting fuel gas into the inlet air flowing in the inlet pipe 9 to be charged into the cylinder through the inlet valve 41.

Reference number 8 is a gas supply pipe for connecting a fuel gas tank (not shown) accommodating fuel gas and the gas injection device 10. Reference number 7 is a gas supply electromagnetic valve provided at the entrance of the gas into the gas injection device 10. The opening of the valve is controlled under a control signal from an electromagnetic valve control device (not shown in the drawing) to adjust the flow of the gas fuel. The valve is also controlled under a control signal from a combustion control apparatus 200 (discussed later) to shut-off or adjusted the opening.

Reference number 11 is an ignition device for torch-igniting the pilot fuel injected into a sub-chamber (not shown in the drawing) from a pilot fuel injection valve 0011 to promote the combustion of a lean fuel gas/air mixture in the main combustion chamber.

The gas pressure in the combustion chamber, i.e. cylinder pressure, is detected with a cylinder pressure detector 1, and crank angle is detected with a crank angle detector 2.

Reference number 100 is a combustion diagnosis apparatus composed of a noise filter 3, an amplifier 4 for amplifying the cylinder pressure signal passed through the noise filter, and a combustion diagnosis section 5.

The noise filter 3 is composed of a low-pass filter for filtering out the noise on the signal inputted from the cylinder pressure detector 1.

The combustion diagnosis section 5 diagnoses the combustion condition in the combustion chamber 44 on the basis of the cylinder pressure signal amplified by the amplifier 4 with the assistance of the crank angle signal from the crank angle detector.

Reference number 200 is a combustion control apparatus to which is inputted the signal of the result of diagnosis at the combustion diagnosis section 5, and which shuts off or controls the opening of the gas supply electromagnetic valve 7 and also controls the action of the ignition device 11.

The result of diagnosis by the combustion diagnosis section 5 is displayed on a displaying apparatus 6. It is suitable that an alarm which generates an alarm based on the result of diagnosis is connected to the combustion diagnosis apparatus 100.

On the operation of the gas engine of this configuration, torch-ignition is done in the ignition device 11, a gas valve (not shown) is unclosed and the fuel in a fuel gas tank(not shown) is supplied to the gas injection device 10, the fuel being adjusted in pressure by a gas pressure adjusting device (not shown). By the opening of the gas supply valve 7, the fuel is injected into the air flowing through the gas injection device 10 provided midway along said inlet pipe 9 to be mixed with the flowing air. The mixture is introduced into the combustion chamber 44 through the inlet valve 41 and ignited by a flame spouting from the ignition device 11 to be burned in the combustion chamber 44.

The working of the combustion diagnosis apparatus will be explained below.

The gas pressure in the combustion chamber 44 detected by the cylinder pressure detector 1 is inputted to the noise filter 3 composed of a super low-pass filter in the combustion diagnosis apparatus 100. High frequency noises are filtered at the noise filter 3, and the cylinder pressure signal, smoothed through the filtration, is amplified by the amplifier 4 to be inputted to the combustion diagnosis section 5.

To the combustion diagnosis section 5 is also inputted the crank angle signal from the crank angle detector 2.

Next, a first example of a combustion diagnosis operation by the combustion diagnosis apparatus 100 will be explained with reference to a first example of a combustion control flowchart shown in FIG. 2 and cylinder pressure curves shown in FIG. 4.

Figure 4:
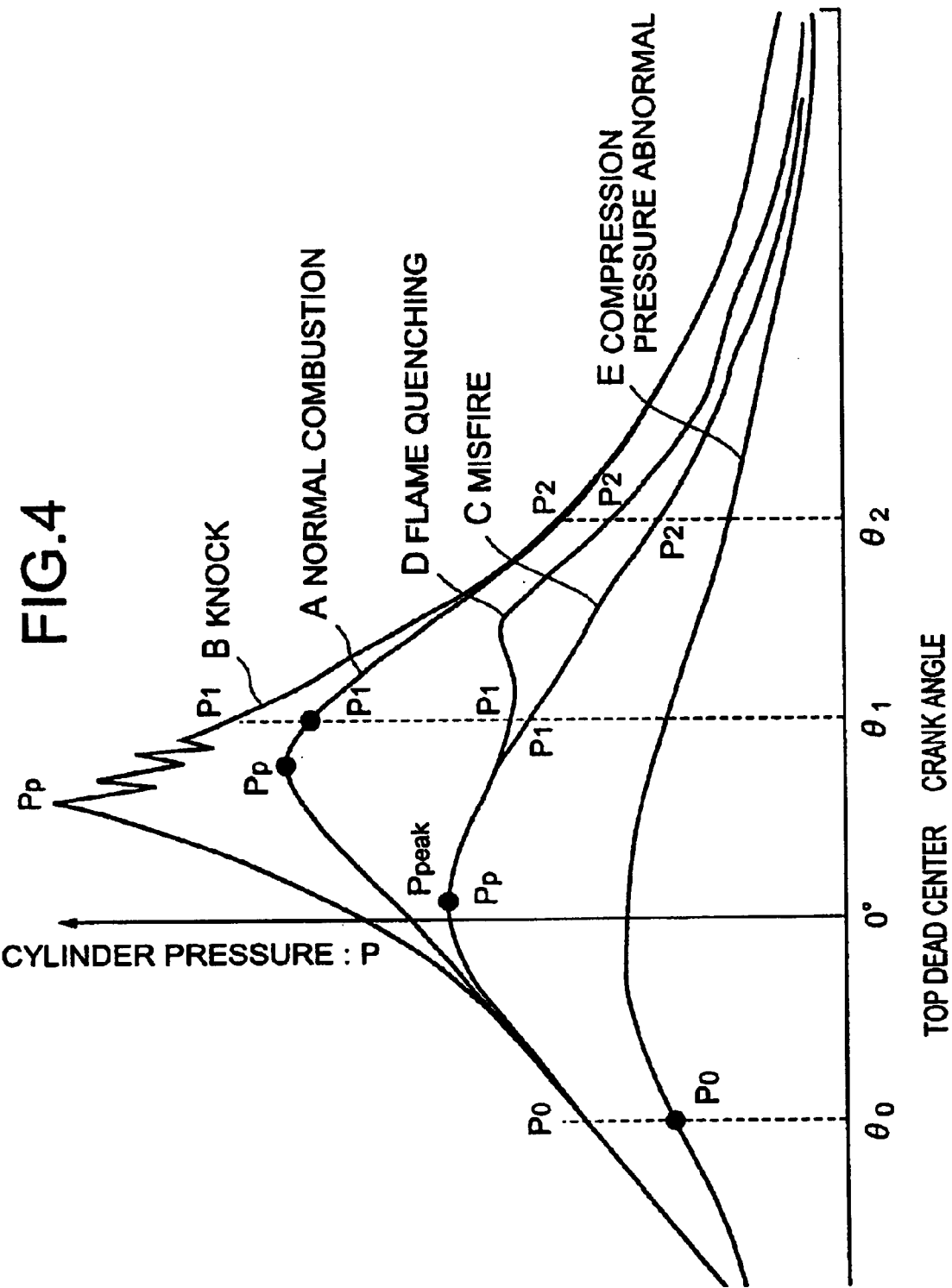
FIG. 4 is a diagram showing the relation of cylinder pressure to crank angle of a gas engine.

The cylinder pressure-crank angle curves as shown in FIG. 4 are obtained in the combustion diagnosis section 5 from the cylinder pressure inputted from the cylinder pressure detector 1 and the crank angle inputted from the crank angle detector 2.

Curve A in FIG. 4 is a cylinder pressure curve when the combustion is normal.

First the compression pressure $P_0$ at a predetermined crank angle in the compression stroke shown in FIG. 4 is compared in a compression pressure judging means(step) with the predetermined permissible compression pressure $P_{c0}$, which is the minimum permissible pressure in the compression stroke. It is judged that the compression pressure $P_0$ is abnormally low compared to the normal value, due to troubles such as gas leakage or mechanical troubles, when the pressure $P_0$ is equal to or lower than the permissible compression pressure $P_{c0}$, i.e. when $P_0 \leq P_{c0}$ (E1). Curve E in FIG. 4 is a cylinder pressure curve when the compression pressure is abnormally low.

Next the ratio of the maximum cylinder pressure $P_p$ to the compression pressure $P_0$ at a predetermined crank angle in the compression stroke $P_p/P_0$ is calculated and the calculated maximum pressure ratio $P_p/P_0$ is compared in a maximum cylinder pressure judging means (step) with the predetermined permissible maximum pressure ratio $P_{p0}$, which is the maximum permissible maximum pressure ratio. It is judged that the maximum cylinder pressure is abnormally high compared to the design value (normal value) when the calculated maximum pressure ratio $P_p/P^0$ is equal to or exceeds the permissible maximum pressure ratio $P_{p0}$, i.e. when $P_p/P_0 \geq P_0$ (E2), or when the number of operation cycles $N_h$ in which the maximum pressure ratio $P_p/P_0$ is equal to or exceeds a predetermined pressure ratio $P_{h1}$, i.e. when $P_p/P_0 \geq P_{h1}$ (E3), is equal to or exceeds a permissible number $N_{h0}$, i.e. when $N_h \geq N_{h0}$ (E4).

Then it is judged by a knock judging means (step) that knock is occurring in the combustion chamber 44 when the number of cycles $S_n$ in which the maximum pressure ratio $P_p/P_0$ is equal to or exceeds a predetermined permissible pressure ratio of knock $P_{h2}$, i.e. when $P_p/P_0 \geq P_{h2}$ (E5) in a plurality of past cycles before the time point of judgement is equal to or exceeds the permissible number $S_{n0}$, i.e. when $S_n \geq S_{n0}$ (E6). Curve B in FIG. 4 is a cylinder pressure curve when knock has occurred.

Then, in a misfire judging means (step), when the maximum pressure ratio $P_p/P_0$ is equal to or smaller than a predetermined minimum permissible pressure ratio $P_n$, i.e. when $P_p/P_0 \leq P_n$ (E7), the combustion pressure ratio $P_1/P_0$, which is the ratio of the pressure $P_1$ at a predetermined crank angle in the combustion stroke to the pressure $P_0$ at a predetermined crank angle in the compression stroke shown in FIG. 4, is calculated. When the pressure ratio $P_1/P_0$ is equal to or smaller than a predetermined permissible pressure ratio $P_m$ of misfire, i.e. when $P_1/P_0 \leq P_m$ (E8), misfire is judged to be occurring.

In this case, a predetermined crank angle $\theta_1$ at which pressure $P_1$ is detected is determined at the position of crank angle symmetrical with regard to the top dead center to the position of a predetermined crank angle $\theta_0$ at which pressure $P_0$ is detected, as shown in FIG. 4. Curve C in FIG. 4 is a cylinder 43 pressure curve when misfire has occurred.

Figure 3:
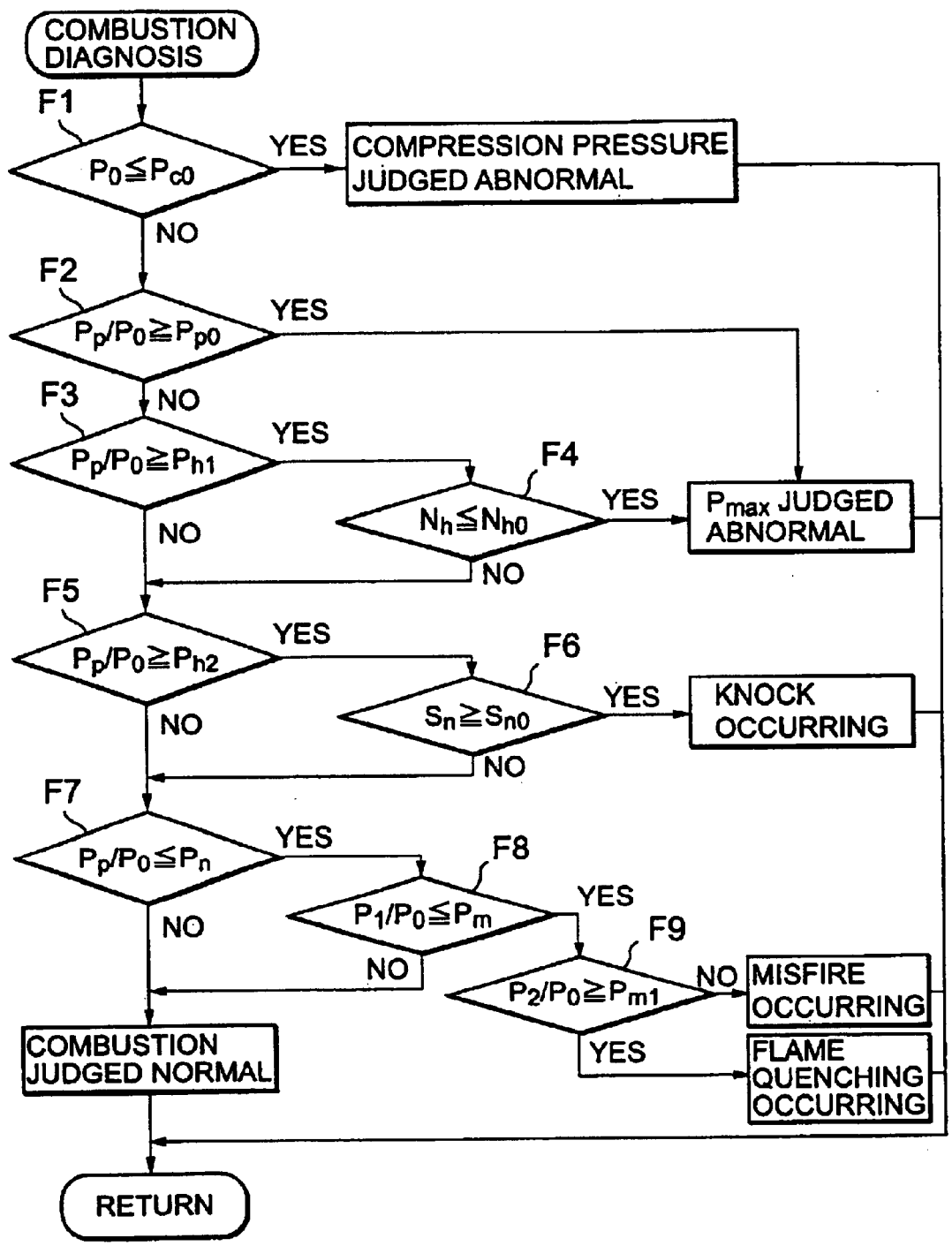
FIG. 3 is a second example of a control flowchart of the combustion diagnosis apparatus.

Next, a second example of combustion diagnosis by the combustion diagnosis section 5 will be explained with reference to a second example of a combustion control flowchart shown in FIG. 3 and the cylinder pressure curves shown in FIG. 4.

Figure 2:
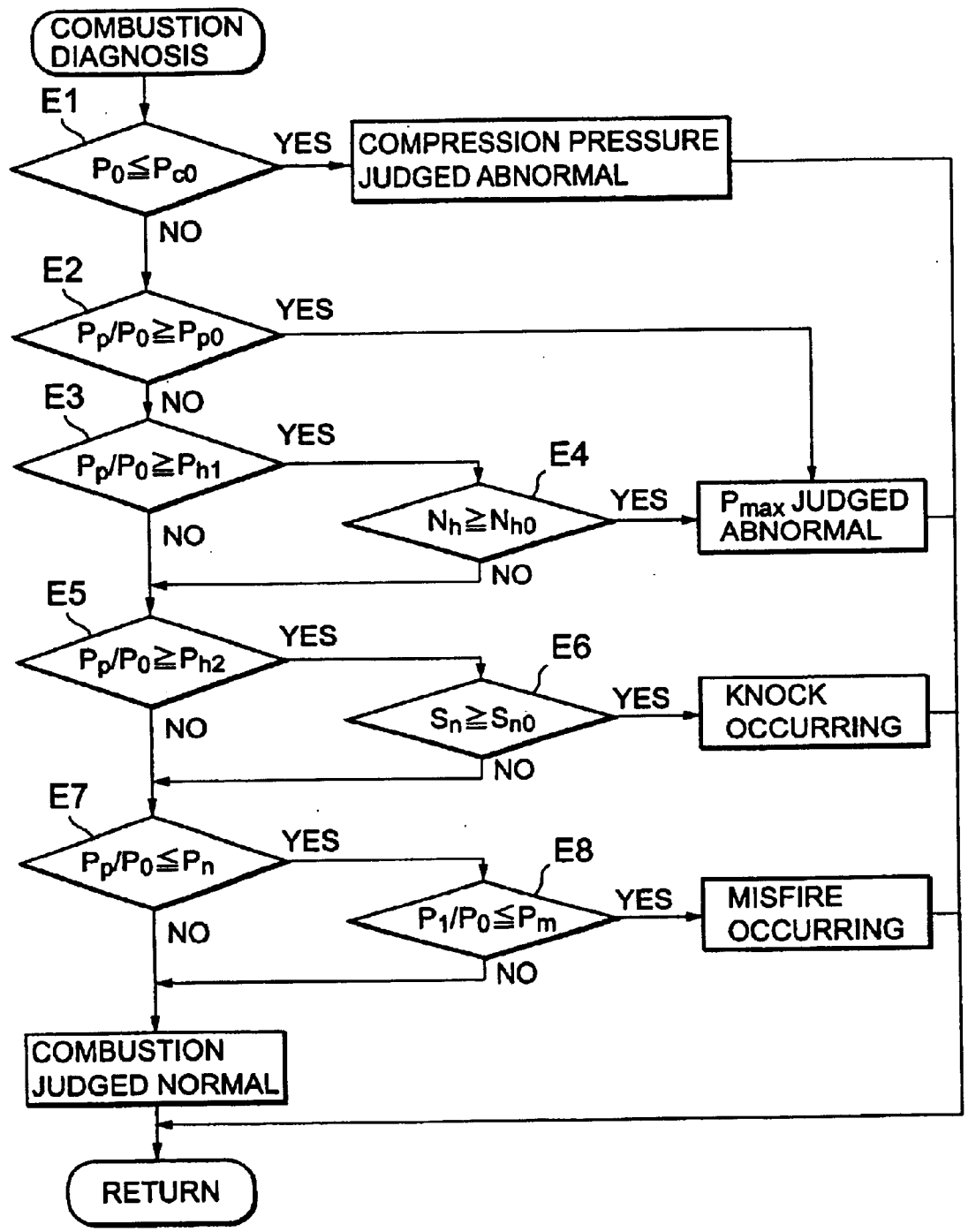
FIG. 2 is a first example of a control flowchart of the combustion diagnosis apparatus.

The second example of combustion diagnosis is one which adds to the first example shown in FIG. 2 a process of judging the occurrence of flame quenching.

In a flame quenching judging means(step) of the second example, when the maximum cylinder pressure ratio $P_p/P_0$ is equal to or smaller than the minimum permissible pressure ratio $P_n$, i.e. when $P_p/P_0 \leq P_n$ (F7), and at the same time the combustion pressure ratio $P_1/P_0$ is equal to or smaller than the predetermined permissible pressure ratio $P_m$ of misfire, i.e. when $P_1/P_0 \leq P_m$ (F8), lower pressure side combustion pressure ratio $P_2/P_0$, which is a ratio of a lower side pressure $P_2$ lower than the pressure $P_1$ at a predetermined crank angle in the combustion stroke to the pressure $P_0$ at a predetermined crank angle in the compression stroke, is calculated. When the lower pressure side combustion pressure ratio $P_2/P_0$ is equal to or larger than a permissible pressure ratio $P_{m1}$ of flame quenching, i.e. when $P_2/P_0 \geq P_{m1}$ (F9), flame quenching is judged to be occurring. Curve D in FIG. 4 is a cylinder pressure curve when flame quenching has occurred.

When the lower pressure side pressure ratio $P_2/P_0$ is smaller than the permissible pressure ratio $P_{m1}$ of flame quenching, it is judged that the combustion chamber 44 is in a state where misfire has occurred.

Thus, misfire can be discriminated from flame quenching by calculating combustion pressure ratios $P_1/P_0$ and $P_2/P_0$ using higher pressure side pressure $P_1$ and lower pressure side pressure $P_2$ at two crank angles, respectively, and comparing each combustion pressure with the permissible pressure ratio $P_m$ of misfire and permissible pressure ratio $P_{m1}$ of flame quenching, respectively.

When knock, misfire, excessively high maximum cylinder pressure, or flame quenching is judged to be occurring by the diagnosis at the combustion diagnosis section 5, the signal of the result of diagnosis is sent to the combustion control apparatus 200. The control apparatus 200 shuts off or controls the opening of the gas supply electromagnetic valve 7 and controls the ignition device 11. The contents of the result of diagnosis are displayed on the displaying apparatus 6.

According to the embodiment, combustion diagnosis of detecting the occurrences of knock, misfire, excessively high maximum cylinder pressure, or flame quenching is performed by a single combustion diagnosis apparatus 100 by carrying out diagnosis using pressure ratios based on the compression pressure at a predetermined crank angle in the compression stroke, so all necessary combustion diagnoses can be performed with an apparatus of simple construction and low-cost.

As the combustion diagnosis is done using pressure ratios based on a compression pressure as described above, absolute values of cylinder pressures is unnecessary and normal diagnosis is maintained without reduction in accuracy even when the output level from the cylinder pressure detector 1 totally decreases due to deterioration, temperature drift, failed calibration, etc. of the cylinder pressure detector 1. Accordingly, the operation life of combustion diagnosis apparatus can be extended.

Further, combustion diagnosis with high accuracy is possible by using, for combustion diagnosis, cylinder pressure signals of which only the filtration of noise is done through a simple low-pass filter. Therefore, complicated processing, such as a change of pass-band of the filter as has been with the prior art, is unnecessary, and the efficiency of operation of combustion diagnosis is enhanced.

Further, combustion diagnosis with high accuracy is possible by simple means(steps), as the combustion diagnosis is carried out directly by using only the cylinder pressures detected.

Therefore, according to the embodiment, all necessary combustion diagnoses such as knock, misfire, excessively high maximum cylinder pressure, and flame quenching are possible with simple equipment and in a simple manner, and a decrease in combustion performance of engine can be detected with high accuracy and without delay.

Figure 5:
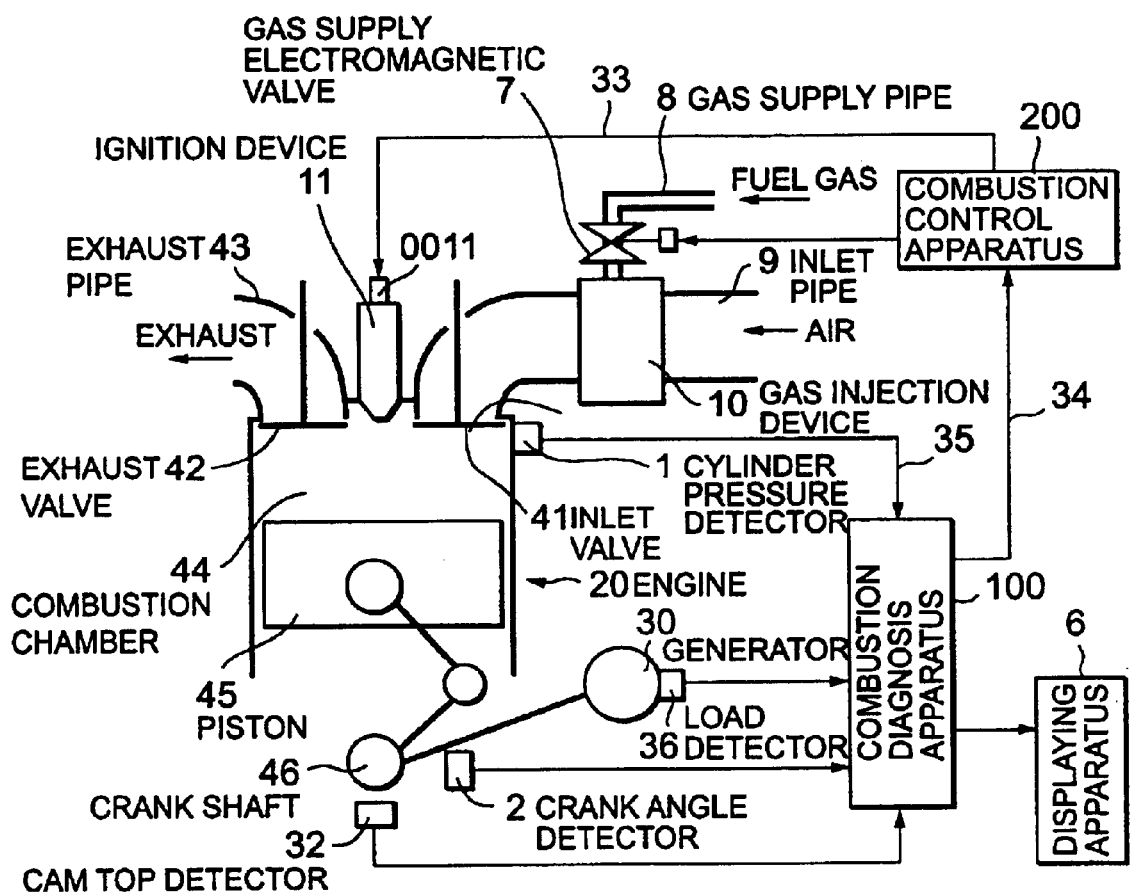
FIG. 5 is a diagrammatic representation showing the total configuration of the combustion diagnosis system of a gas engine of another embodiment according to the present invention.

In FIG. 5 showing another embodiment of the present invention, reference number 20 is the main body of a gas engine, 45 is a piston, 46 is a crankshaft, 44 is a combustion chamber, 41 is an inlet valve, 42 is an exhaust valve, and 43 is an exhaust pipe.

A gas injection device 10 is provided midway along an inlet pipe 9 for injecting fuel gas into the inlet air flowing in the inlet pipe 9 to be charged into the cylinder through the inlet valve 41. Reference number 8 is a gas supply pipe for connecting a fuel gas tank (not shown) accommodating fuel gas and the gas injection device 10. Reference number 7 is a gas supply electromagnetic valve provided at the entrance of the gas into the gas injection device 10. The opening of the valve is controlled under the control signal from an electromagnetic valve control device (not shown in the drawing) to adjust the flow of the gas fuel. The valve is also controlled under a control signal from a combustion control apparatus 200 (discussed later) to shut-off or adjust the opening.

Reference number 11 is an ignition device for torch-igniting the pilot fuel injected into a sub-chamber (not shown in the drawing) from a pilot fuel injection valve 0011 to promote the combustion of a lean fuel gas/air mixture in the main combustion chamber.

The construction of the engine proper described above is the same as that of the first embodiment.

The gas pressure in the combustion chamber, i.e. cylinder pressure, is detected with a cylinder pressure detector 1, and crank angle is detected with a crank angle detector 2.

Reference number 100 is a combustion diagnosis apparatus.

The signal of cylinder pressure detected by the cylinder pressure detector 1 and the signal of crank angle detected by the crank angle detector are inputted to the combustion diagnosis apparatus 100, which carries out diagnosis of the combustion conditions in the combustion chamber 44 on the basis of the cylinder pressure signal with the assistance of the crank angle signal.

Reference number 30 is a generator driven by the gas engine 20, 36 is a load detector for detecting the load of the gas engine 20 (load of the generator 30), and 32 is a cam top detector for detecting the crank angle at which the cam is at top position for a selected cylinder of the gas engine 20 (the cam may be the inlet or exhaust cam). The signal of the load of the gas engine from the load detector 32 and the signal of the cam top crank angle from the cam top detector are inputted to the combustion diagnosis apparatus 100.

Reference number 200 is the combustion control apparatus which controls the fuel injection quantity to be injected from the gas injection device 10 by shutting off or adjusting the openings of the gas supply electromagnetic valve 7 according to a signal 34 of a diagnosis result and at the same time controls the injection timing and quantity of the pilot fuel injected from the pilot fuel injection valve 0011 into the ignition device 11 according to a control signal 33, and thus the fuel injection timing and quantity (the fuel injected from the gas injection device and that injected from the pilot fuel injection valve are together referred to as fuel hereafter). The result of diagnosis by the combustion diagnosis apparatus 100 is displayed on a displaying apparatus 6. It is suitable that an alarm which generates an alarm based on the result of diagnosis is connected to the combustion diagnosis apparatus 100.

The working of the combustion diagnosis apparatus 100 and combustion control apparatus 200 will be explained below.

Figure 6:
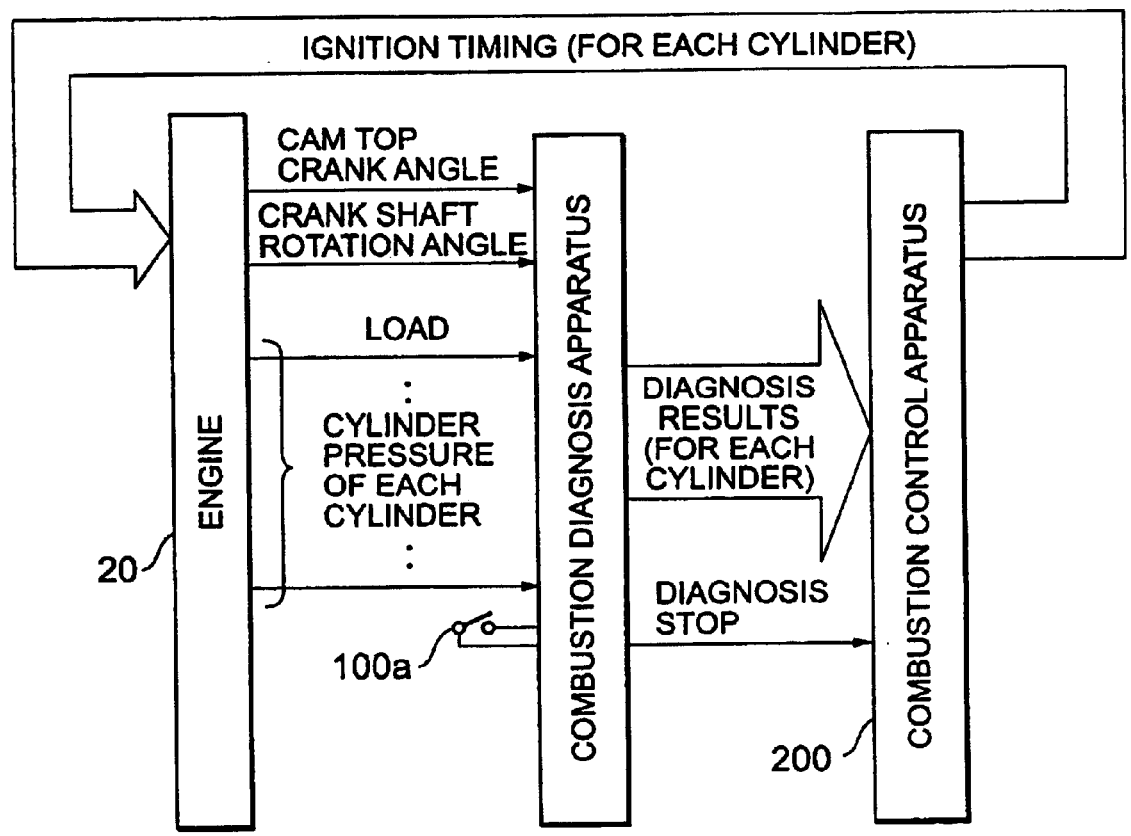
FIG. 6 is a control block diagram(1) of the embodiment.
Figure 7:
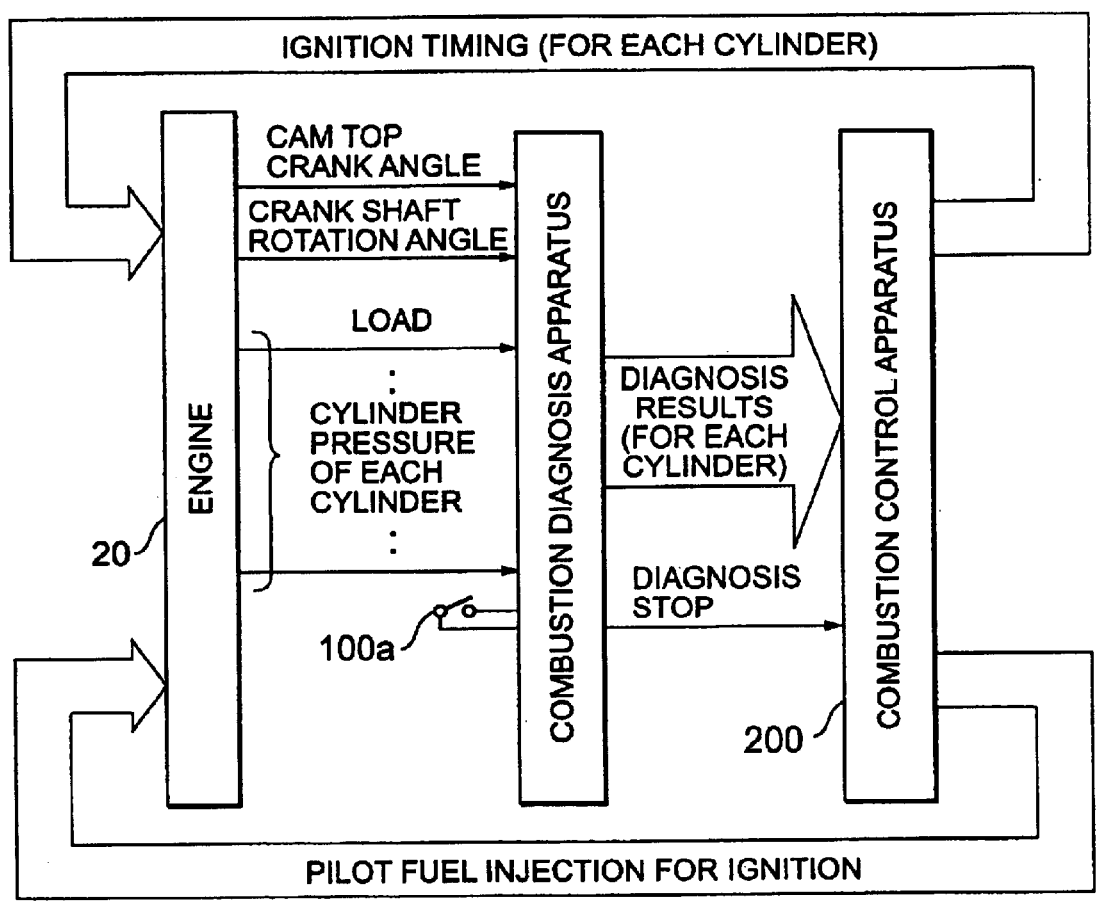
FIG. 7 is a control block diagram(2) of the embodiment.

The gas pressure in the combustion chamber 44, i.e. the pressure signal, is inputted to the combustion diagnosis apparatus 100. A high frequency component is removed by a noise removing filter (not shown in the drawing) to be reduced to an averaged pressure signal without fluctuation in voltage. On the other hand, to the combustion diagnosis apparatus 100 has been inputted the engine crank angle signal from the crank angle detector 2, the engine load signal from the load detector 36, and cam top signal from the cam top detector 32. In FIG. 6 and FIG. 7, the cylinder pressure signals of a plurality of cylinders, crank angle signal, cam top crank angle signal, and load signal are inputted continuously to the combustion diagnosis apparatus 100. The combustion is diagnosed in the apparatus 100 based on the input signals, and the result of the diagnosis is inputted moment-to-moment to the combustion control device 200.

The combustion control device 200 outputs the fuel ignition time control signal to the engine 20 as shown in FIG. 6 or the fuel ignition time control signal and fuel injection quantity control signal to the engine 20 as shown FIG. 7. The engine is thus controlled to be operated under combustion conditions judged to be changed, according to the result of the diagnosis, or to be halted as necessary.

In FIG. 6 and FIG. 7, the combustion diagnosis apparatus 100 comprises a single CPU and the combustion control apparatus 200 comprises a double CPU so that, even when the combustion diagnosis apparatus 100 does not work due to runaway etc., the control of ignition timing and fuel injection quantity of each cylinder is performed by independent operation of the CPU in the combustion control apparatus 200, while ceasing the function of the combustion diagnosis apparatus 100.

The detected data of the pressure in the cylinder sent from the cylinder pressure detector 1 is processed in the combustion diagnosis apparatus 100 as follows.

Figure 8A:
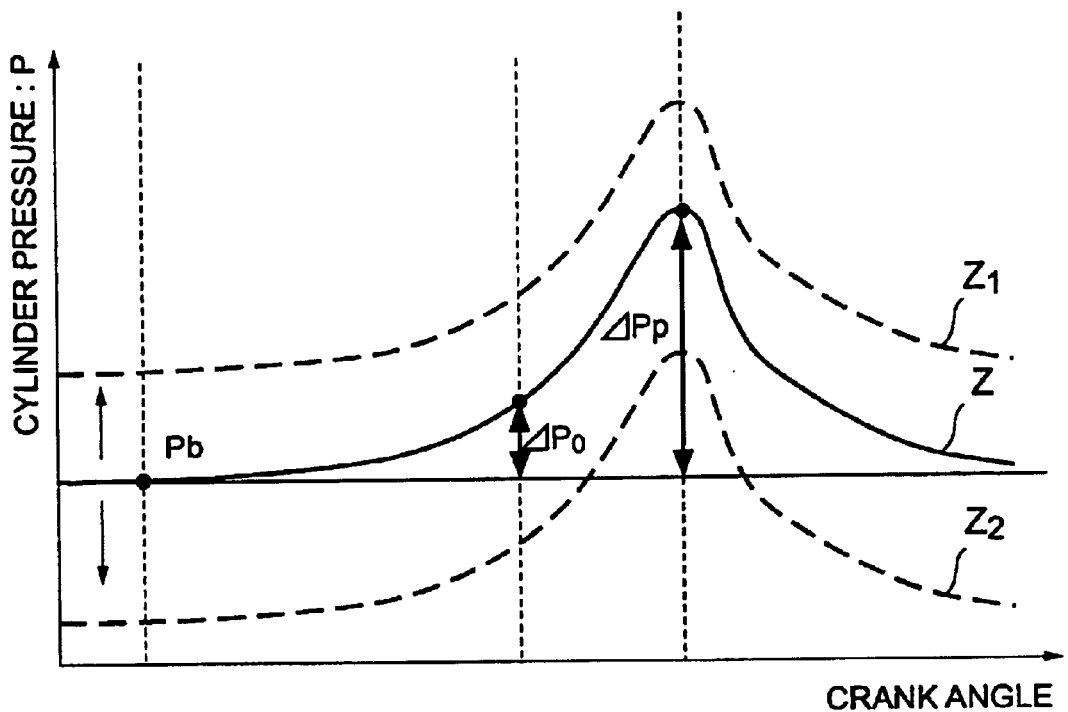
FIG. 8(A) is a diagram showing cylinder pressure in the embodiment.
Figure 8B:
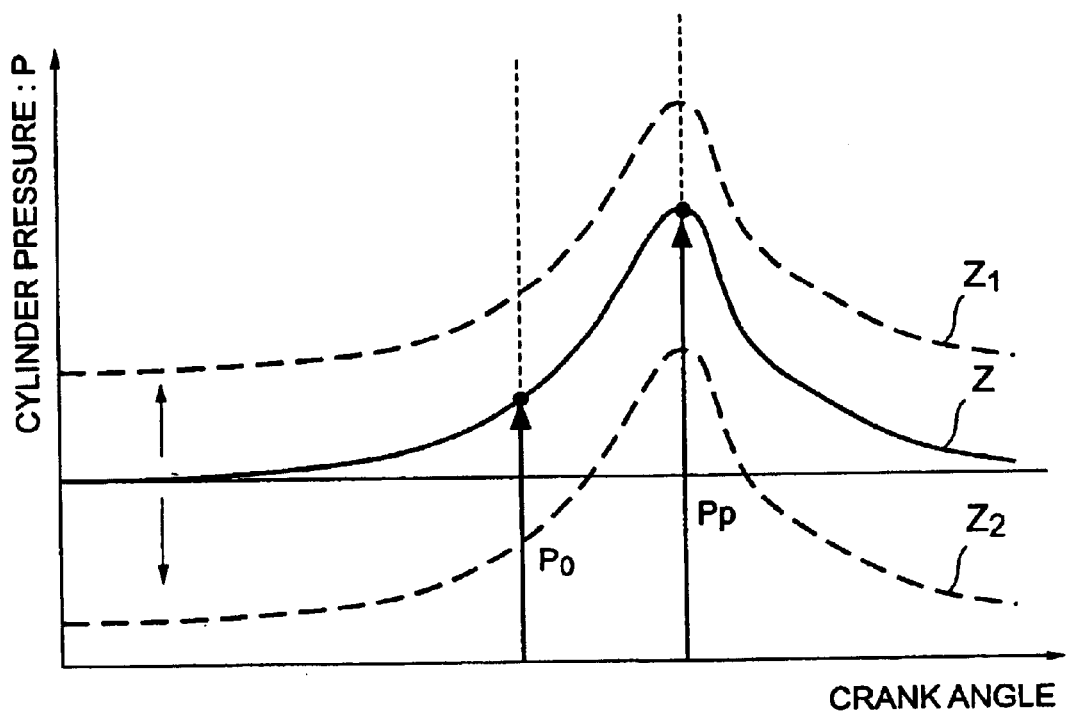
FIG. 8(B) is a diagram showing cylinder pressure in the prior art.

The pressure signal shown in FIG. 8(A) and FIG. 8(B) byline Z is evaluated on the basis of a reference pressure $P_b$, which is the cylinder pressure at or before the beginning of compression, the pressure being about the same as the inlet pressure when the inlet valve 41 and exhaust valve 42 are open. A difference $\Delta P$ between the detected pressure P and the reference pressure $P_b$ ($\Delta P = P - P_b$) is calculated for every crank angle inputted from the crank angle detector.

A standardized cylinder pressure ratio $\Delta P/\Delta P_0$, where $\Delta P_0$ is the difference of the cylinder pressure at a predetermined crank angle in the compression stroke and the reference pressure $P_b$, is calculated, and combustion diagnosis is done using the standardized pressure ratio $\Delta P/\Delta P_0$.

The cylinder pressure signal shown in FIGS. 8(A) and (B) may drift upward or downward as shown by line $Z_1$ or $Z_2$ in the drawings due to differences in thermal expansion of the component of the pressure detector 1 by changes in the ambient temperature, deterioration over time of the detector 1, etc.

However, in the past, the absolute value of the pressure signal $P_0$ and $P_p$ was adopted as cylinder pressure data as shown in FIG. 8(B), so erroneous combustion diagnosis resulted when the output level of the pressure detector 1 totally decreased or increased.

On the contrary, according to the embodiment of the present invention shown in FIG. 8(A), the difference $\Delta P$ between the concerned cylinder pressure P and the reference pressure $P_b$ ($\Delta P = P - P_b$) are used, $P_b$ being the cylinder pressure at or before the beginning of compression including the inlet pressure, which is small in fluctuation due to outside conditions such as atmospheric conditions during engine operation. Combustion diagnosis is done on the basis of the standardized cylinder pressure ratio $\Delta P/\Delta P_0$, so the absolute values of the cylinder pressures are not required.

The combustion diagnosis using the standardized cylinder pressure ratio makes it possible to diagnose while maintaining desired accuracy without decreasing the accuracy even when the output level of the cylinder pressure detector decreases totally due to deterioration of the pressure detector, temperature drift, calibration failure, and so on, or the level increases totally due to other reasons.

Next, the working of the combustion diagnosis apparatus 100 will be explained with reference to the control flowchart shown in FIG. 9 and cylinder pressure-crank angle diagram shown in FIG. 16(A).

The data of cylinder pressure-crank angle diagram as shown in FIG. 16(A) is inputted in the combustion diagnosis apparatus 100 from the cylinder pressure detector 1 and crank angle detector 2. Curve A in FIG. 16(A) is a cylinder pressure curve when the combustion in the cylinder is normal.

Figure 9:
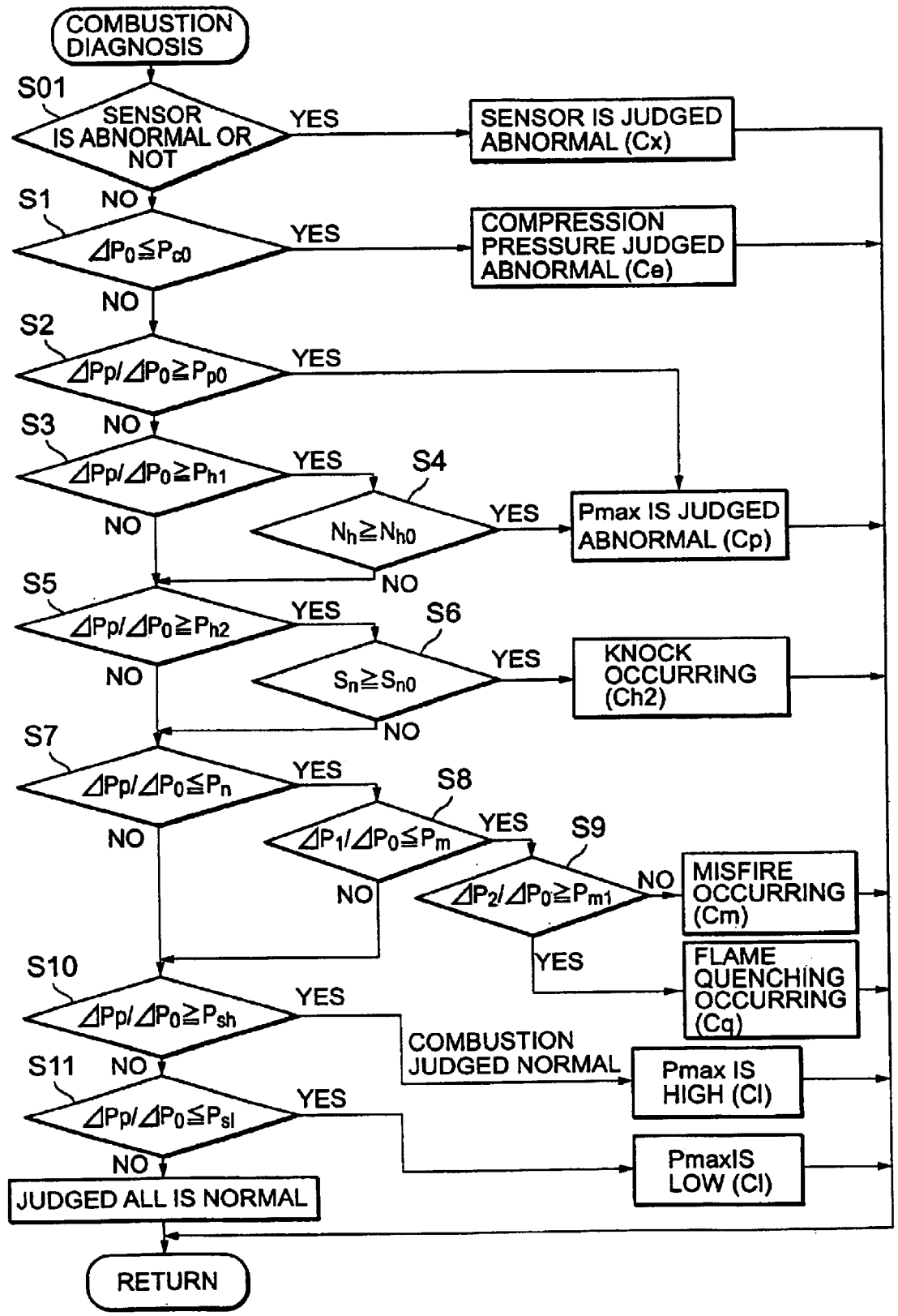
FIG. 9 is the flowchart (1) of the embodiment.
Figure 34:
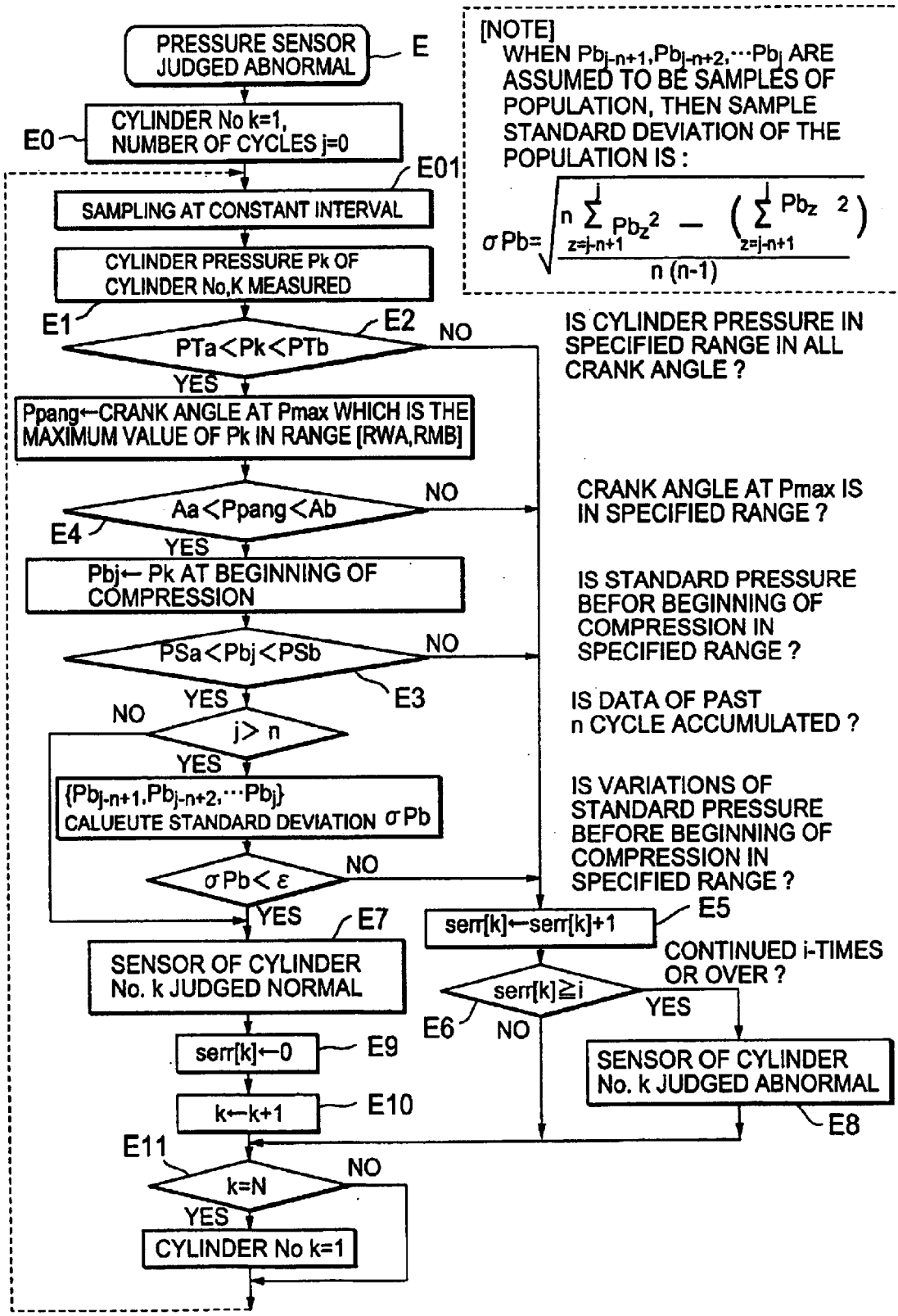
FIG. 34 is a flowchart of detecting abnormality in cylinder pressure.

Referring to FIG. 9, whether the sensor is abnormal or not (S01) is determined according to the flowchart of FIG. 34 in which whether the sensor is normal or abnormal is judged. If the sensor is abnormal, an action of changing the detector or other appropriate action must be taken. If the sensor is normal, the flow proceeds to cylinder pressure diagnosis steps.

The pressure difference $\Delta P(=P-P_b)$, which is the difference of detected cylinder pressure P and the reference pressure $P_b$ as cited above, is calculated for each crank angle inputted from the crank angle detector 2, and a standardized pressure ratio $\Delta P/\Delta P_0$, which is the ratio of the pressure difference $\Delta P$ to the pressure difference $\Delta P_0$, which is the difference of the cylinder pressure $P_0$ at a predetermined crank angle and the reference pressure $P_b$ mentioned before, ($\Delta P_0 = P_0 - P_b$)

Then, the pressure difference $\Delta P_0$ is compared with a minimum permissible value $P_{c0}$ for $\Delta P_0$, and when $\Delta P_0 \leq P_{c0}$, the compression pressure $P_0$ is judged to be abnormally low (S1). Curve E in FIG. 16(A) is a cylinder pressure diagram when compression pressure $P_0$ is abnormally low.

Then, standardized maximum pressure ratio $\Delta P_p/\Delta P_0$ is compared with a maximum permissible pressure ratio $P_{p0}$, and when $\Delta P_p/\Delta P_0 \geq P_{p0}$ (S2), or when the number $N_h$ of cycles operated under the condition of $\Delta P_p/\Delta P_0 \geq P_{h1}$ (S3), where $P_{h1}$ is a predetermined pressure ratio lower than the predetermined pressure ratio $P_{p0}$, is equal to or exceeds the permissible number $N_0$, that is, when $N_h \geq N_0$ (S4), the maximum pressure is judged to be abnormally high.

Then, in the knock judging means (step), it is judged that knock is occurring in the combustion chamber 44 when the number of cycles $S_n$ in which the standardized maximum pressure ratio $\Delta P_p/\Delta P_0$ is equal to or exceeds a predetermined permissible pressure ratio of knock $P_{h2}$, i.e. when $\Delta P_p/\Delta P_0 \geq P_{h2}$ (S5), in a plurality of past cycles before the time point of judgement is equal to or exceeds the permissible number $S_{n0}$, i.e. when $S_n \geq S_{n0}$ (S6). Curve B in FIG. 16(A) is a cylinder pressure curve when knock has occurred.

Then, in the misfire judging means(step), when the standardized maximum pressure ratio $\Delta P_p/\Delta P_0$ is equal to or smaller than a predetermined minimum permissible pressure ratio $P_n$, i.e. when $\Delta P_p/\Delta P_0 \leq P_n$ (S7), a standardized combustion pressure ratio $\Delta P_1/\Delta P_0$, which is the ratio of the pressure difference $\Delta P_1$ at a predetermined crank angle in the combustion stroke to the pressure difference $\Delta P_0$ at a predetermined crank angle in the compression stroke shown in FIG. 16(A), is calculated. When the pressure ratio $\Delta P_1/\Delta P_0$ is equal to or smaller than permissible pressure ratio $P_m$ of misfire, i.e. when $\Delta P_1/\Delta P_0 \leq P_m$ (S8) and, as mentioned later, a standardized pressure ratio $\Delta P_2/\Delta P_0$ concerning pressure difference $\Delta P_2$ at a lower pressure side lower than $\Delta P_1$ is smaller than permissible pressure ratio $P_{m1}$, i.e. when $\Delta P_2/\Delta P_0 \leq P_{m1}$ (S9), misfire is judged to be occurring in the combustion chamber 44.

In this case, the predetermined crank angle $\theta_1$ at which pressure $P_1$ is detected is determined at the position of crank angle symmetrical with regard to the top dead center to the position of the predetermined crank angle $\theta_0$ at which pressure $P_0$ is detected, as shown in FIG. 16(A). The predetermined crank angle $\theta_2$ at which pressure $P_2$ is detected is determined at the position of crank angle symmetrical with regard to the top dead center to the position of the predetermined crank angle $\theta_b$ at which reference pressure $P_b$ is detected, as shown in FIG. 16(A). Curve C in FIG. 16(A) is a cylinder pressure curve when misfire has occurred.

Then, in the flame quenching judging means(step), when the standardized maximum pressure ratio $\Delta P_p/\Delta P_0$ is equal to or smaller than the minimum permissible pressure ratio $P_n$, i.e. when $P_p/P_0 \leq P_n$ (S7) and at the same time the standardized combustion pressure ratio $\Delta P_1/\Delta P_0$ is equal to or smaller than the predetermined permissible pressure ratio $P_m$ of misfire, i.e. when $\Delta P_1/\Delta P_0 \leq P_m$ (S8) and further the lower pressure side standardized combustion pressure ratio $\Delta P_2/\Delta P_0$ is equal to or larger than the permissible pressure ratio $P_{m1}$ of flame quenching, i.e. when $\Delta P_2/\Delta P_0 \geq P_{m1}$ (S9), flame quenching is judged to be occurring. Curve D in FIG. 16(A) is a cylinder pressure curve when flame quenching has occurred.

When the lower pressure side standardized pressure ratio $\Delta P_2/\Delta P_0$ is smaller than the permissible pressure ratio $P_{m1}$ (S9), misfire is judged to be occurring in the combustion chamber 44, as mentioned before.

Therefore, misfire can be discriminated from flame quenching by calculating standardized combustion pressure ratios $\Delta P_1/P_0$ and $\Delta P_2/\Delta P_0$ using higher pressure side pressure $P_1$ and lower pressure side pressure $P_2$ at two crank angles, respectively, and comparing each combustion pressure with the permissible pressure ratio $P_m$ of misfire and permissible pressure ratio $P_{m1}$ of flame quenching, respectively.

When the combustion is normal, i.e. when $\Delta P_p/\Delta P_0 > P_n$ and the standardized maximum pressure ratio $\Delta P_p/\Delta P_0$ is equal to or exceeds a predetermined maximum reference pressure ratio $P_{sh}$, i.e. when $\Delta P_p/\Delta P_0 \geq P_{sh}$ (S10), the maximum cylinder pressure is judged to be higher than the reference value(permissible maximum pressure).

When the standardized maximum pressure ratio $\Delta P_p/\Delta P_0$ is equal to or smaller than a predetermined minimum value of maximum pressure ratio $P_{s1}$, i.e. when $\Delta P_p/\Delta P_0 \leq P_{s1}$ (S11), the maximum cylinder pressure is judged to be lower than reference value.

Figure 16B:
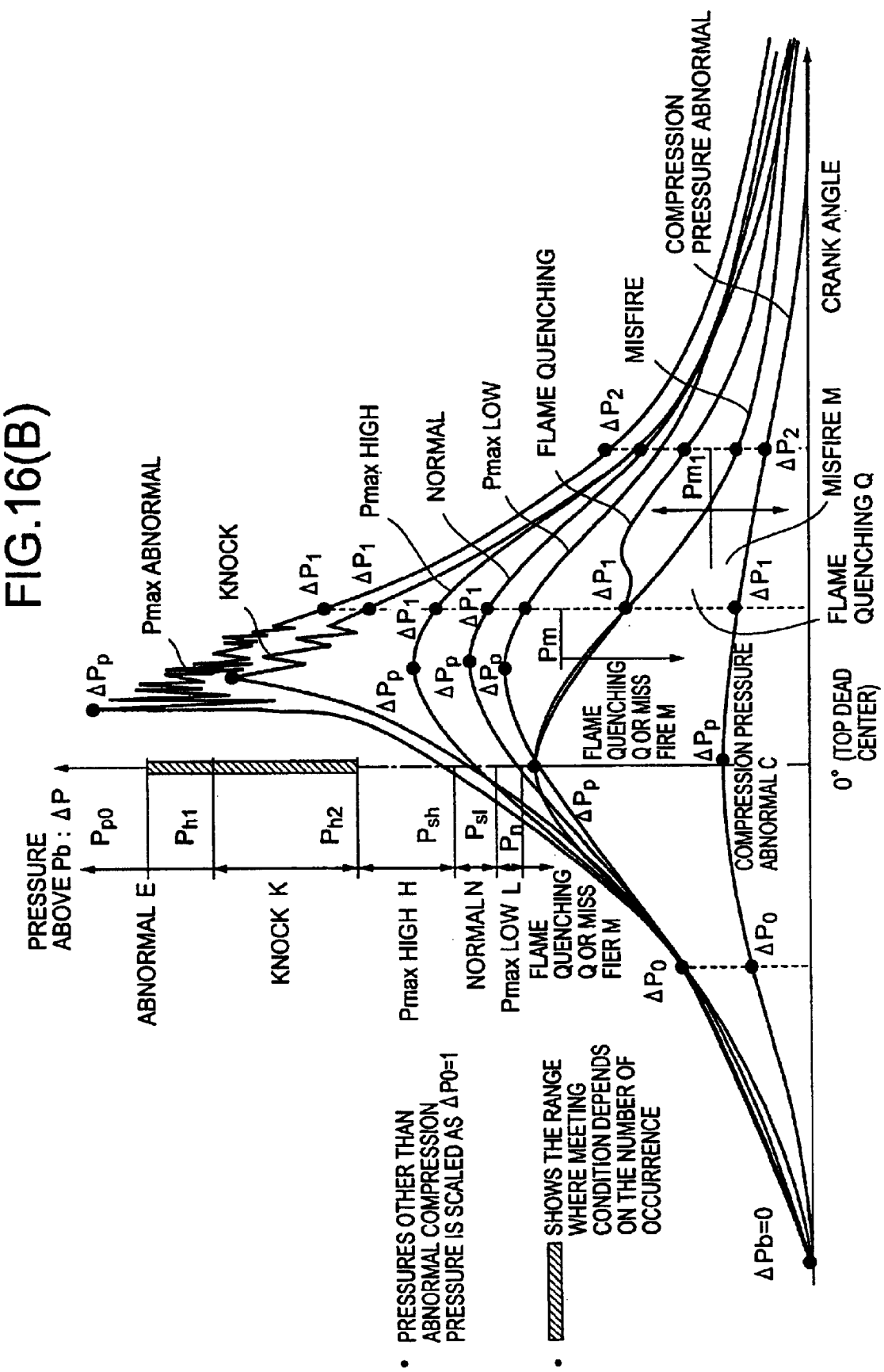
FIG. 16(B) is a diagram explaining combustion diagnosis items and permissible value(threshold value) on cylinder pressure curves.

FIG. 16(B) shows schematically, by scaling as $\Delta P_0=1$, the maximum pressure difference $\Delta P_p$ and permissible values $P_{p0}$, $P_{h1}$, $P_{h2}$, $P_n$, $P_m$, $P_{m1}$, $P_{sh}$, $P_{s1}$.

As can be recognized in FIG. 16(B), the threshold value $P_{p0}$, $P_{h1}$ for the maximum pressure, threshold value $P_{h2}$ for knock, threshold value $P_n$ for misfire and flame quenching are such that $P_n \leq P_{s1} \leq P_{sh} \leq P_{h2} \leq P_{h1} < P_{p0}$. Each of these threshold values may be changed as a function of engine load or engine rotation speed or engine operating conditions including inlet air temperature.

Next, the result of combustion diagnosis by the combustion diagnosis apparatus 100 and the work of the combustion control apparatus 200 based on the result of the diagnosis will be explained with reference to FIG. 10(A)~FIG. 10(F), FIG. 11(A)~FIG. 11(G), FIG. 12, and FIG. 13.

Figure 11A:
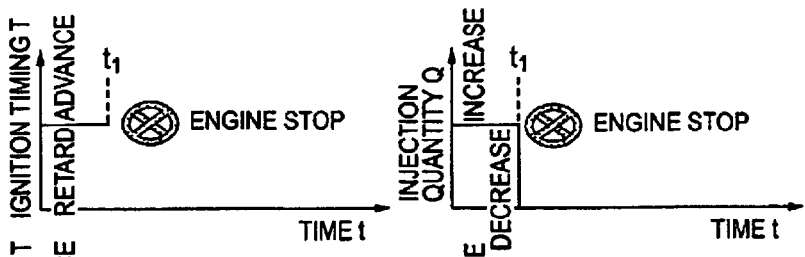
FIG. 11(A)~FIG. 11(G) are each a control-chart(2); charts of column (a) show fuel ignition timing and those of column (b) show fuel injection quantity.
Figure 12:
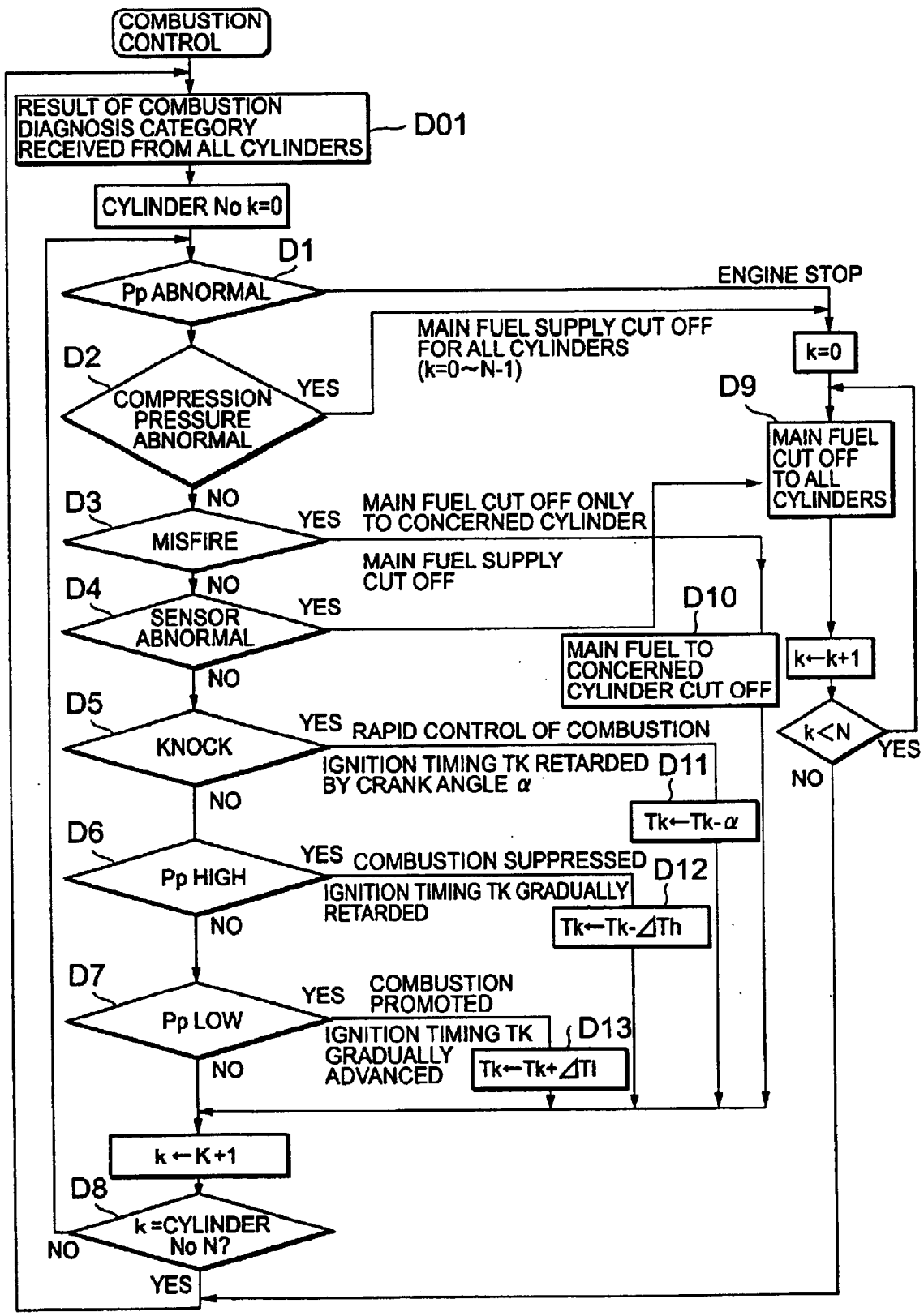
FIG. 12 is a flowchart (2) of the embodiment.
Figure 13:
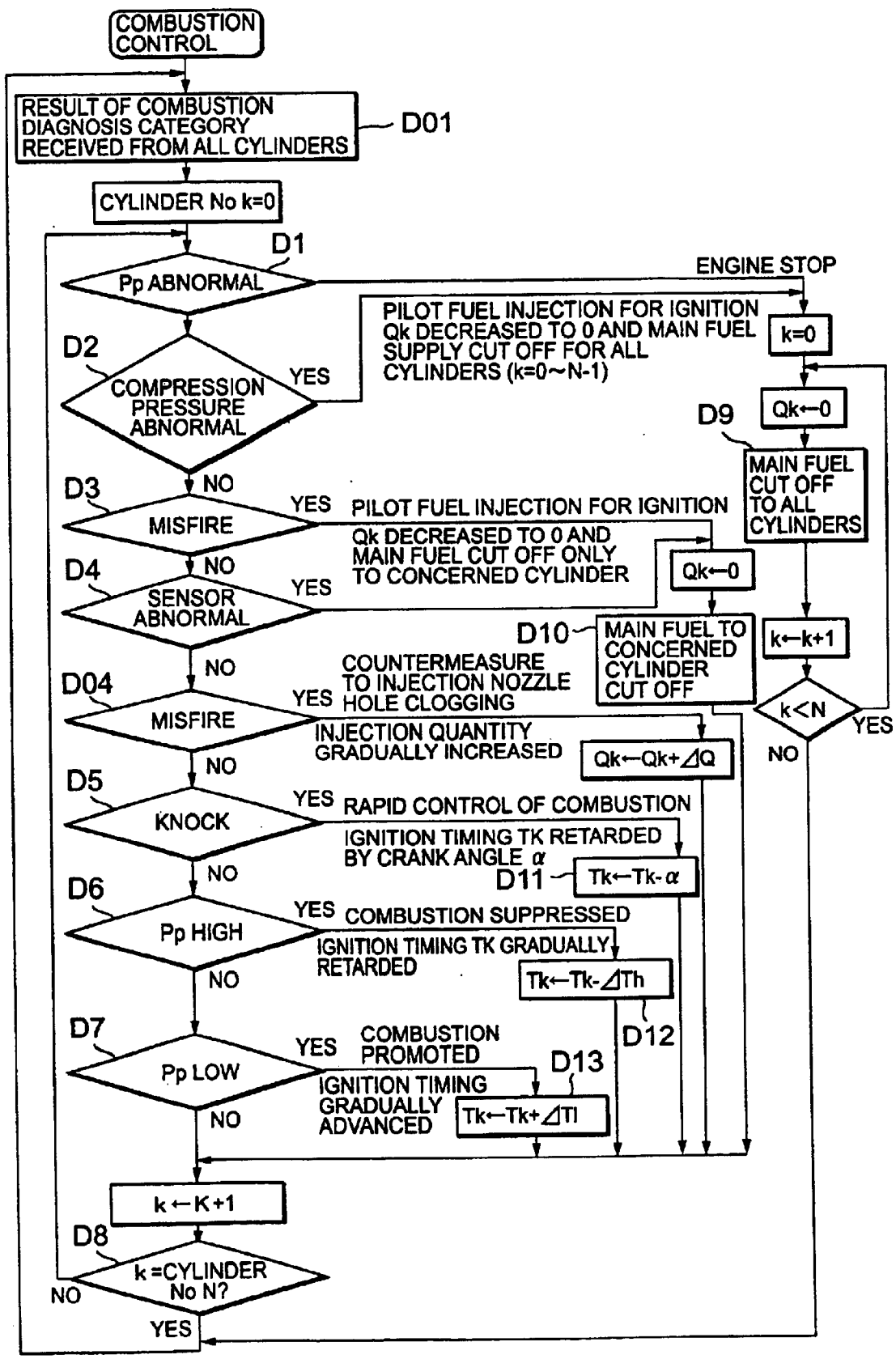
FIG. 13 is a flowchart (3) of the embodiment.

First, when it is diagnosed by the combustion diagnosis apparatus 100 that the maximum cylinder pressure $P_p$ is abnormally high with the result of $\Delta P_p/\Delta P_0 \geq P_{p0}$, or that the compression pressure $P_c$ is abnormally low with the result of $\Delta P_0 \leq P_{c0}$, the combustion control apparatus 200 causes the activation of the engine stopper to shut down the engine 20 (FIG. 10(A), FIG. 11(A), step D1 and D2 of FIG. 12~FIG. 13).

Therefore, the proper step to deal with the result can be taken accurately without delay, and engine breakage or the reduction of engine durability due to excessively high maximum cylinder pressure $P_p$ is prevented with certainty and continuation of failed combustion due to abnormally reduced compression pressure $P_c$ is prevented.

Figure 11B:
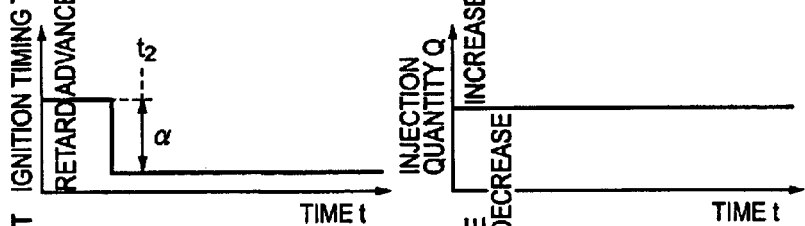

Then, when it is diagnosed by the combustion diagnosis apparatus 100 that knock has occurred with the result of $\Delta P_p/\Delta P_0 \geq P_{h2}$, the combustion control apparatus 200 allows the fuel injection timing to be retarded by a certain crank angle a (FIG. 10(B), FIG. 11(B), step D5 and D11 of FIG. 12~13).

Accordingly, the occurrence or continuation of knock can be prevented positively without delay and fluctuations in combustion conditions are suppressed. As a result, the engine can be controlled to operate in the high performance range just before knock occurs.

Figure 11C:
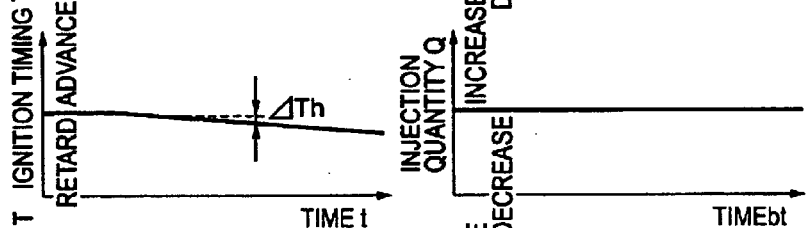
Figure 11D:
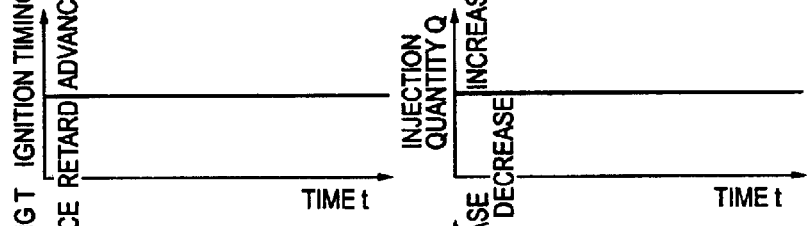
Figure 11E:
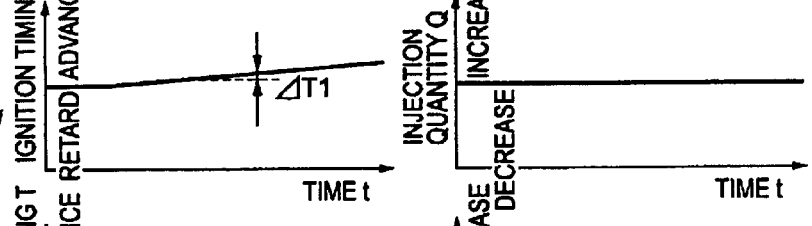
Figure 11F:
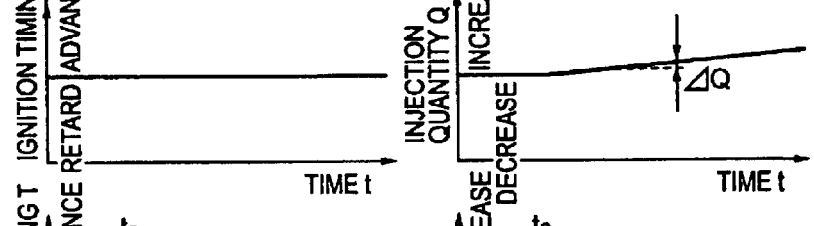
Figure 11G:
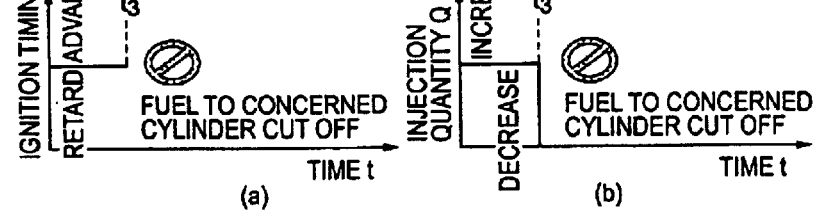

Then, when it is diagnosed by the combustion diagnosis apparatus 100 that the cylinder pressure detector 1 does not work properly, the combustion control apparatus 200 allows the fuel supply to the concerned cylinder to be shut off or retards the ignition timing so as to be retarded to that with which the engine can be operated safely (FIG. 10(F), FIG. 11(G), step D4 and D10 of FIG. 12~FIG. 13).

Then, when it is diagnosed by the combustion diagnosis apparatus 100 that the maximum cylinder pressure is too high, the combustion control apparatus 200 allows the fuel ignition timing to be retarded with a rate of a certain crank angle($\Delta T_h$) per unit time (FIG. 10(C), FIG. 11(C), step D6 and D12 of FIG. 12~FIG. 13).

When the standardized maximum pressure ratio becomes lower than the reference maximum pressure ratio, the combustion control apparatus allows the fuel injection timing to be advanced with a rate of a certain crank angle ($\Delta T1$) per unit time (FIG. 10(E), FIG. 11(E), step D7 and D13 of FIG. 12~FIG. 13).

As a result, the maximum pressure is always maintained in the range of the reference maximum pressure, the engine performance is maintained at desired one, and at the same time the increase of generation of NOx due to excess elevation of combustion temperature is suppressed.

Then, when it is diagnosed by the combustion diagnosis apparatus 100 that misfire is occurring, the combustion control apparatus 200 allows shut off of the fuel injection of the concerned cylinder in which misfiring is occurring (FIG. 10(F), FIG. 11(G), step D3 and D10 of FIG. 12~FIG. 13).

As a result of shutoff of the fuel injection of the cylinder in which misfire has occurred, the smooth operation of other cylinders can be continued without being influenced by the misfire in the concerned cylinder.

Then, when it is diagnosed by the combustion diagnosis apparatus 100 that flame quenching is occurring, the combustion control apparatus 200 allows the fuel injection to the concerned cylinder in which flame quenching has occurred to be increased (FIG. 11(F), step D04 and D011 of FIG. 13).

As a result of increasing the fuel injection to the cylinder in which flame quenching has occurred, the continuation of the flame quenching is prevented and other cylinders can be operated smoothly without otherwise continued flame quenching of the concerned cylinder.

As has been described in the foregoing, according to the embodiment, combustion diagnosis by the combustion diagnosis apparatus 100 and control of combustion by the combustion control apparatus 200 in response to the result of the diagnosis can always be done during the operation of the engine. In FIG. 14A)~FIG. 14(D) are shown the changes of the fuel injection timing and fuel injection quantity with time when the combustion is controlled by the combustion control apparatus 200 on the basis of the result of the diagnosis by the combustion diagnosis apparatus 100.

Figure 15:
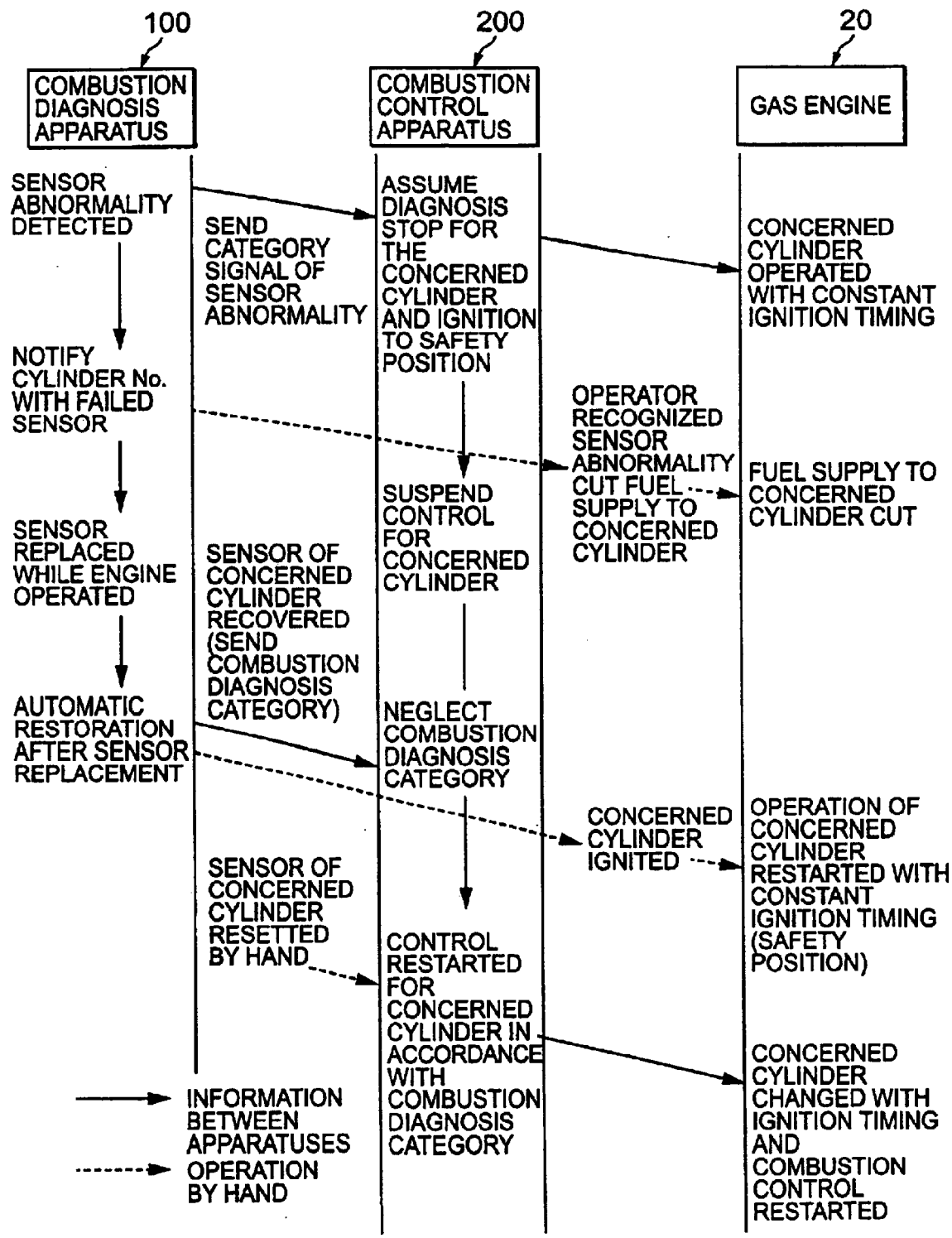
FIG. 15 is an illustration explaining the working of the combustion diagnosis apparatus, combustion control apparatus, and gas engine.

Next, FIG. 15 shows the working state of the combustion diagnosis apparatus 100, combustion control apparatus 200 and gas engine 20. When a diagnosis result is outputted from the combustion diagnosis apparatus 100 showing abnormality of a cylinder pressure sensor 1, this sensor is stopped to diagnose the combustion by the combustion control apparatus 200, and the apparatus 200 allows the ignition timing to be retarded by a certain crank angle to bring it to a safety range while leaving the abnormal state of the cylinder pressure sensor as it is.

After the failed cylinder pressure sensor 1 is recovered, the combustion diagnosis apparatus 100 and combustion control apparatus 200 restore normal operation and the ignition timing of the concerned cylinder is recovered to the normal timing.

Therefore, when abnormality occurs in a cylinder pressure sensor 1, the sensor is recovered while adjusting the fuel ignition timing and fuel injection quantity to deal with the abnormality, and after the recovery of the failed sensor, the normal control of the combustion of the concerned cylinder is effected. Thus, the occurrence of abnormality in the cylinder pressure sensor 1 can be coped with without halting the operation of the engine.

Next, changing operation of threshold value for combustion diagnosis in the combustion diagnosis apparatus 100 will be explained with reference to FIG. 17(A), FIG. 17B), FIG. 18((A), and FIG. 18(B).

Figure 17A:
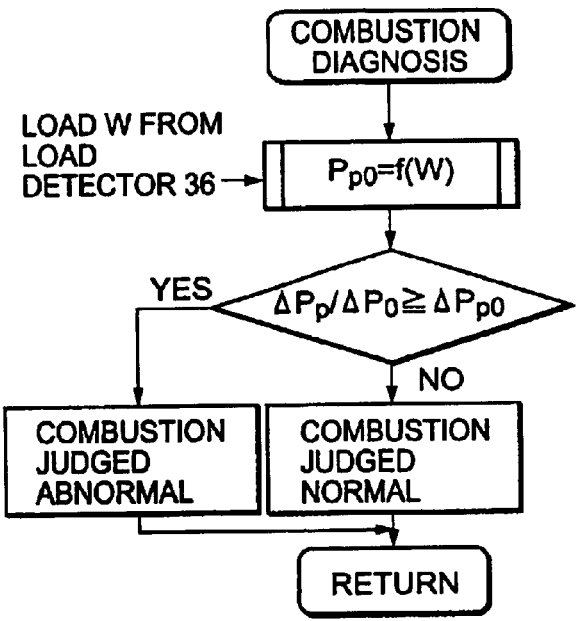
FIG. 17(A) and FIG. 17(B) are a flowchart when threshold value is varied and a curve(1) of variation of the threshold value, respectively, in the embodiment.
Figure 17B:
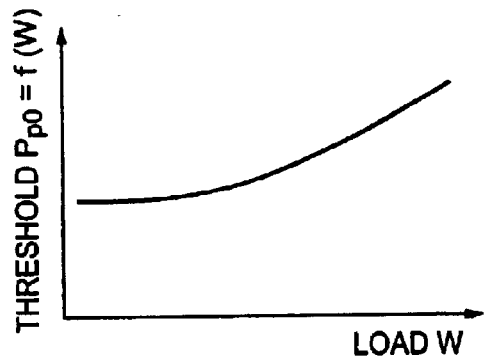

Permissible maximum pressure ratio $P_{p0}$ (threshold value) of the maximum cylinder pressure is determined in the combustion diagnosis apparatus 100 as a function of engine load W ($P_{p0}=f(W)$) as shown in FIG. 17(A)), a relation between them being shown in FIG. 17(B) for example.

In FIG. 17(A), when the engine load detected by the load detector 36 is inputted, the standardized maximum pressure ratio $\Delta P_p/\Delta P_0$ is compared with the permissible maximum pressure ratio $P_{p0}$ (threshold value) determined in accordance with engine load W, and it is judged that if $\Delta P_p/\Delta P_0 \geq P_{p0}$ the combustion is abnormal, and if $\Delta P_p/\Delta P_0 < P_{p0}$ the combustion is normal.

Figure 18A:
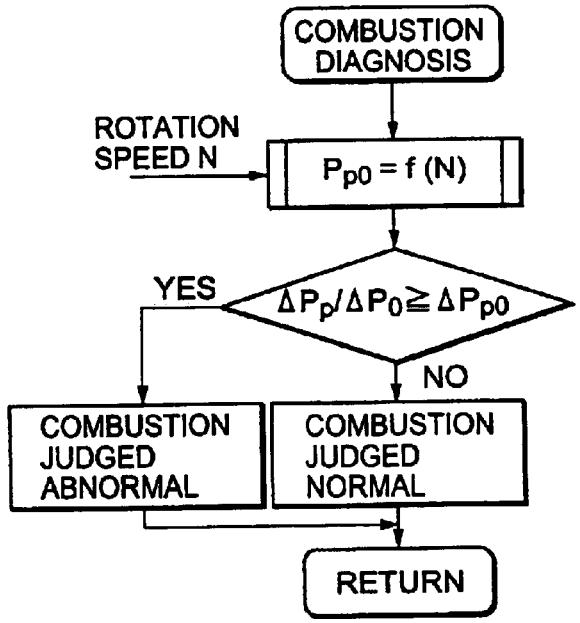
FIG. 18(A) and FIG. 18(B) are a flowchart when threshold value is varied and a curve(2) of variation of the threshold value, respectively, in the embodiment.
Figure 18B:
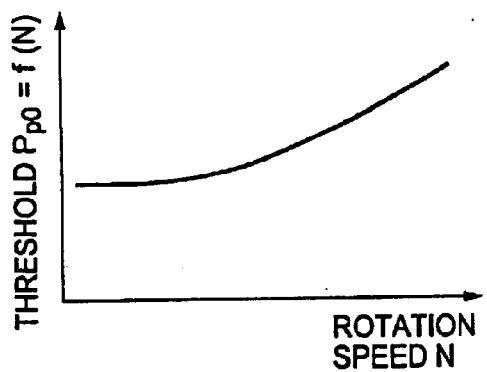
Figure 19:
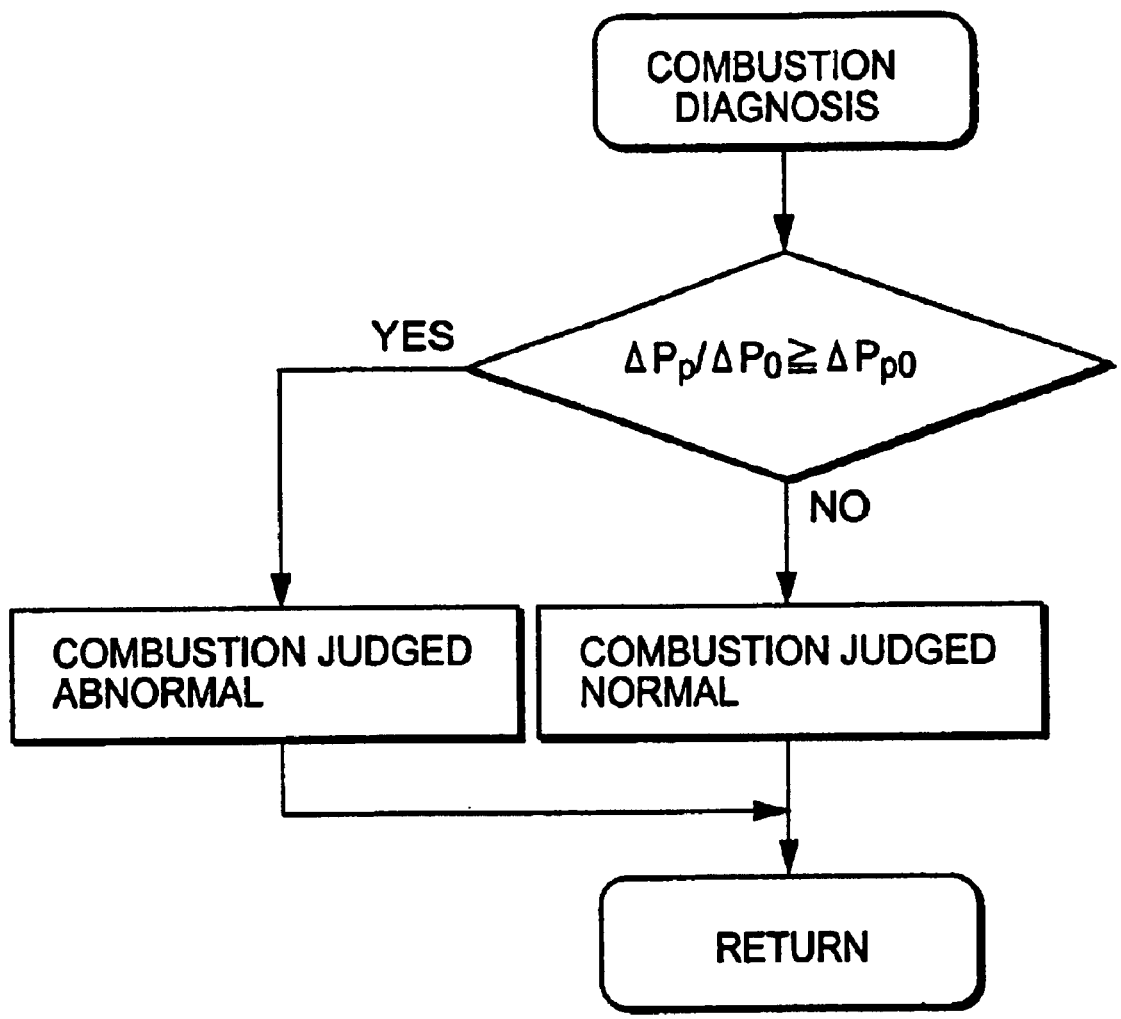
FIG. 19 a flowchart of prior art.

Permissible maximum pressure ratio $P_{p0}$ (threshold value) of the maximum cylinder pressure is determined in the combustion diagnosis apparatus 100 as a function of engine rotation speed N ($P_{p0}=f(N)$) as shown in FIG. 18(A)), a relation between them being shown in FIG. 18(B) for example.

In FIG. 18(A), when the engine rotation speed N detected through the crank angle detector 2 is inputted, the standardized maximum pressure ratio $\Delta P_p/\Delta P_0$ is compared with the permissible maximum pressure ratio $P_{p0}$ (threshold value) determined in accordance with engine rotation speed N, and it is judged that, if $\Delta P_p/\Delta P_0 \geq P_{p0}$ the combustion is abnormal, and if $\Delta P_p/\Delta P_0 < P_{p0}$ the combustion is normal.

Permissible maximum pressure ratios $P_{p0}$ (threshold values) are determined as a function of engine operating conditions including inlet air temperature, and the combustion is judged similarly as mentioned above.

Other than the permissible maximum pressure ratio $P_{p0}$ (threshold value), the maximum value $P_{sh}$ and minimum value $P_{s1}$ for reference maximum pressure ratio, permissible compression pressure difference $P_{c0}$, permissible pressure ratio for knock $P_{h2}$, permissible minimum pressure ratio for misfire $P_n$, permissible pressure ratio for misfire $P_m$, and permissible pressure ratio for flame quenching $P_{m1}$, etc. may be determined as a function of engine load W, engine rotation speed N, and engine operating conditions including inlet air temperature.

According to the embodiment, threshold values such as permissible maximum pressure ratios $P_{p0}$ (threshold values), the maximum value $P_{sh}$ and minimum value $P_{s1}$ for reference maximum pressure ratio, permissible compression pressure difference $P_{c0}$, permissible pressure ratio for knock $P_{h2}$, permissible minimum pressure ratio for misfire $P_n$, permissible pressure ratio for misfire $P_m$, and permissible pressure ratio for flame quenching $P_{m1}$ are not constant in diagnosing the combustion but they are changed according to changes in engine operating conditions and the combustion is controlled per cylinder.

Figure 20:
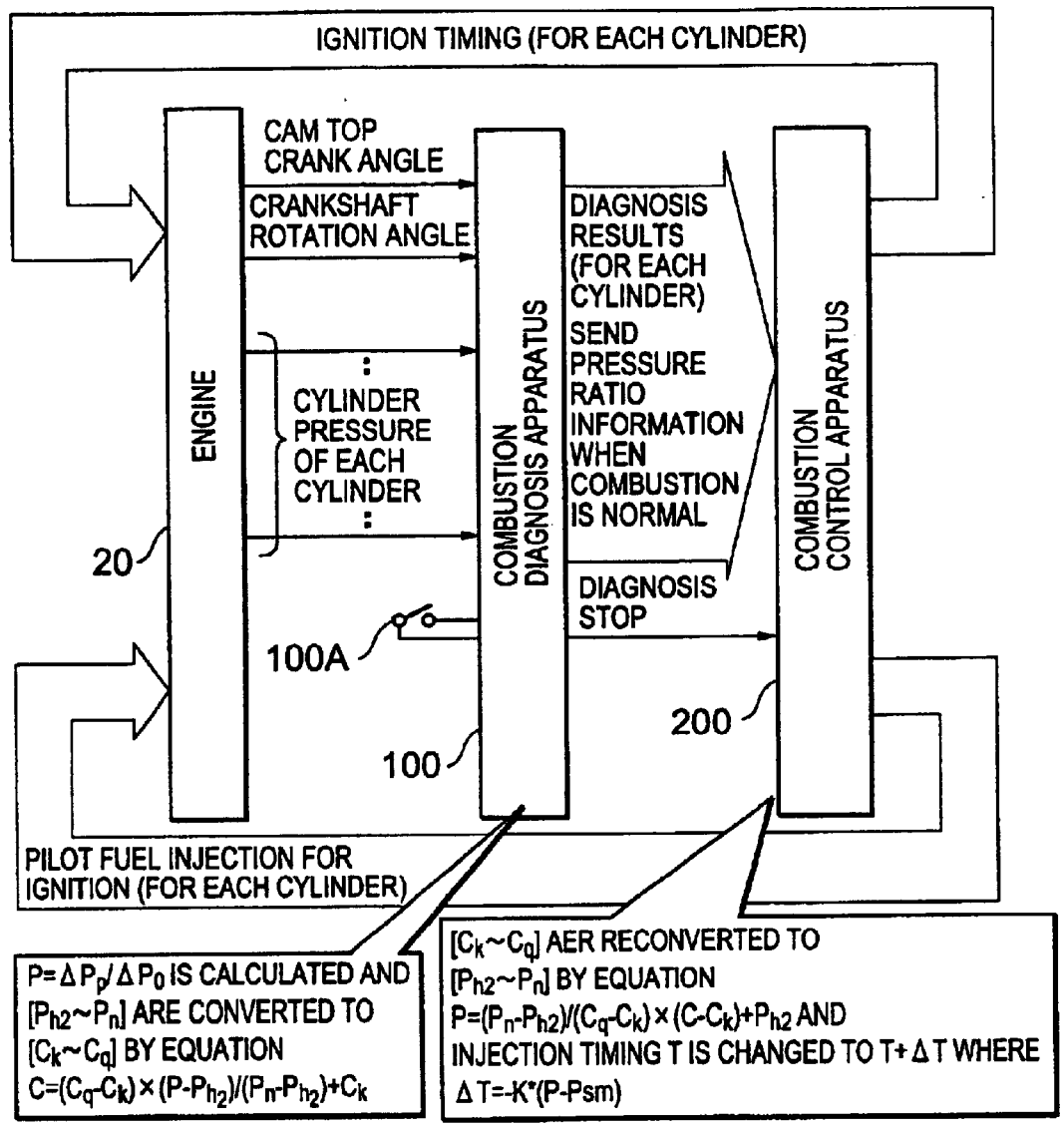
FIG. 20 is a total block diagram of the combustion diagnosis system of gas engine of an embodiment according to the present invention in a case where stepless control is done only in normal range and corresponds to FIG. 7.

The reference values(threshold values) can be adjusted to the values appropriate to the engine operating condition and the combustion is controlled for each cylinder, so that the combustion diagnosis can always be effected with high accuracy. In FIG. 6, FIG. 7, and FIG. 20, which is explained later, reference numeral 100a is an ON-OFF switch for allowing-or-not the actuation of the combustion diagnosis apparatus.

Next, the judging of abnormality of cylinder pressure sensor 1 will be explained with reference to FIG. 24, FIG. 33(A), FIG. 33(B), and FIG. 34.

Figure 24:
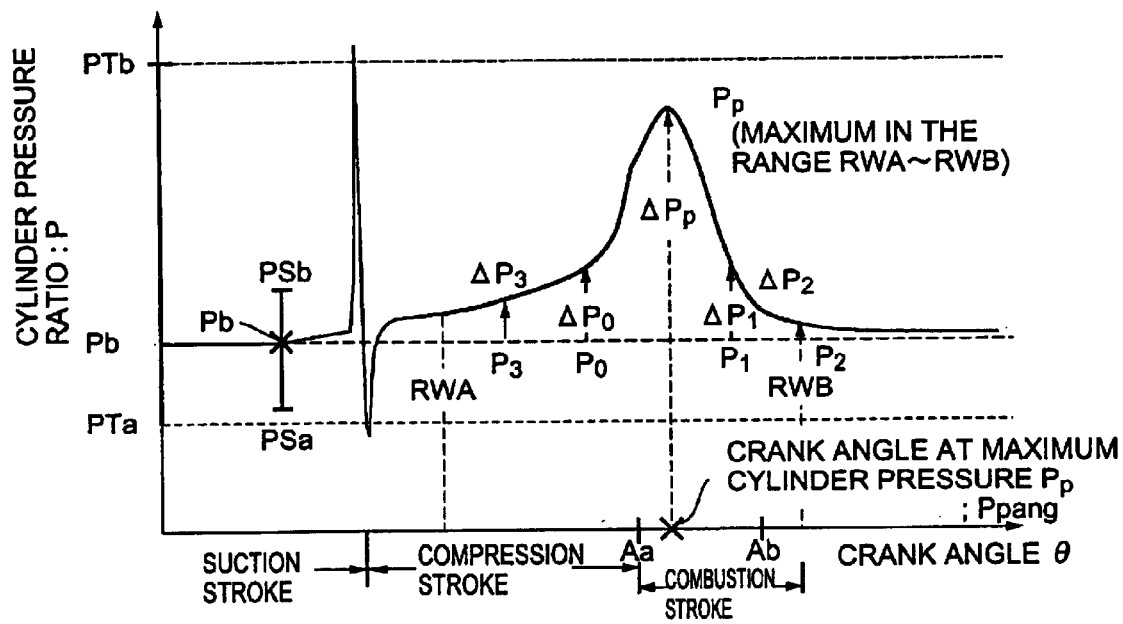
FIG. 24 is a cylinder pressure curve for explaining the detection of abnormality in the cylinder pressure detector.

In FIG. 24 showing a cylinder pressure diagram, $P_b$ is the reference pressure at or before the beginning of compression, $E_3$ is the pressure at a crank angle advanced by a certain crank angle from that of $P_0$ (i.e. P3 is measured earlier in time than $P_0$), $P_1$ is the pressure at a crank angle in retard of a certain crank angle from that of $P_0$ (i.e. $P_1$ is measured later in time than $P_0$), and $P_2$ is the pressure at a crank angle in retard of a certain crank angle from that of $P_1$. The crank angle range between RWA and RWB is an abnormality judging range, the cylinder pressure range between PTb and PTa is pressure detecting range including the high pressure for detecting knock, PSb is the maximum permissible inlet air pressure, and Psa is the minimum permissible inlet air pressure. The range between Aa and Ab is the range of combustion in which the maximum cylinder pressure $P_p$ occurs.

In FIG. 34, when judging the abnormality of cylinder pressure detector 1, cylinder No.k is set to 1 (E0) at first in a pressure sensor abnormality judging routine of FIG. 34. Then cylinder pressure of the No.1 cylinder is sampled at equal crank angle intervals (E01) to determine the cylinder pressure Pk (k=1) of cylinder number k(k=1) and inputted to the combustion diagnosis apparatus 100 (E1).

Whether the sensor is normal or abnormal is judged as follows:
(a) if the pressure detected by the sensor 1 is within the range of PTa~PTb or not over all of the crank angle is judged (E2),
(b) if the pressure is within the range of PSb~Psa or not in the suction range is judged (E3),
(c) further, if the crank angle Ppang of the maximum pressure $P_p$ is within the crank angle range of Aa~Ab or not is judged (E4), and
(d) if the sensor is normal or abnormal is judged in step E7 or E8 by proceeding as follows.

Figure 33A:
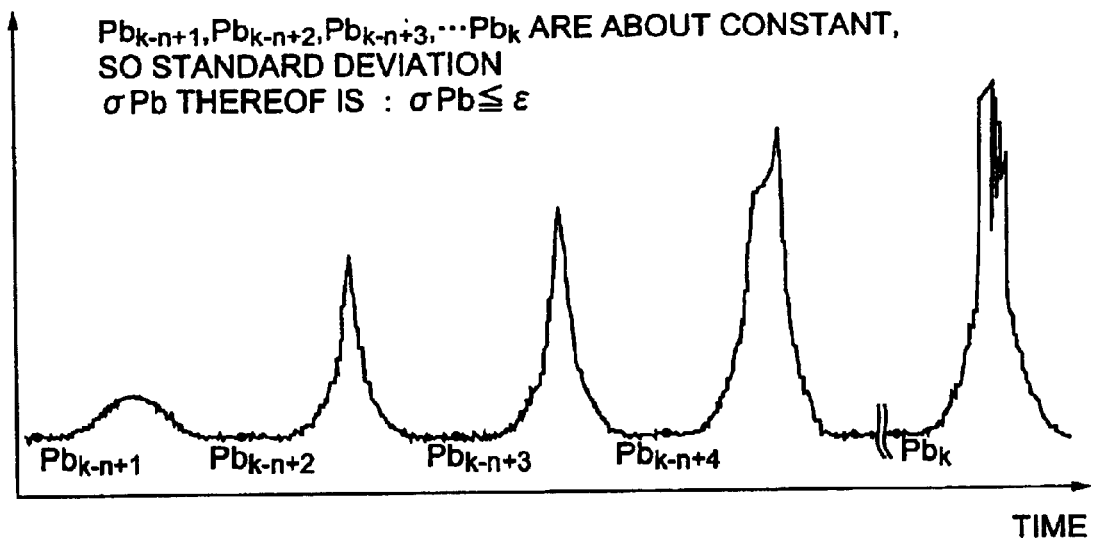
FIG. 33(A) is a diagram showing a cylinder pressure wave form without noise superimposed thereon.
Figure 33B:
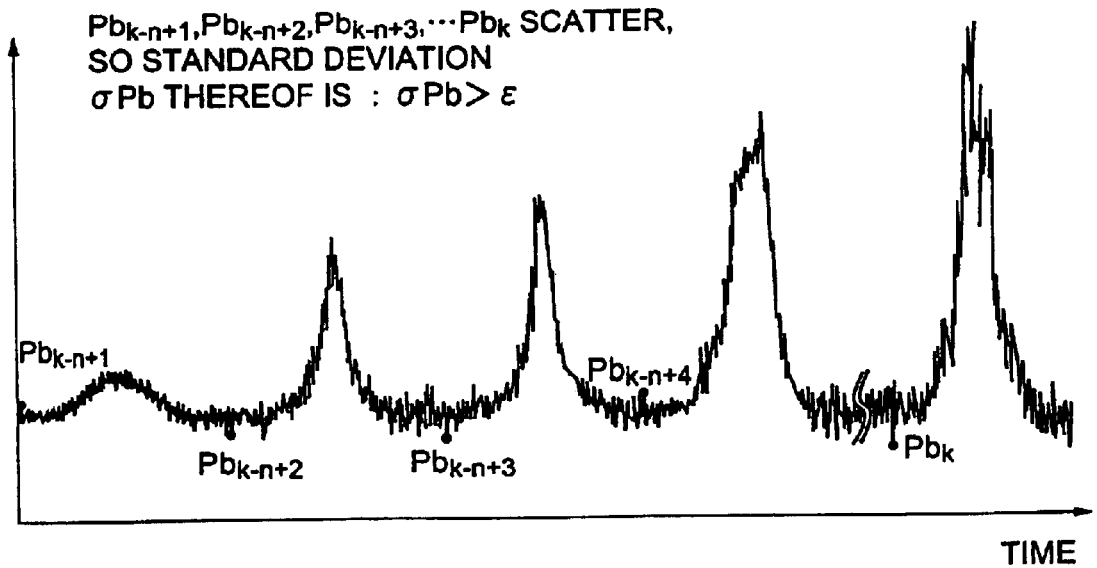
FIG. 33(B) is a diagram showing a cylinder pressure wave form with stationary noise superimposed thereon.

When the sensor is normal, usually the detected cylinder pressure includes almost no noise as shown in FIG. 33(A). If the detected pressure includes noise as shown in FIG. 33(B), the presence or absence of abnormality of the sensor is judged by calculating the standard deviation of Pb as shown in FIG. 34.

If the standard deviation σPb of $\{Pb_{j-n+1}, Pb_{j-n+2}, Pb_{j-n+3}, \ldots, pb_j\}$ is smaller than the permissible standard deviation ε, the sensor is judged to be normal. If the standard deviation is not smaller than the permissible standard deviation ε, the pressure detector(sensor) 1 is judged to be abnormal (E8) when the states which do not suffice any one of the conditions (a)~(d) described above continues to occur for predetermined i times (E6), since the case may occur in which the pressure exceeds instantaneously the range of PTa~PTb owing to trigger pulses due to noise.

Then, the cylinder number k is changed to k=k+1 (E10) to diagnose all cylinders. When all cylinders are diagnosed, k is set to 1 and again the diagnosis of all cylinders is performed.

According to the embodiment, as the sensor 1 is judged to be abnormal by step (a) when there occurs a plurality of the cases in which the detected pressure signal exceed the pressure range of PTb~PTa, the occurrence of spark noise, a break in wire, poor electric contact, etc. can be detected with high accuracy even when there occurs instantaneous overshoot in pressure beyond the pressure range due to trigger pulses, etc. The occurrence of drift due to change with time is detected by step (b). Further, whether the pressure is detected or not with correct relation between the pressure and crank angle is confirmed by step (c).

Therefore, abnormalities in the cylinder pressure detector 1 and crank angle detection are detected from many faces automatically, and runaway of diagnosis can be prevented without fail when the cylinder pressure detector 1 is abnormal. When abnormality occurs in a pressure detector 1, the engine can be operated by controlling only by the combustion control apparatus 200 with diagnosing suspended, or the engine can be halted to repair the detector 1 as shown in FIG. 6, 7, 20.

To be more specific, the combustion controller actuates to retard the ignition timing to a safety range to preserve the abnormality thereof as it is. The combustion diagnosis apparatus diagnoses normally after the sensor is replaced, but in this state the apparatus judges misfire.

If the ignition in the concerned cylinder is effected in this state, the combustion in the cylinder begins with the ignition timing set to a value in the safety range. Combustion control of the cylinder is restarted by manually resetting the sensor of the concerned cylinder, and the combustion recovers to a normal state from a state of rather weak combustion.

FIG. 20 is a total block diagram of the combustion diagnosis system of a gas engine of the embodiment according to the present invention in a case where stepless control is done only in a normal range and corresponds to FIG. 7.

Figure 21:
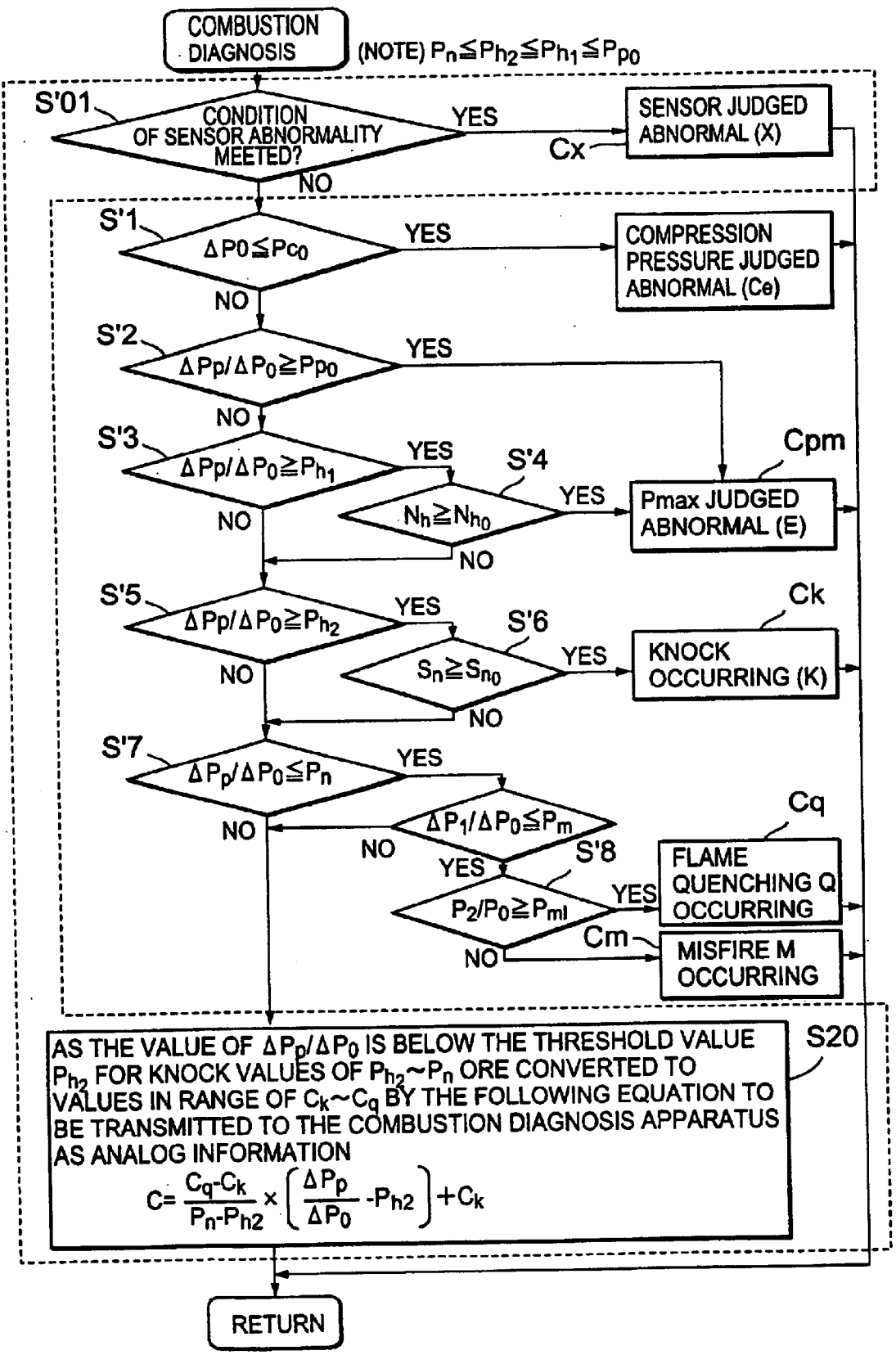
FIG. 21 is a total control flowchart of the combustion diagnosis system of gas engine of the embodiment according to the present invention and corresponds to FIG. 9 except that stepless control is done only in normal range.

FIG. 21 is a total control flowchart of the combustion diagnosis system of a gas engine of the embodiment according to the present invention and corresponds to FIG. 9, except that stepless control is done only in the normal range.

Figure 22:
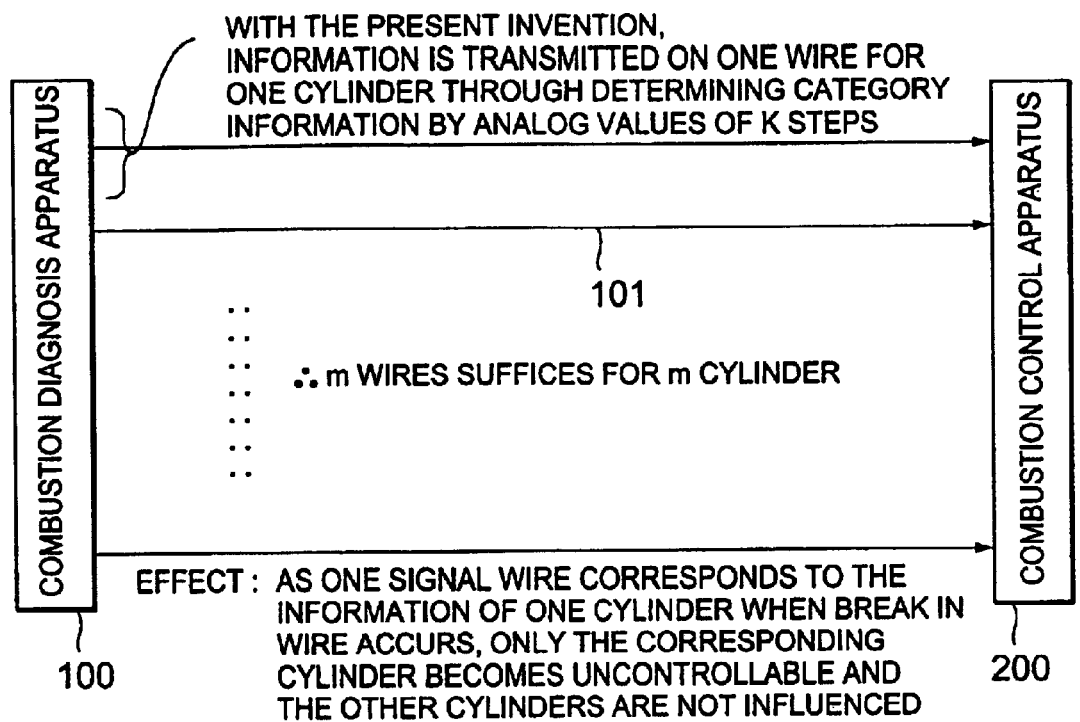
FIG. 22 is an illustration explaining a method of transmission of combustion diagnosis signals in analog form applied to the invention of FIG. 20 and FIG. 21.

FIG. 22 is an illustration explaining the method of transmission of combustion diagnosis signals in analog form applied to the invention of FIG. 20 and FIG. 21.

Figures 23A, 23B:
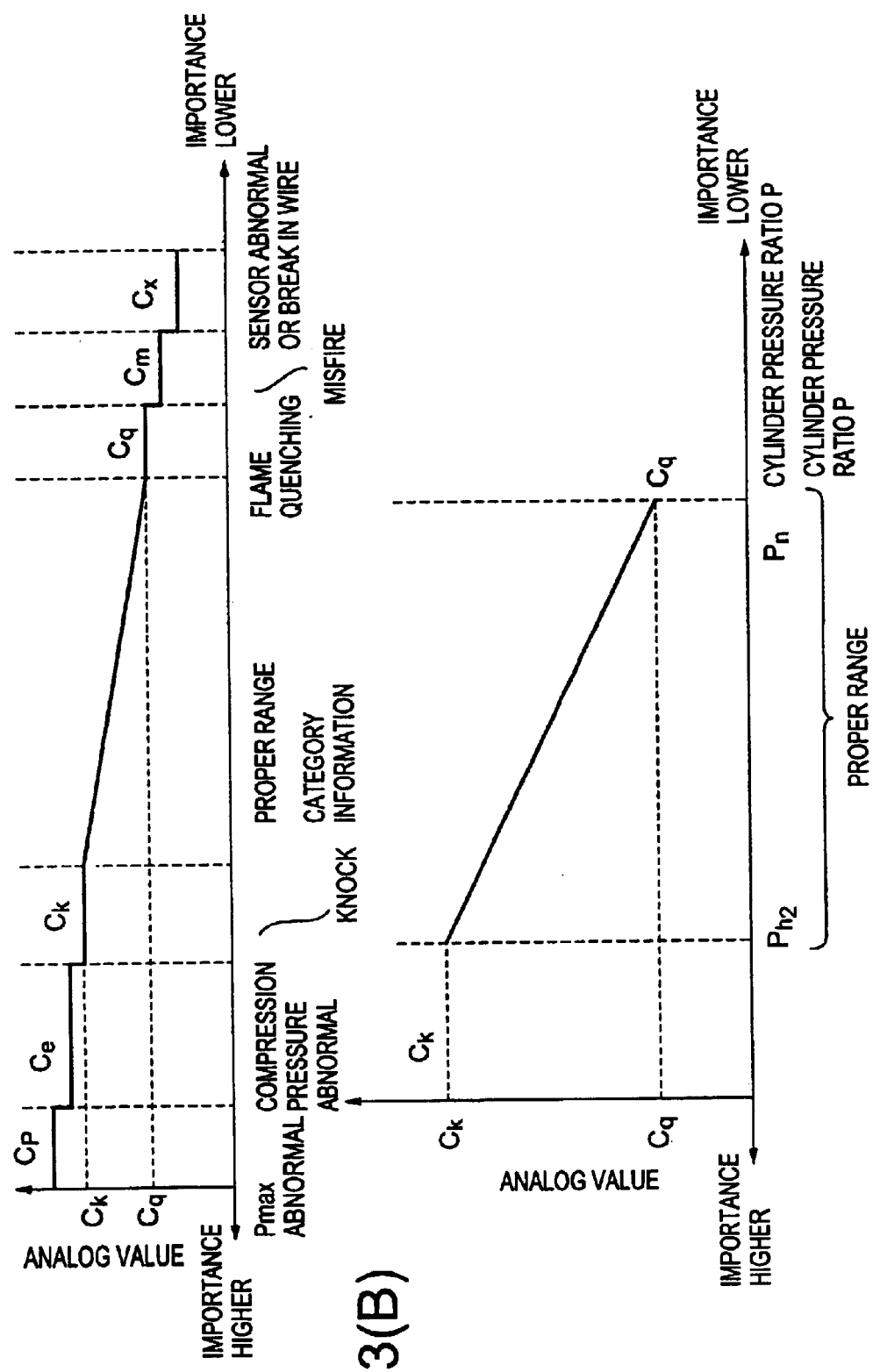
FIG. 23(A) is a graph totally showing the change of value of analog-form signal for each of the categories of a result of combustion diagnosis.
FIG. 23(B) is a graph partially enlarged.

FIG. 23(A) is a graph showing totally the change of the value of analog-form signal for each of the categories of the result of combustion diagnosis, and FIG. 23(B) is a graph and a part of FIG. 23(a) enlarged.

FIG. 24 is a pressure curve for explaining the detection of cylinder pressure for combustion diagnosis.

In this embodiment, differing from the cases of previous embodiments, threshold values are provided for detected pressure in the combustion range of crank angle of the range Aa~Ab shown in FIG. 24 so that stepwise representation of analogue value is possible in a serial data transmission wire.

Each level of threshold values $P_{p0}$ and $P_{h1}$ for detecting the abnormal Pmax, $P_{h2}$ for detecting knock, $P_n$ for detecting misfire and flame quenching, etc. are determined to be $P_{p0} \geq P_{h1} \geq P_{h2} \geq P_{sh} \geq P_{s1} \geq P_n$, the level decreasing stepwise.

Returning to FIG. 21, if the sensor is judged to be normal in step S'01, then whether compression pressure difference $\Delta P_0$ is abnormally low or not is judged at (S'1).

The reference pressure difference $\Delta P_0$ detected in the compression stroke range is compared with the permissible pressure difference $P_{c0}$ (threshold value) for $\Delta P_0$, and when $\Delta P_0 \leq P_{c0}$, the compression pressure Pc is judged to be abnormally low due to mechanical trouble such as gas leakage (S'1).

When the condition of step S'2 holds, or the number $N_h$ of operated cycles in S'3 is equal to or exceeds the permissible number $N_{h0}$ (S'4), the maximum cylinder pressure $P_p$ is judged to be abnormally elevated over the design value (normal value).

Knock judging step S'5~S'6, and misfire and flame quenching judging step S'7~S'9 are the same as FIG. 9.

Thus, in the embodiment, combustion diagnosis is performed by comparing standardized cylinder pressure ratio $\Delta P/\Delta P_0$ in the combustion range with threshold values determined for every diagnosis category information, each level of the threshold values being decreased stepwise so that the information of a different category can be judged based on the corresponding level of threshold value. Detection range is set to be in the crank angle near the maximum pressure, the threshold values being $P_{p0}$ and $P_{h1}$ for detecting abnormal Pmax, $P_{h2}$ for detecting knock, $P_n$ for detecting misfire and flame quenching, etc. The level of each threshold value is decreased in orderly sequence of $P_{p0} \geq P_{h1} \geq P_{h2} \geq P_{sh} \geq P_{s1} \geq P_n$.

Accordingly, as the standardized maximum pressure ratio $\Delta P_p/\Delta P_0$ in normal combustion is below the threshold value for knock, i.e. $\Delta P_p/\Delta P_0 < P_{h2}$, values of $P_{h2} \sim P_n$ are converted by the following equation to values in the range of Ck~Cq to be transmitted to the combustion diagnosis apparatus as analogue information in step 20 in FIG. 21.

$$C=\{(Cq-Ck)/(P_n-P_{h2})\} \times \{(\Delta P_p/\Delta P_0)-P_{h2}\}+Ck$$

FIG. 20 is a block diagram showing total configuration of the embodiment of a gas engine combustion diagnosis system, in which diagnosis is done by determining threshold values shown in FIG. 23(A) and FIG. 23(B) for the maximum pressure $P_p$ detected in the range of crank angle Aa~Ab corresponding to combustion range.

In the drawing, reference numeral 20 is the multi-cylinder engine, 100 is the combustion diagnosis apparatus which diagnoses the combustion by detected cam top crank angle and cylinder pressure-crank angle data through following the flow shown in FIG. 21.

The result of the diagnosis is transmitted on analog levels shown in FIG. 23(A) and FIG. 23(B), i.e. Cp: analog level for transmitting abnormal Pmax judgement, Ce: analog level for compression pressure judgement, Ck: analog level for knock judgement, Cq: analog level for flame judgement quenching, Cm: analog level for misfire judgement, and Cx: analog level for abnormal sensor judgement. Each analog level is determined to decrease stepwise in an orderly sequence of Cp>Ce>Ck>Cq>Cm>Cx.

The signal of the result of diagnosis transmitted from the combustion diagnosis apparatus 100 to the combustion control apparatus 200 is composed of analog levels, each analog level being determined for each diagnosis category. Therefore, the combustion control apparatus 200 is able to judge each information of a different category at each pertinent analog level. The analog level for transmitting the information of a diagnosis category of a normal combustion state is positioned in the center part of the levels, the level for transmitting the information of abnormal maximum cylinder pressure or compression pressure, which generally relates to engine conditions as a whole, is set to a value in a higher level range, and the levels for transmitting the information of misfire, flame quenching, abnormal sensor, and break in wire, that are generally experienced in an individual cylinder, are set to a value in a lower level range. When the range of normal combustion pressure or pressure ratio of each cylinder, the pressure or pressure ratio being between the threshold for knock and that for flame quenching, is transmitted to the combustion control apparatus by way of signal transmitting wire 101 (see FIG. 22) at an analog level, the pressure or pressure ratio converted to a stepless analog level signal corresponding with the pressure or pressure ratio can be transmitted to the combustion control apparatus 200. Accordingly, with the combustion diagnosis/control apparatus of an internal combustion engine, the number of analog signal transmission wires corresponding with the number of cylinders is connected between the combustion diagnosis apparatus 100 and combustion control apparatus 200, and the diagnosed result of each diagnosis category is transmitted in serial order on each of the analog signals, which are set in stepwise decreasing sequence. The combustion control apparatus judges the diagnosis category or can determine the combustion pressure or pressure ratio corresponding with the analog signal.

Therefore, as shown in FIG. 22, by sending each information in an analog signal of pertinent level in serial order, the analog information of K category of diagnosis result can be transmitted on one analog signal transmission wire 101 per cylinder, which means that m wires suffice for m cylinders.

As one of the signal transmission wires 101 corresponds to the information of one of the cylinders, only the combustion in the cylinder of which the wire is broken becomes uncontrollable, and the combustion in other cylinders is not influenced. Furthermore, as the information is analog, malfunctions do not occur due to noise in the signals.

Concerning the normal pressure range, P is calculated by $P=\Delta P_p/\Delta P_0$, and analog information thereof is calculated by the following equation:

$$C=(Cq-Ck) \times (P-P_{h2})/(P_n-P_{h2})+Ck.$$

Thus, by the conversion of $\{P_{h2} \sim P_n\} \rightarrow \{Ck \sim Cq\}$, the combustion control apparatus 200 receives stepless pressure level information in the normal combustion range.

The received analog information $\{Ck \sim Cq\}$ is again converted to pressure information $\{P_{h2} \sim P_n\}$ in the control apparatus 200, as shown in FIG. 20, by the following equation:

$$P=\{(P_n-P_{h2})/(Ck-Cq)\} \times (C-Ck)+P_{h2}.$$

Then, the ignition timing is changed from T to T+$\Delta$T, where $\Delta$T=F$\times$(P-Psm), F is a feedback gain constant, and Psm is a target figure of cylinder pressure ratio in a normal combustion state.

Thus, by retarding or advancing the ignition timing by a certain crank angle $\Delta$T in the normal pressure range $\{P_{h2} \sim P_n\}$, the engine can be effectively maintained to operate with desired performance. The combustion control apparatus 200 always controls the combustion condition according to the result of moment-to-moment diagnosis obtained by the combustion diagnosis apparatus through changing the fuel ignition timing of pilot fuel or gas fuel, or fuel injection quantity.

Next, the construction of the displaying apparatus 6 shown in FIG. 1 and FIG. 6 will be explained with reference to FIG. 25–FIG. 31.

The display connected to the combustion diagnosis apparatus of the present invention can display two kinds of data, combustion diagnosis data and pressure waves.

Figure 25:
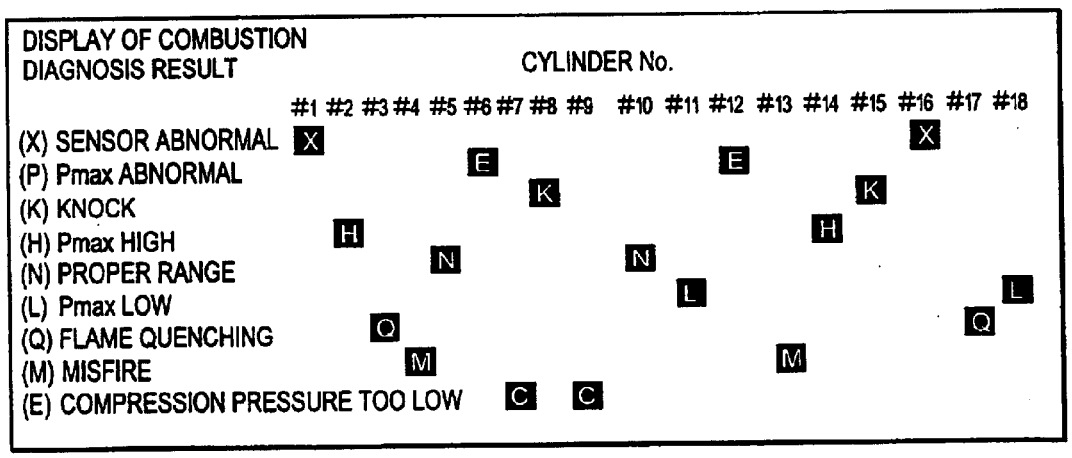
FIG. 25 is a representation showing a display of results of combustion diagnosis sent from the combustion diagnosis apparatus in which the results are given for each cylinder number and each item of abnormality.

FIG. 25 shows an example of displayed combustion diagnosis result. In the drawing, cylinder numbers #1~# 18 are arranged in columns, diagnosis categories are arranged in rows, and the result of each diagnosis category for each cylinder transmitted from the combustion diagnosis apparatus is displayed by pertinent mark such as abnormal sensor(X), abnormal maximum pressure $P_p$ (E), knock(K), high maximum pressure $P_p$ (H), adequate maximum pressure $P_p$ (N), low maximum pressure $P_p$ (L), flame quenching (Q), misfire(M), and reduced compression pressure (C). These results are renewed per cycle according to the diagnosis result.

Each mark of the diagnosis category is shown in blank letter in a black rectangle so as to be easily recognized, as the number of cylinders is large in this case.

Figure 26:
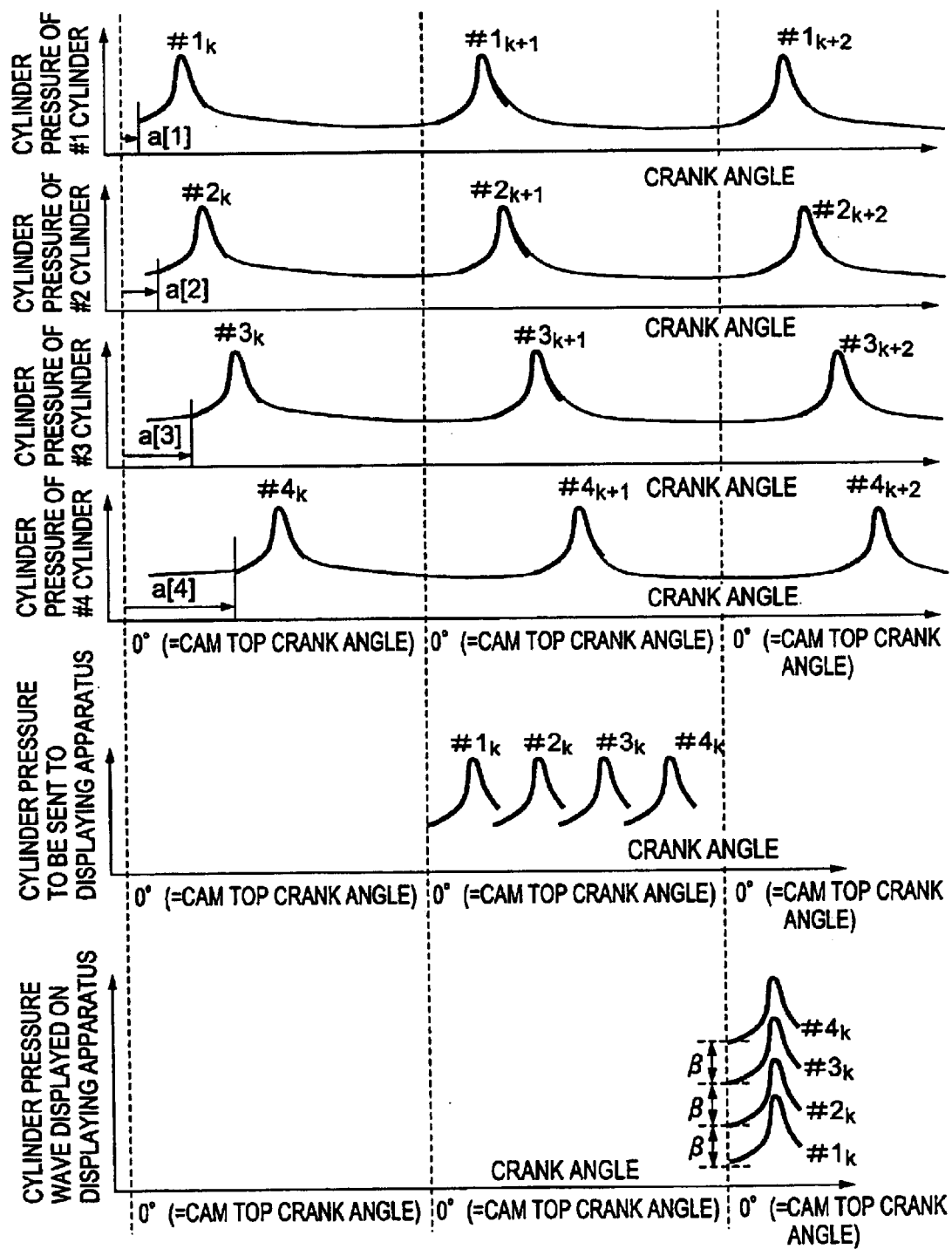
FIG. 26 is a diagram showing a process of transmittal of cylinder pressures wave form from the combustion diagnosis apparatus side to the display side in which an example in the case of a 4-cylinder engine is shown.

FIG. 26 shows the representation of the cylinder pressure waves of each cylinder of a 4-cylinder engine in the display and the process of transmitting the pressure waves from the combustion diagnosis apparatus to the display, as an example of a multi-cylinder engine.

The pressure wave-forms in the top to $4^{th}$ stage in the drawing are the detected cylinder pressure wave-forms of the four cylinders in which the pressure waves are shown for every cycle, the crank angle of cam top (of the inlet cam) being indicated as 0°, the pressures being measured at equal interval of crank angle.

The pressure waves of four cylinders are shown in the display 124 as shown in the last but one stage. The data is transmitted from the combustion diagnosis apparatus 100 to the displaying apparatus 6 in serial order, as there is no relation between displaying and controlling of combustion.

Only the thick line part which is necessary for combustion diagnosis in the pressure wave detected after the detection of cam top crank angle is represented on a display 124.

The thick line part of each pressure-crank angle curve of four cylinders is written to the first ring memory of the combustion diagnosis side every time the pressure is detected by the cylinder pressure detector(sensor). These pressure-crank angle curves are transmitted on the signal transmission wire 101 to the displaying apparatus 6 in such a way that the pressure of each cylinder is retarded in phase from that of the cylinder of next cylinder number by crank angle {a1}, {a2}, {a3}, {a4}, respectively. They are transmitted in serial order in the crank angle range of 720° of one cycle, and thus the small number of transmission wires 101 is effectively utilized. If the transmission range is set to 60~80° crank angle for example, the pressure waves are possible to be sent on the signal transmission wire 101 in serial order within 720° of one cycle.

The representation in the last stage in the drawing shows the cylinder pressure curves displayed on the oscillogragh 124 of the displaying apparatus 6. As shown in the representation, each of the curves is shown on the oscillogragh 124 of the displaying apparatus 6 at a spacing of pressure value β for easy recognition of all of the pressure curves, as the cylinder pressure curves are very similar to each other.

For realizing this, the curves sent from the combustion diagnosis side by retarding in phase by crank angles of {a1}, {a2}, {a3}, {a4}, respectively are advanced by the same crank angles and displayed with reference to the cam top crank angle of a reference cam (for example, the inlet cam of #1 cylinder) with a spacing of pressure value β.

Figure 27:
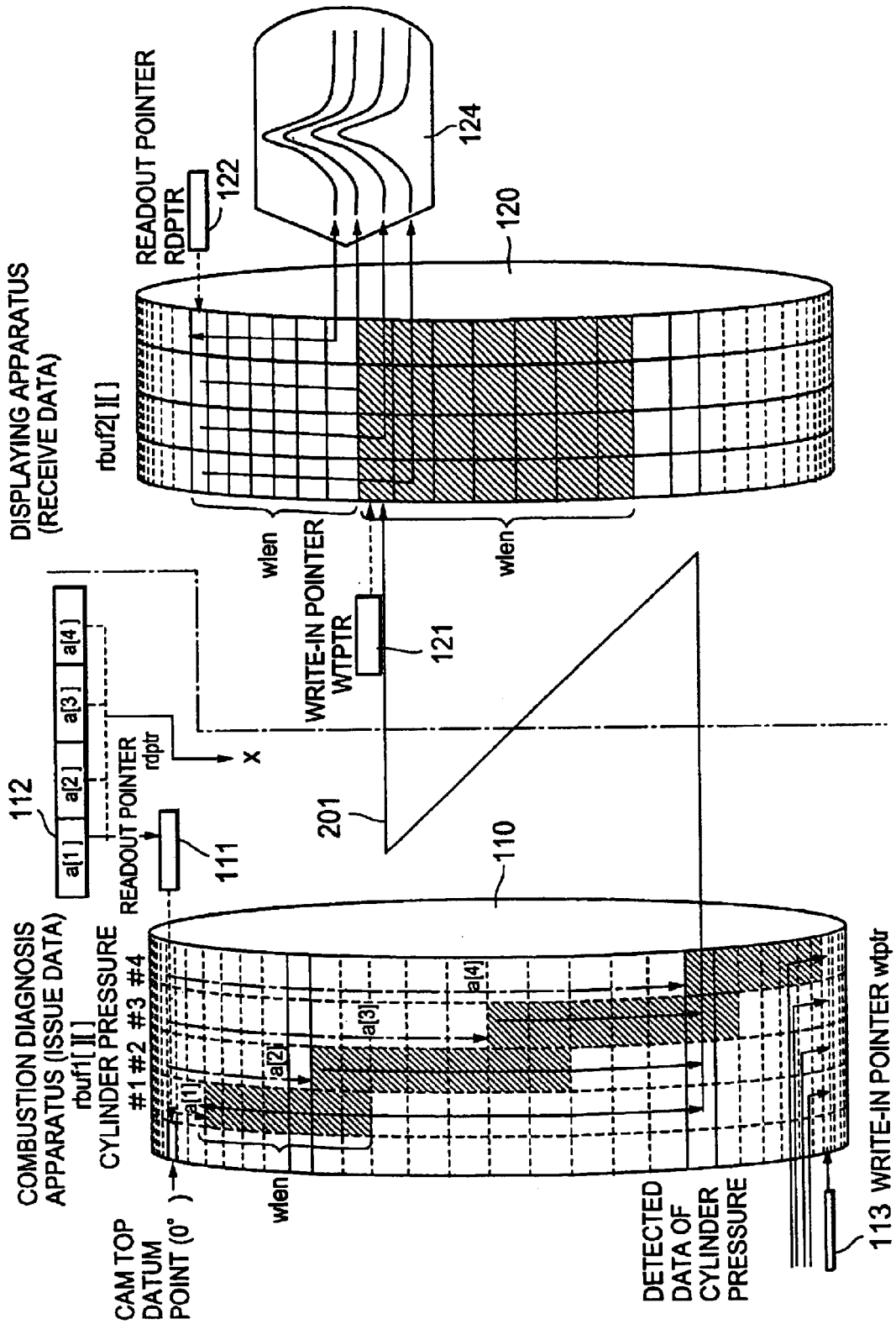
FIG. 27 is a representation showing the configuration of data in the combustion diagnosis apparatus side and display side.

FIG. 27 shows an example of data configuration on the combustion diagnosis apparatus side and displaying apparatus side to perform the displaying.

First, constituent elements for data processing on the combustion diagnosis apparatus side will be explained.

A ring buffer memory 110 (rbuf1) of the combustion diagnosis apparatus side has a memory part for memorizing the cam top crank angle of the reference cam and ring memory parts for memorizing the pressure curves of #1~#4 cylinders during at least 720° of one cycle or above, concretely, during several cycles.

A write-in pointer 113 determines the position for writing the detected data from the cylinder pressure detector 1 and crank angle detector 2.

Reference numeral 112 is a memory for memorizing the relative angle information that are crank angles {a1~a4} from the cam top crank angle of the reference cam to the start crank angle of each pressure curve. Reference numeral 111 is a readout pointer for reading from the ring memory parts each pressure curve with the timing determined based on the memorized angle information of {a1~a4} in order to read out the data with crank angle phase retarded by angle {a1}, {a2}, {a3}, {a4}, respectively.

Next, constituent elements for data processing on the displaying apparatus side will be explained.

A ring buffer memory 120 (rbuf2) of the displaying apparatus side has four ring memory parts for memorizing pressure curves, in which the pressure data of #1~#4 cylinders sent from the combustion diagnosis 100 side with crank angle phase retarded by angle {a1}, {a2}, {a3}, {a4}, respectively are memorized in a certain area (wlen) in sequence with crank angle phase advanced this time by angle {a1}, {a2}, {a3}, {a4} respectively.

Reference numeral 121 is a write-in pointer for determining write-in timing to write in the pressure data transmitted on the serial signal transmission wire 101 with crank angle phase advanced by angle {a1}, {a2}, {a3}, {a4}, respectively, to the ring memory parts corresponding to #1~#4 cylinders.

Reference numeral 122 is a readout pointer for determining the timing to read out the data from the ring memory parts corresponding to #1~#4 cylinders, giving pressure spacing value β between each pressure data.

Figure 28:
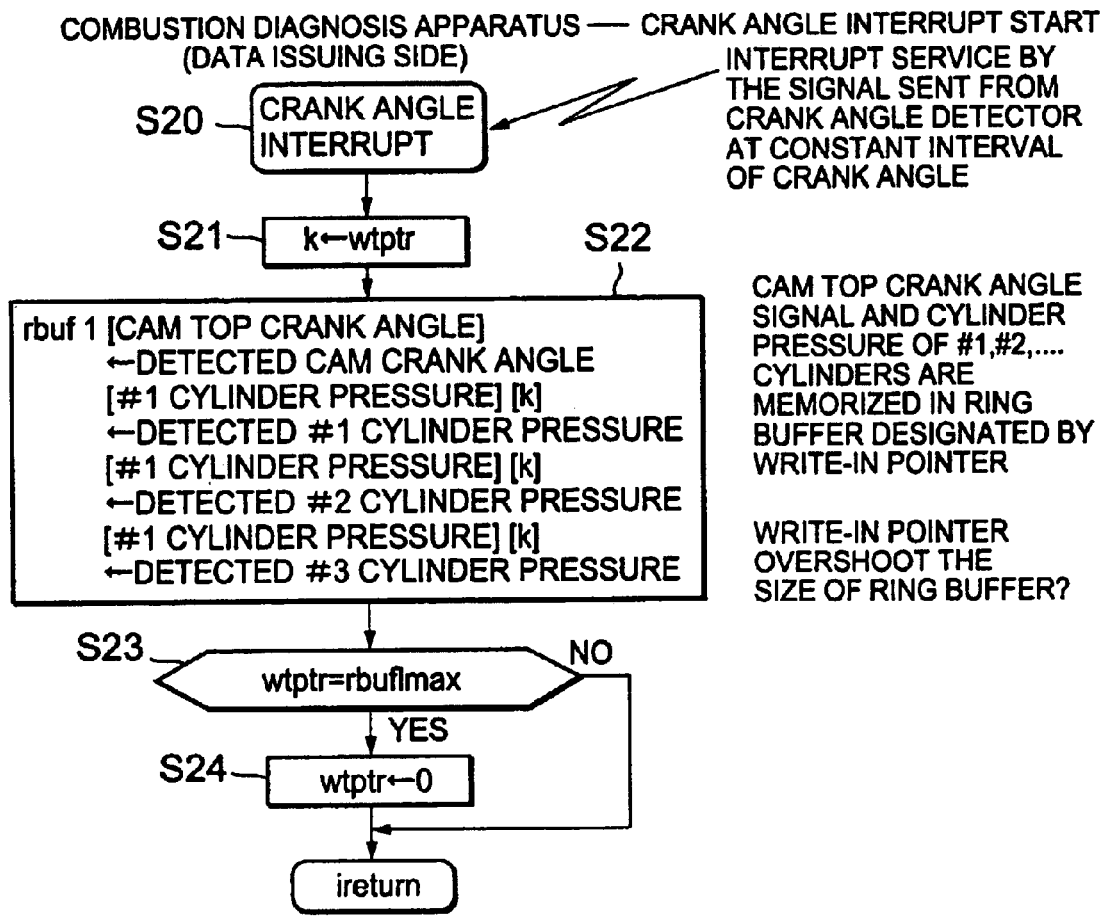
FIG. 28 is a wave form recording flowchart(1) of the data configuration, which is an interrupt processing flowchart of crank angle of the combustion diagnosis apparatus side(data sending-out side).
Figure 29:
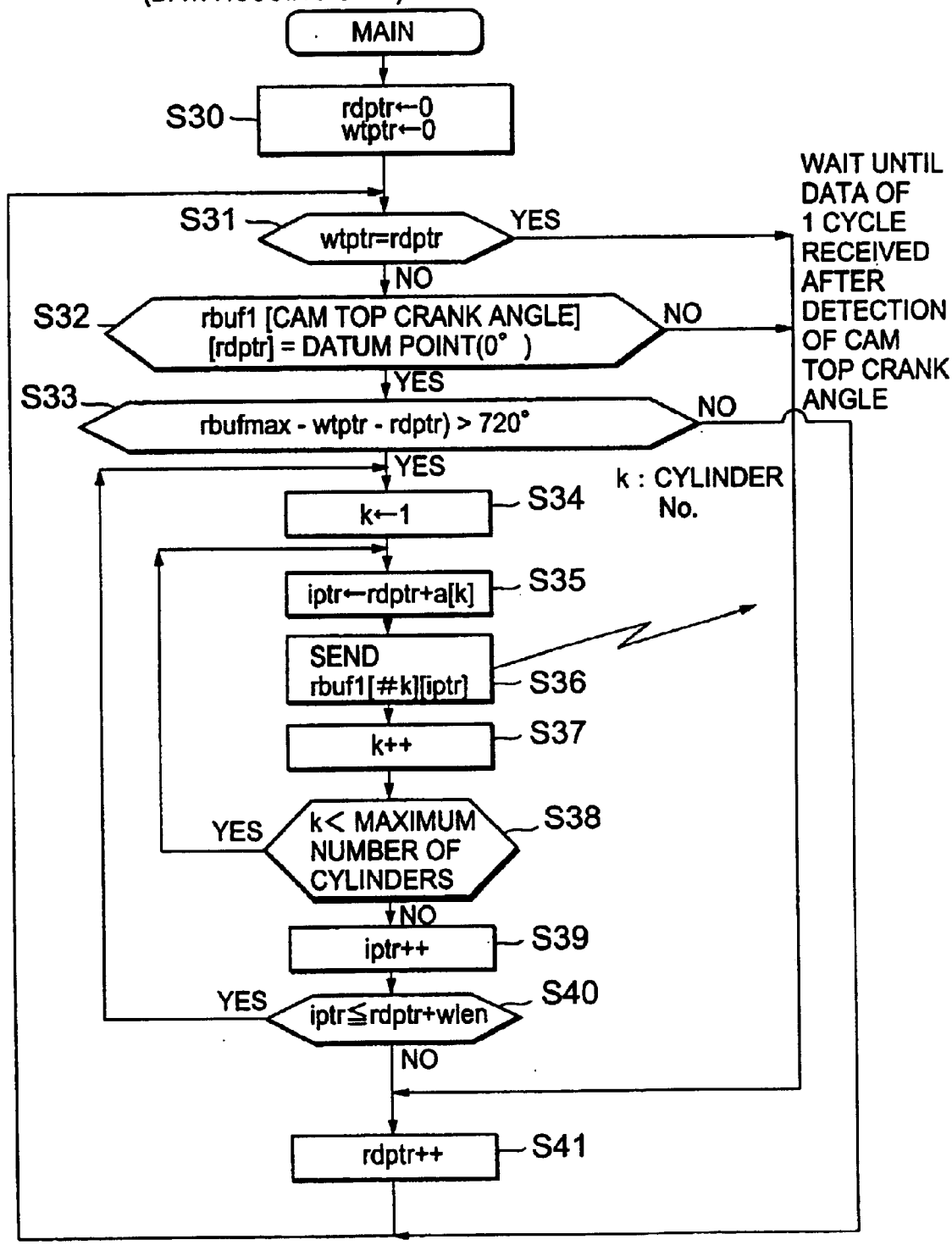
FIG. 29 is a wave form recording flowchart(2) of the data configuration, which is a main processing flowchart of the combustion diagnosis apparatus side(data sending-out side).
Figure 30:
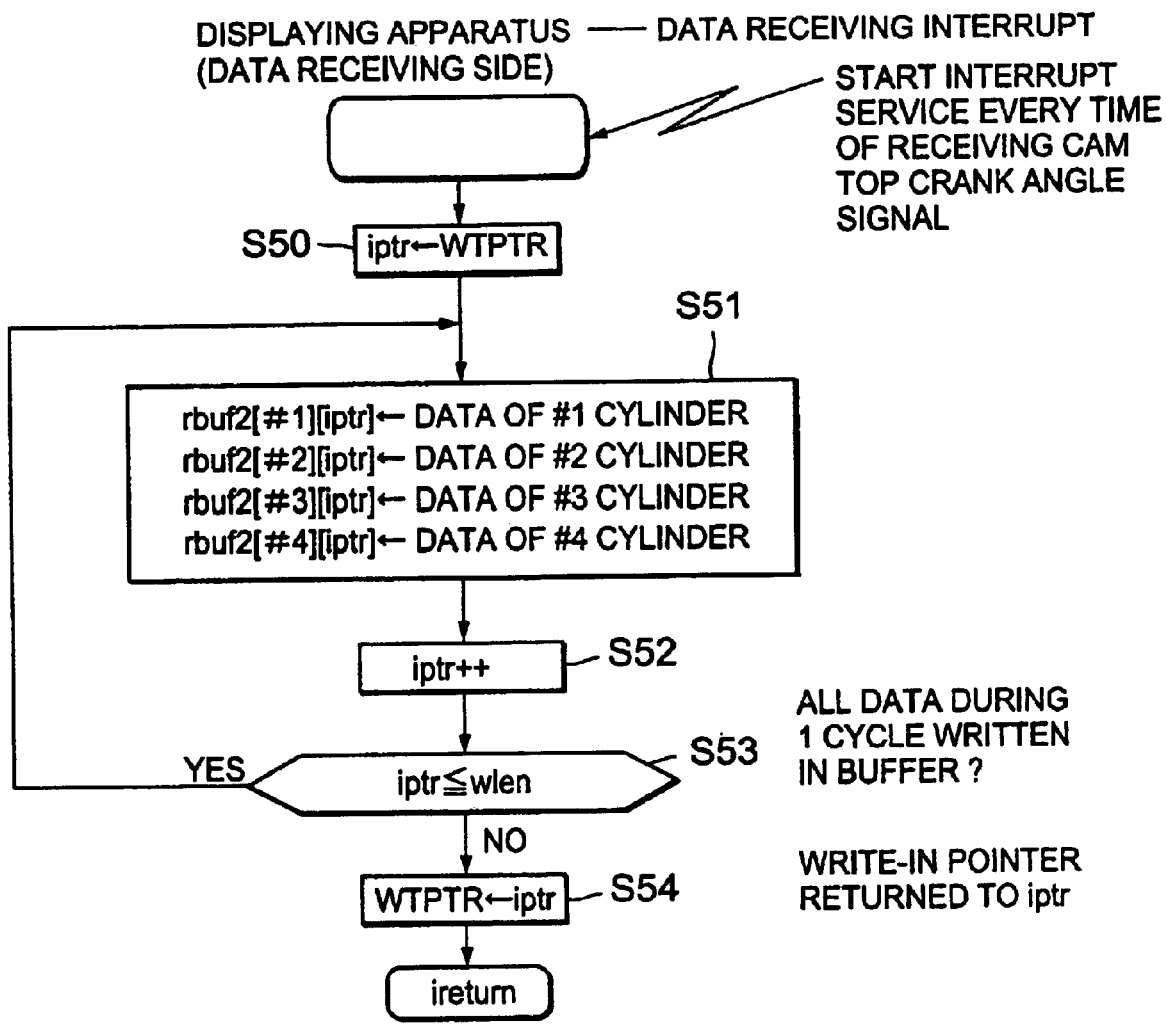
FIG. 30 is a wave form recording flowchart(3) of the data configuration, which is an interrupt processing flowchart of data received at the display side(data receiving side).
Figure 31:
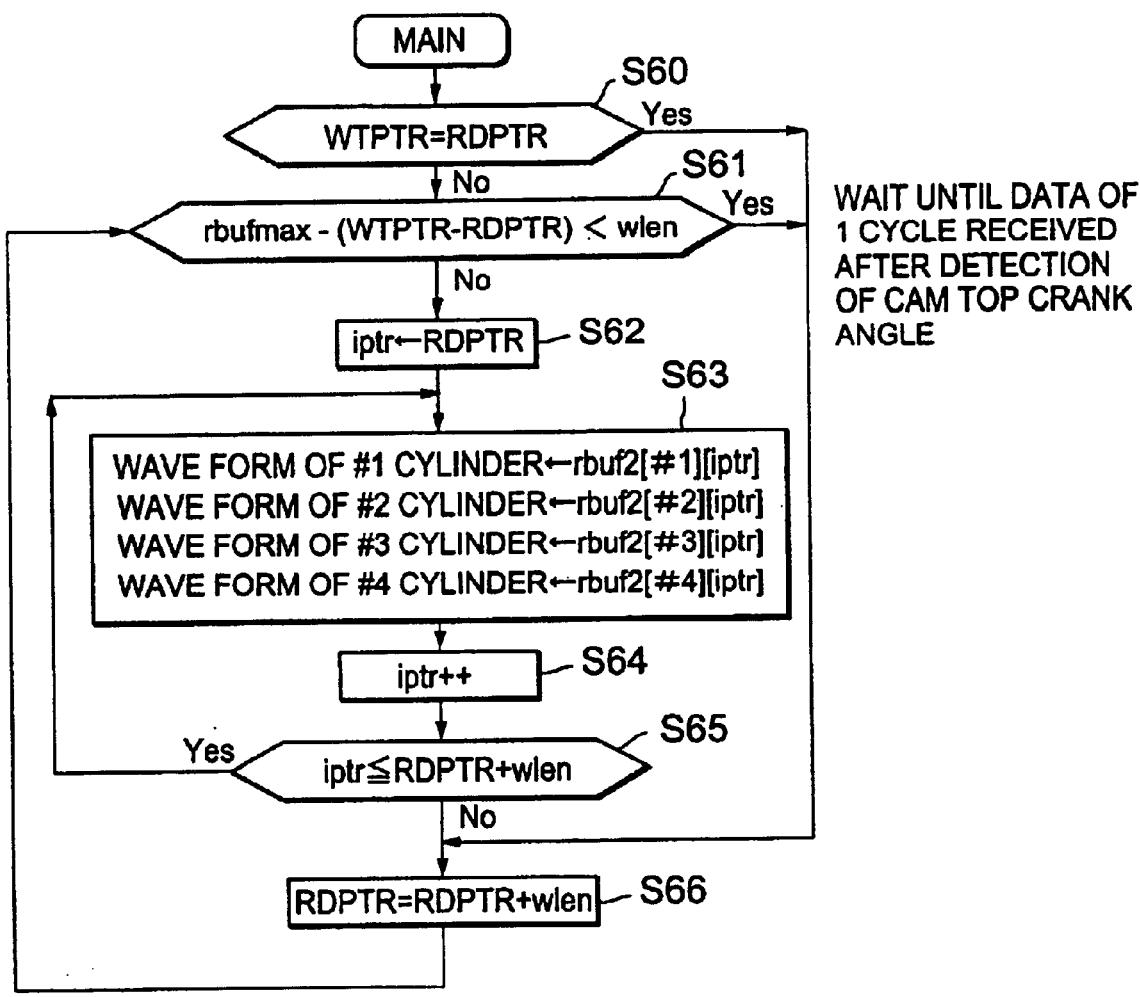
FIG. 31 is a wave form recording flowchart(3) of the data configuration, which is a main processing flowchart of the display side(data receiving side).
Figure 32:
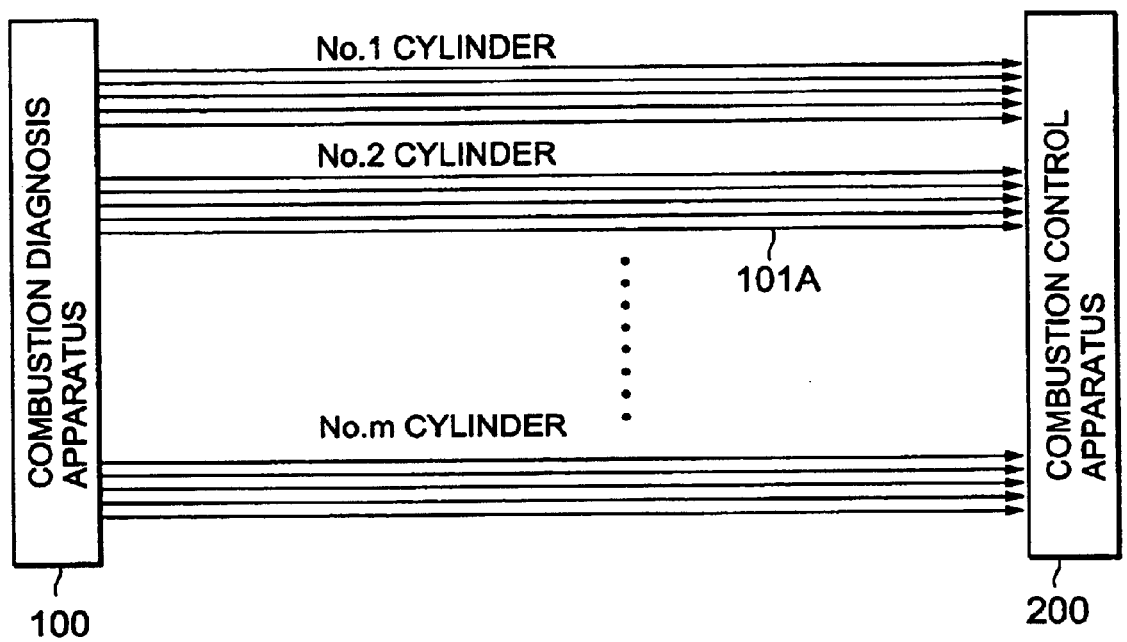
FIG. 32 an illustration explaining a method of transmission of combustion diagnosis signals in digital form.

FIG. 28~FIG. 31 are flowcharts for processing the pressure data for display. FIG. 28 is a crank angle interrupt handling flowchart on the combustion diagnosis apparatus side(data sending-out side), FIG. 29 is a main processing flowchart on the combustion diagnosis side(data sending-out side), FIG. 30 is a data reception interrupt handling flowchart on the displaying apparatus side(data receiving side), and FIG. 31 is a a crank angle interrupt handling flowchart on the displaying apparatus side(data receiving side).

In FIG. 28, the program is started with interrupt timing of the signal from the crank angle detector (S20). The write-in pointer 113 is set to k(0~4) (S21) and the detected cam top crank angle of the reference cam is written to the memory part of the ring buffer memory rbuf1 for memorizing the cam top crank (0°) of the reference cam when k=0. Then the pressure data of #1~#4 cylinders are written to the corresponding ring memory part in succession (S22).

Similar operation is effected in the succeeding cycles until the write-in pointer runs over the size of the ring buffer memory rbuf1. When the write-in pointer 113 overruns the size of the ring buffer memory rbuf1 (S23), the write-in pointer is initialized to 0 (S24) to overwrite from the initial part of the ring memory.

FIG. 29 is a main processing flowchart of the combustion diagnosis apparatus side(data sending-out side).

The write-in pointer and readout pointer is set to 0 (S30), after the cam top crank angle of the reference cam is detected (S32), if memory area for more than 1 cycle of crank angle (720°) is remaining in the write-in memory area of the ring buffer rbuf1 (33). k is set to 1 for #1 cylinder(34), crank angle a1 is read out from the timing memory, and the pressure data of #1 cylinder in the crank angle range corresponding to the diagnosis range is transmitted on the signal transmission wire 101 to the displaying apparatus 6.

Then, k is increased (S37), and when k does not exceed the number of cylinders, crank angle a2, a3, a4, . . . is read out every time k is increased by 1 to transmit successively the pressure data of each cylinder to the displaying apparatus with the crank angle phase thereof retarded by the value of the corresponding crank angle (S36).

When k is equal to or succeeds the number of cylinders (S38), next write-in area iptr is set to iptr++ (S39), if the write-in area is equal to or larger than rdptr+ wlen (area corresponding to the diagnosis range) (S40). A similar operation is repeated to write the data successively into the still-unwritten area in the ring buffer rbuf1. When write-in area itpr is smaller than rdptr+ wlen (area corresponding to the diagnosis range), iptr is set to rdptr++ to proceed to overwriting to the ring buffer rbuf1 (s41).

Thus, the pressure-crank angle data of each cylinder and cam top crank angle of the reference cam detected by the cylinder pressure detector 1 and crank angle detector 2 are memorized to the ring buffer rbuf1 in the combustion diagnosis apparatus 100.

Next, displaying apparatus side (data receiving side) will be explained.

Referring to FIG. 30, data interrupt is started every time data is received from the signal transmission wire 101 and write-in pointer is set to iptr (S50) to write each data of #1~#4 cylinders to the corresponding ring memory part of the ring buffer rbuf2 (S51).

After the data of #1~#4 cylinder are written in iptr area of the ring buffer rbuf2, write-in area is advanced to iptr++ (S52), and similar operation is effected until all data of one cycle are written in (S53).

When all the data are written in, the write-in pointer 122 is again set to iptr to effect the writing-in of the next cycle (S54).

Next, the main processing flow on the display side(data receiving side) will be explained with reference to FIG. 31.

First, whether the position of the write-in pointer coincides or not with that of the readout pointer is judged (S60). When coinciding, the position is advanced by wlen and waits until full data of one cycle after detecting cam top crank angle of the reference cam is received (S66).

When difference between the memory capacity of the ring buffer rbufmax and difference {the position of write-in pointer WTPTR—the position of the readout pointer RDPTR}, i.e. remaining area of the ring buffer memory is equal to or larger than wlen (S61), the readout pointer is matched with the cam top crank angle (S62), and the data of #1~#4 cylinders are read out from the corresponding ring memory part in the ring buffer rbuf2 (S63).

When all the data (pressure curves in the diagnosis range), each data being the pressure-crank angle curve in a certain crank angle range wlen from the pressure wave data beginning point which is at a crank angle of relative crank angle information a1, a2, . . . , respectively, from the cam top crank angle of the reference cam, are received, for example when the cam top crank angle for the next cycle is detected, the pressure curves are displayed on the oscilloscope 124 of the displaying apparatus with the pressure curve of each cylinder spaced by a pressure value β.

After all the data of #1~#4 cylinders are read out from iptr area of the ring buffer rbuf2, the readout area is advanced to iptr++ (S65), and similar operation is effected until all the data during one cycle are written in the crank angle range wlen.

Then, whether the position of the readout pointer coincides or not is determined, and if coinciding, the readout pointer is advanced by wlen to be returned to S61 to readout the data of the next cycle.

As described in the foregoing, according to the present invention, combustion diagnosis can be done which detects the occurrence of knock, misfire, excessive elevation of the maximum cylinder pressure, and flame quenching, with a combustion diagnosis system by diagnosing combustion using the pressure ratio based on the detected cylinder pressure. Therefore, all categories necessary for combustion diagnosis of an internal combustion engine can be performed by an apparatus of simple constitution and low cost.

As the combustion diagnosis is effected by using the pressure ratio based on the cylinder pressure as mentioned above, the absolute value of the cylinder pressure is not required. So, even when the output level from the cylinder pressure detector totally decreases, normal combustion diagnosing functions can be maintained without a reduction in accuracy. Accordingly, life expectancy of usage of the combustion diagnosis system can be extended.

Further, highly accurate combustion diagnosis can be possible by using the detected cylinder pressure signal with only noise eliminated and complicated computation is not required, so the efficiency of operation of combustion diagnosis is increased.

Yet further, the combustion diagnosis can be performed directly by using only the detected cylinder pressure, so highly accurate combustion diagnosis is possible with simple means(steps).

Therefore, according to the present invention, all the necessary combustion diagnosis such as the occurrence of knock, misfire, excessively high maximum cylinder pressure, and flame quenching can be performed, and reduction in engine performance can be detected without delay and with high accuracy.

Still further, according to the present invention, the combustion diagnosis is effected by using the standardized cylinder pressure ratio $\Delta P/\Delta P_0$ based on the pressure difference between the concerned pressure P and a reference pressure $P_b$ at or before the beginning of compression, including inlet air pressure with small fluctuation in pressure, i.e. $\Delta P = P - P_b$, so the absolute cylinder pressure is not required. Therefore, even when the output level from the cylinder pressure detectors totally decrease or increase, normal diagnosis can be performed, maintaining expected accuracy without reduction in accuracy thereof.

Further, according to the present invention, by stopping the engine by allowing the combustion control apparatus to activate the engine operation stopper when a diagnosis result has been outputted from the combustion diagnosis apparatus that the standardized maximum pressure ratio $\Delta P_p/\Delta P_0$ is equal to or exceeds the predetermined permissible maximum pressure ratio $P_{p0}$, the detection of excessively high maximum cylinder pressure and action to deal with that can be taken exactly without delay. Therefore, engine breakage or reduction of engine durability due to the excessive high cylinder pressure can be prevented with reliability.

Further, when the standardized maximum pressure ratio $\Delta P_p/\Delta P_0$ is judged to be equal to or exceeds the maximum reference pressure ratio $P_{sh}$, the fuel ignition timing is retarded by a certain crank angle by the combustion control apparatus. When the standardized maximum pressure ratio $\Delta P_p/\Delta P_0$ is judged to be smaller than the maximum reference pressure ratio $P_{sh}$, the fuel ignition timing is advanced by a certain crank angle by the combustion control apparatus. Therefore, the cylinder pressure is maintained below the maximum reference pressure and the expected engine performance is maintained, resulting in suppression of increased generation of NOx due to excessively high combustion temperature.

Further, according to the present invention, when a diagnosis result has been outputted from the combustion diagnosis apparatus that knock has occurred by comparing the standardized maximum pressure ratio $\Delta P_p/\Delta P_0$ with a knock threshold, the knock is prevented without delay and with reliability by retarding the fuel ignition timing by a certain crank angle through the combustion control apparatus, and the engine can always be operated in the high performance range just before knock occurs.

Further, according to the present invention, when a diagnosis result has been outputted from the combustion diagnosis apparatus that the number of continual cycles, in which the standardized maximum pressure ratio $\Delta P_p/\Delta P_0$ reaches the predetermined permissible pressure ratio of misfire, reaches the predetermined permissible number of continual cycles, the fuel injection to the concerned cylinder in which misfire has occurred is cut off. Thus, the occurrence of misfire is detected with reliability without delay and measures can be taken to deal with the situation, that is, to stop the fuel injection to the concerned cylinder, through which the operation of the other cylinders can be continued without being influenced by the concerned cylinder.

Further, according to the present invention, when a diagnosis result has been outputted from the combustion diagnosis apparatus that the standardized maximum pressure ratio $\Delta P_p/\Delta P_0$ and combustion pressure ratio $\Delta P_1/\Delta P_0$ is equal to or smaller than permissible minimum pressure ratio $P_n$ and permissible pressure ratio of misfire $P_m$, respectively, and the combustion pressure ratio $\Delta P_2/\Delta P_0$ is equal to or larger than permissible pressure ratio of flame quenching $P_{m1}$, the fuel injection to the concerned cylinder in which flame quenching has occurred is increased. Thus, the occurrence of flame quenching is detected with reliability without delay and measures can be taken to deal with the situation, that is, to increase the quantity of fuel injection to the concerned cylinder, through which the continuation of misfire is prevented and the operation of the other cylinders can be continued without being influenced by the concerned cylinder.

Further, according to the present invention, each of threshold values for combustion diagnosis such as permissible maximum cylinder pressure, permissible minimum compression pressure, and permissible pressure of knock, misfire, and flame quenching can be determined as a function of engine operating conditions such as engine load, engine rotation speed, and inlet air temperature. Therefore, the threshold values can be adjusted according to engine operating conditions so that the engine is operated always near knocking limit, resulting in highly accurate combustion diagnosis.

Further, according to the present invention, when a diagnosis result has been outputted from the combustion diagnosis apparatus that a cylinder pressure detector is abnormal, the fuel injection timing of the concerned cylinder of which the pressure detector is abnormal is retarded by a certain crank angle to a safety range. After the pressure detector is recovered, the combustion diagnosis apparatus automatically recovers normal operation and allows the combustion control apparatus to operate normally to recover the normal injection timing of the concerned cylinder.

Therefore, when abnormality occurs in any of the cylinder pressure detectors, the pressure detector of the concerned cylinder is repaired or recovered while the injection timing of the concerned cylinder is adjusted to a safe timing for combustion. After the recovery of the pressure detector, normal combustion control is recovered, so the abnormal pressure detector can be dealt with without halting the operation of the engine.

Further, according to the present invention, the occurrence of spark noise, a break in wire, poor electric contact, etc. can be detected by detecting the pressure signal overshooting or undershooting the ordinary maximum or minimum value of cylinder pressure, the occurrence of drift due to the change over time of the pressure detector can be detected, and whether the pressure is detected without deviation in relation to crank angle or not can be confirmed.

Therefore, an abnormality of a cylinder pressure detector can be detected automatically from various facets, and fast recovery of the pressure detector from an abnormal state is possible, resulting in smooth combustion diagnosis.

Further, according to the present invention, drift due to changes in the temperature of the pressure sensor and changes over time of the pressure sensor does not influence the result of diagnosis, and abnormalities such as abnormal combustion, failure in the cylinder pressure sensor, and a break in a wire can be detected.

Further, according to the present invention, the detection of a knocking state, which has been difficult, can be grasped indirectly by the ratio of pressure differences as a measurement, and engine operation near the knock limit is always possible, resulting in increased engine efficiency.

Further, according to the present invention, even when the combustion diagnosis apparatus stops operation due to failure, etc., the apparatus can be recovered without stopping the engine, since in such a case the fuel ignition timing is retarded to a position safe for combustion through the combustion control apparatus.

Further, according to the present invention, the number of signal transmission wires between the combustion diagnosis apparatus and combustion control apparatus is reduced as compared with the conventional method of connection. If a break in a wire occurs, the influence thereof is limited only to the concerned cylinder. Besides, the broken wire is able to be identified because the analog value on the wire becomes zero level, which belongs to no category of diagnosis. On the contrary, with conventional digital signal transmission wires, the identification of a broken wire is impossible.

Further, according to the present invention, when any of the cylinder pressure sensors fails during engine operation, the failed sensor can be replaced without stopping the engine operation.

Further, according to the present invention, visualization of combustion conditions changing moment-to-moment is possible. Particularly, it is possible to observe pressure curves of a plurality of cylinders while diagnosing combustion by temporarily memorizing the cylinder pressure data measured and overlapped with regard to time in the combustion diagnosis apparatus and then sending it to the displaying apparatus in serial transmission.

Further, by adopting stepless control to effect feedback of the deviation in pressure from the target value of cylinder pressure, more carefully thought out control is possible, resulting in further increased engine efficiency.

The present invention is applicable not only to the gas engine ignited by torch ignition of pilot fuel explained in the embodiments, but also to all types of reciprocating internal combustion engines such as other types of gas engines and diesel engines.

What is claimed is:

1. An apparatus for diagnosing and controlling combustion of an internal combustion engine in which fuel gas is mixed with air and burned in a combustion chamber, comprising:

a cylinder pressure detector for detecting the pressure in the combustion chamber, a means for calculating the ratio of the maximum cylinder pressure $P_p$ to the compression pressure or pressures $P_0$ at one or a plurality of predetermined crank angle in the compression stroke, which ratio $P_p/P_0$ is the maximum pressure ratio from cylinder pressure detected by said cylinder pressure detector, a means for comparing the maximum pressure ratio $P_p/P_0$ with pressure ratios predetermined stepwise for each category of diagnosis, each of said pressure ratios being hereafter referred to as a threshold pressure ratio, and a means for diagnosing a condition of combustion in the combustion chamber by judging the result of comparison.

2. The apparatus for diagnosing and controlling combustion of an internal combustion engine as in claim 1, wherein a plurality of said threshold pressure ratios are predetermined stepwise for each category of diagnosis, and each of said plurality of threshold pressure ratios is changed as a function of engine operating conditions including engine load, engine rotation speed, and inlet air temperature.

3. An apparatus for diagnosing and controlling combustion of an internal combustion engine as in claim 1, wherein a means is provided which judges that the combustion is abnormal when said maximum pressure ratio $P_p/P_0$ is equal to or exceeds a predetermined maximum permissible pressure ratio $P_{p0}$ or when the number of operation cycles $N_h$ when said maximum pressure ratio $P_p/P_0$ is equal to or exceeds a predetermined pressure ratio $P_{h1}$, i.e., when $P_p/P_0 \geq P_{h1}$, is equal to or exceeds a permissible number $N_{h0}$, i.e., when $N_h \geq N_{h0}$.

4. An apparatus for diagnosing and controlling combustion of an internal combustion engine as in claim 1, wherein a means is provided which judges that compression pressure $P_0$ is abnormal when said compression pressure $P_0$ at a predetermined crank angle in the compression stroke is equal to or lower than a predetermined permissible compression pressure $P_{c0}$, i.e., when $P_0 \leq P_{c0}$.

5. An apparatus for diagnosing and controlling combustion of an internal combustion engine as in claim 1, wherein a means is provided which judges that knock has occurred in the combustion chamber when the number of cycles $S_n$ in which said maximum pressure ratio $P_p/P_0$ is equal to or exceeds a predetermined permissible pressure ratio of knock $P_{h1}$, i.e., when $P_p/P_0 \geq P_{h2}$ in a plurality of cycles in the past is equal to or exceeds a permissible number $S_{n0}$ i.e., when $S_n \geq S_{n0}$.

6. An apparatus for diagnosing and controlling combustion of an internal combustion engine as in claim 1, including:
   a means for calculating the ratio of the maximum cylinder pressure $P_p$ to the compression pressure or pressures $P_0$ at a predetermined crank angle in the compression stroke, the pressures being determined based on the pressures detected by said cylinder pressure detector,
   a means for calculating the ratio of a pressure $P_1$ at a predetermined crank angle in the combustion stroke to said pressure $P_0$ at a predetermined crank angle in the compression stoke, which is a combustion pressure ratio $(P_1/P_0)$, and
   a means which judges that misfire has occurred when said maximum pressure ratio $P_p/P_0$ is equal to or smaller than a predetermined minimum permissible pressure ratio $P_n$, i.e., when $P_p/P_0 \leq P_n$, and at the same time said combustion pressure ratio $P_1/P_0$ is equal to or smaller than a predetermined permissible pressure ratio $P_m$ of misfire, i.e., when $P_1/P_0 \leq P_m$.

7. An apparatus for diagnosing and controlling combustion of an internal combustion engine as in claim 1, including:
   a means for calculating the ratio of a lower side pressure $P_2$ in the combustion stroke, lower than a pressure $P_1$ at a predetermined crank angle in the combustion stroke, to said pressure $P_0$ at a predetermined crank angle in the combustion stroke $P_2/P_0$, and
   a means which judges that flame quenching has occurred in the combustion chamber when said maximum pressure ratio is equal to or smaller than a predetermined minimum permissible pressure ratio $P_n$, i.e., when $P_p/P_0 \leq P_n$, a combustion pressure ratio $P_1/P_0$ is equal to or smaller than a predetermined minimum permissible pressure ratio $P_m$ of misfire, and the combustion pressure ratio $P_2/P_0$ is equal to or larger than the permissible pressure ratio $P_{m1}$ of flame quenching.

8. A method of diagnosing and controlling combustion of an internal combustion engine including a gas engine which is constituted so that fuel gas is mixed with air and burned in a combustion chamber thereof, wherein the diagnosis of the condition of combustion in the combustion chamber is performed in such a manner in which
   the pressure in the combustion chamber is detected,
   a pressure difference $\Delta P$ between the detected pressure P and reference pressure $P_b$, which is the pressure at or before the beginning of compression including inlet air pressure, $\Delta P = P - P_b$, is calculated for every a plurality of crank angles, and
   a standardized pressure ratio, which is the ratio of said pressure difference $\Delta P$ to a pressure difference $\Delta P_0$, $\Delta P_0$ being the pressure difference between the pressure $P_0$ at one or a plurality of predetermined crank angle in the compression stroke and said reference pressure $P_b$, $\Delta P_0 = P - P_b$, is used for diagnosis of a combustion condition in the combustion chamber.

9. A method of diagnosing and controlling combustion of an internal combustion engine as in claim 8, wherein said standardized pressure ratio $\Delta P/\Delta P_0$ in the cylinder is compared with a pressure ratio predetermined stepwise for each category of diagnosis, which pressure ratio is hereafter referred to as threshold pressure ratio, and the result of comparison is evaluated for every one or a plurality of cycles to diagnose the condition of combustion in the combustion chamber.

10. A method of diagnosing and controlling combustion of an internal combustion engine as in claim 9, wherein the engine is stopped when said standardized pressure ratio $\Delta P/\Delta P_0$ at the maximum cylinder pressure $P_p$, which is a standardized maximum pressure ratio $\Delta P_p/\Delta P_0$, is equal to or exceeds a predetermined permissible maximum pressure ratio $P_{p0}$, i.e., when $\Delta P_p/\Delta P_0 \geq P_{p0}$.

11. A method of diagnosing and controlling combustion of an internal combustion engine as in claim 9, wherein fuel ignition timing is retarded by a certain crank angle when said standardized maximum pressure ratio $\Delta P_p/\Delta P_0$ is equal to or exceeds a predetermined maximum reference pressure ratio $P_{sh}$, i.e., when $\Delta P_p/\Delta P_0 \geq P_{sh}$, and fuel ignition timing is advanced by a certain crank angle when said standardized maximum pressure ratio $\Delta P_p/\Delta P_0$ is equal to or below a predetermined minimum reference pressure ratio $P_{s1}$, i.e., when $\Delta P_p/\Delta P_0 \leq P_{s1}$.

12. A method of diagnosing and controlling combustion of an internal combustion engine as in claim 9, wherein the engine is stopped when said pressure difference $\Delta P_0$ at the predetermined crank angle in the compression stroke is equal to or smaller than a predetermined permissible compression pressure difference $P_{c0}$, i.e., when $\Delta P_0 \leq P_{c0}$.

13. A method of diagnosing and controlling combustion of an internal combustion engine as in claim 9, wherein the fuel ignition timing is retarded by a certain crank angle when said standardized maximum pressure ratio $\Delta P_p/\Delta P_0$ is equal to or exceeds a predetermined permissible pressure ratio $P_{h2}$ of knock, i.e., when $\Delta P_p/\Delta P_0 \leq P_{h2}$.

14. A method of diagnosing and controlling combustion of an internal combustion engine as in claim 9, wherein misfire is judged to have occurred in the combustion chamber and the fuel injection for the cylinder in which misfire is judged to have occurred is shut off when said standardized maximum pressure ratio $\Delta P_p/\Delta P_0$ is equal to or below a predetermined minimum permissible pressure ratio $P_n$ of misfire i.e., when $\Delta P_p/\Delta P_0 \leq P_n$.

15. A method of diagnosing and controlling combustion of an internal combustion engine as in claim 9, wherein flame quenching is judged to have occurred and the fuel injection quantity for the cylinder in which flame quenching is judged to have occurred is increased when said standardized maximum pressure ratio $\Delta P_p/\Delta P_0$ and a standardized combustion pressure ratio $\Delta P_1/\Delta P_0$ in the combustion stroke are equal to or smaller than a minimum permissible pressure ratio $P_n$ and permissible pressure ratio $P_m$ of misfire, respectively, i.e., when $\Delta P_p/\Delta P_0 \leq P_n$ and $\Delta P_p/\Delta P_0 \leq P_m$, and a standardized combustion pressure ratio $\Delta P_2/\Delta P_0$ is larger than a permissible pressure ratio $P_{m1}$ of flame quenching.

16. A method of diagnosing and controlling combustion of an internal combustion engine as in claim 9, wherein the standardized threshold pressure ratio cited in claim 9 is any one of a permissible maximum pressure ratio $P_{p0}$, maximum value $P_{sh}$ of maximum reference pressure ratio, permissible pressure ratio of knock $P_{h2}$, minimum pressure ratio of misfire $P_n$, permissible pressure ratio of misfire $P_m$, and permissible pressure ratio of flame quenching $P_{m1}$, and each said threshold pressure ratio and a compression pressure difference $P_{c0}$ are variable as a function of engine load or engine rotation speed or engine operating conditions including inlet air temperature.

17. An apparatus for diagnosing and controlling combustion of an internal combustion engine including a gas engine which is constituted such that fuel gas is mixed with air and burned in a combustion chamber, comprising:

a cylinder pressure detector for detecting the pressure in the combustion chamber, a crank angle detector for detecting crank rotation angles of the engine, a means for calculating the pressure difference $\Delta P$ between detected cylinder pressure P and a reference pressure $P_b$ at or before the beginning of compression including inlet pressure, $\Delta P = P - P_b$, from the cylinder pressure detected by said cylinder pressure detector for every crank angle, a means for calculating standardized pressure ratio, which is the ratio of said pressure difference $\Delta P$ to the pressure difference $\Delta P_0$, i.e. $\Delta P/\Delta P_0$, $\Delta P_0$ being the pressure difference between the pressure $P_0$ at one or a plurality of predetermined crank angles in the compression stroke and said reference pressure $P_b$, $\Delta P_0 = P - P_b$, a means for diagnosing a condition of combustion in said combustion chamber using said standardized pressure ratio $\Delta P/\Delta P_0$, and a combustion control apparatus for controlling the combustion condition of the engine on the basis of the result of the combustion condition diagnosis outputted from the combustion condition diagnosis means.

18. An apparatus for diagnosing and controlling combustion of an internal combustion engine as in claim 17, including:

a means for comparing said standardized maximum pressure ratio $\Delta P_p/\Delta P_0$ with a predetermined maximum permissible pressure ratio $P_{p0}$ and outputting the result of the comparison, and a means for actuating an engine stopper to stop the engine when said result of comparison outputted from the combustion diagnosis apparatus is $\Delta P_p/\Delta P_0 \geq P_{p0}$.

19. An apparatus for diagnosing and controlling combustion of an internal combustion engine as in claim 17, including:

a means for comparing said standardized maximum pressure ratio $\Delta P_p/\Delta P_0$ with a maximum value $P_{sh}$ of maximum reference pressure ratio and with a minimum value $P_{s1}$ of maximum reference pressure ratio and outputting the result of the comparison, and a means for retarding ignition timing of fuel, including pilot fuel, by a certain crank angle when the result of said comparison is $\Delta P_p/\Delta P_0 > P_{sh}$ and for advancing the ignition timing by a certain crank angle when the result of said comparison is $\Delta P_p/\Delta P_0 \leq P_{s1}$.

20. An apparatus for diagnosing and controlling combustion of an internal combustion engine as in claim 17, including:

a means for comparing said standardized maximum pressure ratio $\Delta P_p/\Delta P_0$ with a predetermined permissible pressure ratio $P_{h2}$ of knock and judging that knock has occurred when said standardized maximum pressure ratio $\Delta P_p/\Delta P_0$ is equal to or exceeds said permissible pressure ratio $P_{h2}$ of knock, and a means for retarding fuel ignition timing by a certain crank angle upon receipt of a judgement signal of the occurrence of knock.

21. An apparatus for diagnosing and controlling combustion of an internal combustion engine as in claim 17, including:

a means for comparing said standardized maximum pressure ratio $\Delta P_p/\Delta P_0$ with the predetermined permissible pressure ratio of misfire and judging that misfire has occurred in the combustion chamber when said standardized maximum pressure ratio $\Delta P_p/\Delta P_0$ is equal to or smaller than a minimum permissible pressure ratio $P_n$ of misfire, and a means for cutting off fuel injection to a cylinder in which misfire has occurred upon receipt of a judgement signal of the occurrence of misfire.

22. An apparatus for diagnosing and controlling combustion of an internal combustion engine as in claim 19, including:

a means for outputting a judgement signal of the occurrence of flame quenching in the combustion chamber when said standardized maximum pressure ratio $\Delta P_p/\Delta P_0$ and a standardized combustion pressure ratio $\Delta P_1/\Delta P_0$ in the combustion stroke are smaller than a permissible minimum pressure ratio $P_n$ and permissible pressure ratio $P_m$ of flame quenching, respectively, and at the same time a standardized combustion pressure ratio $\Delta P_2/\Delta P_0$ is equal to or exceeds a permissible pressure ratio $P_{m1}$, and a means for increasing the quantity of fuel, including pilot fuel to be injected to a sub-combustion chamber, injected to the cylinder in which flame quenching has occurred upon receipt of the judgment signal of the occurrence of flame quenching.

23. An apparatus for diagnosing and controlling combustion of an internal combustion engine including a gas engine which is constituted so that fuel gas is mixed with air and burned in a combustion chamber, comprising:

a cylinder pressure detector for detecting the pressure in the combustion chamber, a crank angle detector for detecting crank rotation angle of the engine, a means for calculating the pressure difference $\Delta P$ between detected cylinder pressure P and a reference pressure $P_b$ at or before the beginning of compression, including inlet pressure, so that $\Delta P = P - P_b$, from cylinder pressure detected by said cylinder pressure detector for a plurality of crank angles in said combustion crank angle range, a means for calculating a standard pressure ratio which is a ratio of sad pressure difference $\Delta P$ to a pressure difference $\Delta P_0$, i.e. $\Delta P/\Delta P_0$, $\Delta P_0$ being the pressure difference between the pressure $P_0$ at one or a plurality of predetermined crank angles in the compression stroke and said reference pressure $P_b$ so that $\Delta P_0 = P - P_b$, a combustion diagnosis apparatus provided with a pressure/analog voltage converting means for outputting at least a part of the result of diagnosis as analog information when diagnosing the condition of combustion in the combustion chamber using said standardized cylinder pressure ratio $\Delta P/\Delta P_0$, and a combustion control apparatus for controlling the combustion condition of the engine by reconverting the analog information outputted from said combustion diagnosis apparatus to pressure information.

24. An apparatus for diagnosing and controlling combustion of an internal combustion engine as in claim 23, wherein the ignition timing of fuel including pilot fuel or quantity of fuel injection is controlled based on the diagnosis result of the pressure information reconverted from said analog information.

25. An apparatus for diagnosing and controlling combustion of an internal combustion engine as in claim 23, wherein the combustion is diagnosed on the basis of each threshold value determined for each diagnosis category information using said standardized pressure ratio $\Delta P/\Delta P_0$ in said predetermined crank angle range of combustion.

26. An apparatus for diagnosing and controlling combustion of an internal combustion engine as in claim 23, wherein said threshold values determined for every diagnosis category information are determined so that the level of each threshold decreases stepwise, and information of a different diagnosis category can be judged at a different threshold level.

27. An apparatus for diagnosing and controlling combustion of an internal combustion engine as in claim 23, wherein a pressure detection range is determined near the crank angle of maximum combustion pressure, the threshold for each diagnosis category information is $P_{p0}$ and $P_{h1}$ for abnormal Pmax, $P_{h2}$ for knock, $P_n$ for misfire and flame quenching, and the level of each threshold value is decreased in orderly sequence of $P_n \leq P_{s1} \leq P_{sh} \leq P_{h2} \leq P_{h1} \leq P_{p0}$.

28. An apparatus for diagnosing and controlling combustion of an internal combustion engine as in claim 23, wherein signals of the result of diagnosis transmitted from the combustion diagnosis apparatus to the combustion control apparatus are composed of analog levels, and each analog level for each diagnosis category is determined to decrease stepwise so that the information of a different category is able to be discriminated by the analog level at the combustion control apparatus.

29. An apparatus for diagnosing and controlling combustion of an internal combustion engine as in claim 28, wherein said analog levels for each of diagnosis categories are determined so that the level for transmitting the information of diagnosis category of normal combustion state is positioned in the middle of the levels, the levels for transmitting the information of abnormal maximum cylinder pressure or compression pressure are set to values in a higher level range, and the levels for transmitting information of a misfire, flame quenching, abnormal sensor, and a break in wire are set to values in a lower level range.

30. An apparatus for diagnosing and controlling combustion of an internal combustion engine as in claim 23, wherein, when the range of normal combustion pressure or pressure ratio of each cylinder, the pressure or pressure ratio being between the threshold for knock and that for flame quenching, is transmitted to the combustion control apparatus in an analog level, the pressure or pressure ratio is converted in a stepless analog level signal corresponding with the pressure or pressure ratio and the steplessly controlled analog signal is transmitted to the combustion control apparatus.

31. An apparatus for diagnosing and controlling combustion of an internal combustion engine as in claim 23, wherein a number of analog signal transmission wires corresponding to the number of cylinders are connected between the combustion diagnosis apparatus and combustion control apparatus, the diagnosis result is transmitted in serial order in the form of analog levels each determined to decrease stepwise for each diagnosis category, and a diagnosis category is judged or the combustion pressures or pressure ratios corresponding to analog levels is judged based on the corresponding analog level at the combustion control apparatus.

32. An apparatus for diagnosing and controlling combustion of an internal combustion engine including a gas engine which is composed so that fuel gas is mixed with air to be burned in its combustion chamber is provided with a cylinder pressure detector to detect the pressure in the combustion chamber, a crank angle detector to detect the crank rotation angle of the engine, and a displaying apparatus to display a cylinder pressure curve, wherein:

a first ring memory for memorizing a cam top crank angle of a reference cam and a cylinder pressure-crank angle curve is provided on a diagnosis apparatus side, a second ring memory for memorizing the cylinder pressure-crank angle curve in a certain crank angle range of each cylinder and a single displaying part are provided on a displaying apparatus side, the first ring memory on the diagnosis side has a means to start a program by an interrupt of a signal from the crank angle detector after detection of the cam top crank angle of the reference cam and write in a cylinder pressure wave form, which indicates a combustion condition, at a certain interval of crank angle to the second ring memory in a determined area corresponding to each cylinder, and pressure-crank angle curves of all cylinders are read out from the determined area of the second ring memory and displayed on said single displaying part with the pressure curves shifted so that each curve does not overlap.

33. An apparatus for diagnosing and controlling combustion of an internal combustion engine as in claim 32, wherein the cylinder pressure-crank angle curves of all cylinders are written into the first ring memory on the diagnosis apparatus side in synchronization with the crank angle at the moment-to-moment detection of the pressure with the cylinder pressure detector, said cylinder pressure-crank angle curves of all cylinders are written in the second ring memory after the cam top crank angle of the next cycle, after the previous cycle of 720° is completed, is detected, and the memorized pressure curves are represented on a single displaying part.

34. A method of diagnosing and controlling combustion of an internal combustion engine including a gas engine which is constituted so that fuel gas is mixed with air and burned in a combustion chamber thereof, comprising:

retarding fuel ignition timing of a cylinder of the engine by a certain crank angle to a safety position for combustion through a combustion control apparatus that is operable to control ignition timing of engine fuel and a fuel injection quantity, including pilot fuel, when an abnormality is detected concerning a cylinder pressure detector, which cylinder pressure detector detects the pressure in the combustion chamber of the cylinder and inputs the detected pressure to a combustion diagnosis apparatus; and ending said retarding through the combustion control apparatus after said cylinder pressure detector is recovered by replacement or repair thereof.

35. A method of diagnosing combustion of an internal combustion engine including a gas engine which is constituted so that fuel gas is mixed with air and burned in a combustion chamber thereof, comprising:

judging a plurality of kinds of abnormality in a predetermined crank angle range in a suction-combustion stroke; and judging a cylinder pressure detector to be abnormal when an unsatisfactory condition of any one of the plurality of duds of abnormality continues for a predetermined number of cycles.

36. The method of claim 35, wherein said judging a cylinder pressure detector to be abnormal comprises:

judging whether or not a pressure detected by the cylinder pressure detector is within a predetermined pressure range during the entire crank angle of one cycle, judging whether or not a pressure detected by the cylinder pressure detector is between a permissible maximum inlet pressure and a permissible minimum inlet pressure in the suction stroke, judging whether or not a crank angle at a maximum cylinder pressure is within a crank angle range that corresponds to a combustion range, and judging whether or not the standard deviation of reference pressures at or before the beginning of compression, including inlet air pressure, of a past plurality of cycles is smaller than a predetermined value.

* * * * *